(12) United States Patent
Helber et al.

(10) Patent No.: US 6,527,977 B2
(45) Date of Patent: *Mar. 4, 2003

(54) LIQUID CRYSTALLINE FILTER DYES FOR IMAGING ELEMENTS

(75) Inventors: Margaret J. Helber, Rochester, NY (US); William J. Harrison, Rochester, NY (US); Raymond P. Scaringe, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 22 days.

This patent is subject to a terminal disclaimer.

(21) Appl. No.: 09/759,467

(22) Filed: Jan. 12, 2001

(65) Prior Publication Data

US 2002/0009656 A1 Jan. 24, 2002

Related U.S. Application Data

(62) Division of application No. 09/151,919, filed on Sep. 11, 1998, now Pat. No. 6,214,499.

(51) Int. Cl.[7] .................. C09K 19/60; C09K 19/34; C09K 19/32; G03C 1/83; G03C 1/815
(52) U.S. Cl. ................... 252/299.1; 252/299.61; 252/299.62; 252/299.4; 430/20; 516/900
(58) Field of Search ................. 252/299.1, 299.4, 252/299.61, 299.62; 430/20; 516/900

(56) References Cited

U.S. PATENT DOCUMENTS

| | | | | |
|---|---|---|---|---|
| 4,134,888 A | * | 1/1979 | Bloom et al. | 252/299.1 |
| 4,443,225 A | * | 4/1984 | Wolff et al. | 252/299.01 |
| 6,093,510 A | * | 7/2000 | Helber et al. | 430/20 |
| 6,180,295 B1 | * | 1/2001 | Helber et al. | 430/20 |
| 6,214,499 B1 | * | 4/2001 | Helber et al. | 430/20 |
| 6,245,255 B1 | * | 6/2001 | Helber et al. | 252/299.4 |
| 6,355,386 B1 | * | 3/2002 | Helber et al. | 430/20 |

* cited by examiner

*Primary Examiner*—Shean C. Wu
(74) *Attorney, Agent, or Firm*—Edith A. Rice

(57) ABSTRACT

This invention comprises dispersion comprising a solvent having dispersed therein a liquid-crystal forming dye of structural Formula I:

$$[D\text{-}(X)_m]\text{-}(Y)_n$$

wherein:
D is a light-absorbing chromophore other than a cyanine dye or a barbituric acid oxonol dye;
each Y contains an ionic or a nonionic solubilizing substituent or a group with a pKa value of less than 4 in water;
each X is a nonionic substituent;
n is 0 to 10;
m is 0–10; and the resulting dye forms a liquid-crystalline phase in solvent. The dispersion is particularly useful in imaging and photographic elements.

21 Claims, No Drawings

LIQUID CRYSTALLINE FILTER DYES FOR IMAGING ELEMENTS

CROSS REFERENCE TO RELATED APPLICATION

This is a Divisional of application Ser. No. 09/151,919, filed Sep. 11, 1998, now U.S. Pat. No. 6,214,499.

FIELD OF THE INVENTION

This invention relates to a dispersion of a dye in a solvent wherein the dye forms a lyotropic liquid crystalline phase, a method for preparing said dispersions, an imaging element containing said dispersion and a photographic element containing said dispersion.

BACKGROUND OF THE INVENTION

Radiation-sensitive materials, including light-sensitive materials, such as photographic materials, may utilize filter dyes for a variety of purposes. Filter dyes may be used to adjust the speed of a radiation-sensitive layer; they may be used as absorber dyes to increase image sharpness of a radiation-sensitive layer; they may be used as antihalation dyes to reduce halation; they may be used to reduce the amount or intensity of radiation from reaching one or more radiation-sensitive layers, and they may also be used to prevent radiation of a specific wavelength or range of wavelengths from reaching one or more of the radiation-sensitive layers in a radiation-sensitive element. For each of these uses, the filter dye(s) may be located in any number of layers of a radiation-sensitive element, depending on the specific requirements of the element and the dye, and on the manner in which the element is to be exposed. The amount of filter dyes used varies widely, but they are preferably present in amounts sufficient to alter in some way the response of the element to radiation. Filter dyes may be located in a layer above a radiation-sensitive layer, in a radiation-sensitive layer, in a layer below a radiation-sensitive layer, or in a layer on the opposite side of the support from a radiation-sensitive layer.

Photographic materials often contain layers sensitized to different regions of the spectrum, such as red, blue, green, ultraviolet, infrared, X-ray, to name a few. A typical color photographic element contains a layer sensitized to each of the three primary regions of the visible spectrum, i.e., blue, green, and red. Silver halide used in these materials has an intrinsic sensitivity to blue light. Increased sensitivity to blue light, along with sensitivity to green light or red light, is imparted through the use of various sensitizing dyes adsorbed to the silver halide grains. Sensitized silver halide retains its intrinsic sensitivity to blue light.

There are numerous applications for which filtration or absorbance of very specific regions of light are highly desirable. Some of these applications, such as yellow filter dyes and magenta trimmer dyes, require non-diffusing dyes which may be coated in a layer-specific manner to prevent specific wavelengths of light from reaching specific layers of the film during exposure. These dyes must have sharp-cutting edges on the bathochromic (long-wavelength) side of the absorbance envelope to prevent light punch through without adversely affecting the speed of the underlying emulsions. In other applications, it is desirable to allow passage of light below a certain wavelength. In these cases it is desirable to have a dye which is very sharp-cutting on the hypsochromic (short-wavelength) edge of the absorbance envelope. Depending on the location of these filter layers relative to the sensitized silver halide emulsion layers, it would also be desirable to have non-diffusing, layer-specific filter dyes with absorption spectra which are sharp-cutting on the hypsochromic edge as well as the bathochromic edge. Such dyes are sometimes known as "finger filters". Preferably these dyes should exhibit high extinction coefficients, narrow halfbandwidths and sharp cutting hypsochromic and bathochromic absorption envelopes when incorporated into imaging elements including photographic elements. Typically, to achieve these properties, isotropic solutions of dyes have been incorporated. Dyes introduced by this method, however, often wander into adjacent layers causing problems such as speed loss or stain, and cannot be coated in a layer-specific manner without the use of mordants. Solubilized dyes may be mordanted to prevent wandering through adjacent layers. While the use of polymeric mordants can prevent dye wandering, such mordants aggravate the stain problem encountered when the dye remains in the element through processing.

Dyes with a high extinction coefficient allow maximum light absorption using a minimum amount of dye. Lower requisite dye laydown reduces the cost of light filtration and produces fewer processing by-products. Lower dye laydowns may also result in reduced dye stain in short duration processes.

Finger filters such as described above are highly desirable for other uses such as protecting silver halide sensitized emulsions from exposure by safelights. Such dyes must have absorbance spectra with high extinction coefficients and narrow halfbandwidths, and sharp cutting absorbance envelopes to efficiently absorb light in the narrow safelight-emitting region without adversely affecting the speed of the sensitized silver halide emulsions. This affords protection for the sensitized emulsion from exposure by light in the safelight's spectral region. Useful absorbance maxima for safelight dyes include, but are not restricted to 490–510 nm and 590–610 nm.

Similar properties are required for infrared absorbing filter dyes. Laser-exposed radiation-sensitive elements require high efficiency light absorbance at the wavelength of laser emission. Unwanted absorbance from broadly absorbing dyes reduces the efficiency of light capture at the laser emission wavelength, and requires the use of larger amounts of dye to adequately cover the desired spectral region. In photographic elements, unwanted absorbance may also cause speed losses in adjacent silver halide sensitized layers if the photographic element has multiple sensitized layers present. Useful finger filter absorbance maxima for absorbing laser and phosphor emissions include but are not restricted to 950 nm, 880 nm, 830 nm, 790 nm, 633 nm, 670 nm, 545 nm and 488 nm.

In some radiation sensitive elements, including dry process imaging films, it is necessary to provide light filtration or antihalation at deep cyan and infrared wavelengths. Typically such protection has been achieved using water or solvent soluble dyes or milled solid particle dyes. Typically, water-soluble dyes forming isotropic solutions can provide relatively sharp, high extinction absorbance, but are prone to interlayer wandering.

One common use for filter dyes is in silver halide light sensitive photographic elements. If, prior to processing, blue light reaches a layer containing silver halide which has been sensitized to a region of the spectrum other than blue, the silver halide grains exposed to the blue light, by virtue of their intrinsic sensitivity to blue light, would be rendered developable. This would result in a false rendition of the image information being recorded in the photographic element. It is therefore a common practice to include in the photographic element a material that filters blue light. This blue-absorbing material can be located anywhere in the element where it is desirable to filter blue light. In a color photographic element that has layers sensitized to each of the primary colors, it is common to have the blue-sensitized layer closest to the exposure source and to interpose a blue-absorbing, or yellow filter layer between the blue-sensitized layer and the green- and red-sensitized layers.

Another common use for filter dyes is to filter or trim portions of the UV, visible or infrared spectral regions to prevent unwanted wavelengths of light from reaching sensitized emulsions. Just as yellow filter dyes prevent false color rendition from the exposure of emulsions sensitized to a region of the spectrum other than blue, filter dyes absorbing in the UV, magenta, cyan and infrared spectral regions can prevent false color rendition by shielding sensitized emulsion layers from exposure to specific wavelength regions. One application of this strategy is the use of green-absorbing magenta trimmer dyes. In one type of typical color photographic element containing a layer sensitized to each of the three primary regions of the visible spectrum, i.e., blue, green, and red, the green-sensitized layer is coated above the red-sensitized layer and below the blue-sensitized layer. Depending on the chosen spectral sensitivity maxima for the sensitized silver halide layers, there may be a region of overlap between the spectral sensitivities of the green and red emulsions. Under such circumstances, green light which is not absorbed by the green-sensitive emulsion can punch through to the red sensitive emulsion and be absorbed by the leading edge of the red spectral sensitizing dye. This crosstalk between the green and red emulsions results in false color rendition. It would, therefore, be highly desirable to find a green-absorbing filter dye which upon incorporation into a photographic element would absorb strongly around the spectral maximum of the green-sensitized emulsion, and possess a sharp cutting bathochromic absorbance such that there is no appreciable absorbance just bathochromic to its absorbance maximum. A sharp-cutting bathochromic edge on a filter or trimmer dye enables excellent color reproduction with minimum speed loss by absorbing light efficiently up to its absorbance maximum, but very little if any just past its absorbance maximum. For example, a magenta trimmer dye (green absorber) which is only moderately sharp-cutting on the bathochromic edge may function adequately as a filter dye, but its unwanted absorbance in the red region past its Smack will rob the red-sensitive emulsion coated below it of red light and hence speed. Though the position of optimal absorption maximum for a magenta trimmer dye will vary depending on the photographic element being constructed, it is particularly desirable in one type of typical color photographic element containing a layer sensitized to each of the three primary regions of the visible spectrum, i.e., blue, green, and red, that a magenta trimmer dye absorb strongly at about 550 nm, and possess a sharp cutting bathochromic absorbance such that there is no appreciable absorbance above about 550 nm. Therefore it would be desirable to provide a filter dye for use in photographic elements that possesses high requisite absorbance in the green region of the spectrum below about 550 nm, but little or no absorbance above about 550 nm, and furthermore does not suffer from incubative or post process stain problems, and furthermore is not prone to migration in the coated film, but is fully removed upon processing.

One method used to incorporate solvent or water-soluble filter dyes into photographic film element layers is to add them as aqueous or alcoholic isotropic solutions. Dyes introduced by this method are generally highly mobile and rapidly diffusing and often wander into other layers of the element, usually with deleterious results. While the use of polymeric mordants can prevent dye wandering, such mordants aggravate the stain problem encountered when the dye remains in the element through processing.

Filter dyes have also been prepared as conventional dispersions in aqueous gelatin using standard colloid milling or homogenization methods or as loaded latices. More recently, ball-milling, sand-milling, media-milling and related methods of producing fine-particle-size slurries and suspensions of solid filter dyes have become standard tools for producing slurries and dispersions that can readily be used in photographic melt formulations. Solid particle filter dyes introduced as dispersions, when coated at sufficiently low pH, can eliminate problems associated with dye wandering. However, solvent-insoluble solid particle filter dyes (pigments) provide relatively low absorption coefficients, requiring that an excessive amount of dye be coated. In addition, it is very difficult to find classes of solid particle dispersion dyes which consistently yield useful, sharp-cutting bathochromic or hysochromic spectral features due to their microcrystalline nature. In fact the hue of a microcrystalline dye is highly unpredictable and often varies tremendously between similar analogs. In addition many solid particle dyes are not robust under keeping conditions of high heat and humidity experienced in melting and coating operations. Under such conditions, microcrystals of dye can undergo ripening, resulting in a lower optical density post incubation. In addition, the time and expense involved in preparing serviceable solid particle filter dye dispersions by milling techniques are a deterrent to their use, especially in large volume applications. It is therefore desirable to provide dye dispersions that do not necessarily require mechanical milling before use and that do not wander but that wash out easily during processing leaving little or no residual stain. It is also desirable that such filter dye dispersions provide high light absorption efficiencies with sharp-cutting absorbance peaks. One method of obtaining these desirable dye features in solid particle dispersions of oxonol filter dyes was described by Texter (U.S. Pat. No. 5,274,109, U.S. Pat. No. 5,326,687 and U.S. Pat. No. 5,624,467). Texter describes a process by which pyrazolone oxonol dyes are microprecipitated under strictly controlled pH conditions to produce absorbance spectra which are narrow, bathochromic and sharp cutting on the long wavelength side relative to their corresponding milled solid particle dispersions. This technique, however, is impractical for large volume applications.

A specific class of dyes, barbituric acid oxonol dyes, have been disclosed in commonly assigned copending US application Ser. No. 08/565,480 filed Nov. 30, 1995, the entire disclosures of which are incorporated herein by reference, and U.S. Pat. No. 5,766,834 to possess sharp-cutting spectral properties when incorporated into gelatin coatings; however no reference is made to suggest that other filter dye classes might possess these useful spectral features. Further, the spectral features of these dyes are limited to a few specific wavelength ranges, and the hue of these sharp-cutting dyes are not tunable over a large useful range.

It would be very useful if dye materials were available that were non-wandering, like solid particle dispersions, but were additionally narrowly absorbing and sharp-cutting in spectral features, like fully solvent-soluble dyes, and were additionally available at a wide variety of absorbance maxima useful in imaging elements.

Problem to be Solved by the Invention

It is therefore desirable to have a dye, especially a filter dye, which has a high extinction coefficient, a narrow halfbandwidth, and is sharp cutting on the bathochromic and/or hypsochromic edge, and even more preferably on both the hypsochromic and bathochromic edges. For dyes used in photographic elements, it is additionally desirable that the dye is capable of being substantially completely removed or rendered colorless on process of an exposed radiation-sensitive element comprising said dye. It is also desirable that the coated dye be robust in its spectral and physical properties and not prone to migration within the imaging element. It is also desirable to have a method for preparing a dispersion of a filter dye that is suitable for high-volume manufacture.

SUMMARY OF THE INVENTION

It has now been discovered that dyes from a broad range of classes may be functionalized with certain substituents and solubilizing groups, and dispersed in hydrophilic colloids to form lyotropic (solvent-induced) liquid-crystalline dye phases (mesophases). These mesophase-forming dyes possess unique and useful properties superior to those of conventional water or solvent-soluble dyes or solvent-insoluble solid particle dyes with respect to hue, spectral shape, immobility, robustness and process removability. Additionally it has been discovered that for a given dye class, one skilled in the art can optimize dye analogs such that they possess an inherent propensity to form stable liquid-crystalline phases rather than microcrystalline (solid) or isotropic (e.g. solution) phases when dispersed in solvents, including hydrophilic colloids such as aqueous gelatin. Additionally it has been discovered that modifications in the properties of the hydrophilic colloid dye dispersion, such as ionic strength, temperature and pH can improve a given dye's propensity to form a stable liquid-crystalline phase. Additionally it has been discovered that the advantageous spectral and physical properties of the dye liquid crystalline phases formed in the wet hydrophilic colloid (e.g. aqueous gelatin) are largely retained in the dried-down (evaporated) gelatin coatings of an imaging element.

This invention relates specifically to amphiphilic dyes, especially filter dyes in photographic elements which are capable of forming practically useful lyotropic liquid-crystalline phases, particularly dyes from the polymethine classes. However, it is anticipated that liquid crystal formation is not necessarily restricted to these particular dye classes nor specific dye structures. This technology may also be applied to any novel dye structure with potentially useful photographic filter properties. It is understood that the degree of amphophilicity to be imparted to a particular dye chromophore by the incorporation of said solubilizing groups will vary from chromophore to chromophore and from dye class to dye class.

Liquid-crystalline filter dyes afford a host of benefits over conventional state-of-the-art solid particle (microcrystalline)-incorporated dyes or water-soluble (isotropic solution) filter dyes, for photographic imaging applications. Moreover, they provide a combination of spectral and physical properties that is virtually unachievable using either water-soluble or solid particle dyes. The following beneficial spectral and physical properties are inherent to the liquid-crystalline form of the dye. For example, dyes dispersed in a lyotropic liquid-crystalline form exhibit slow collective molecular diffusion (orders of magnitude slower than dye isotropic solution species) affording good layer specificity and immobility, like (microcrystalline) solid particle dyes and unlike unmordanted isotropic solution dyes. Dyes dispersed in a lyotropic liquid-crystalline form exhibit significantly higher extinction coefficients than (microcrystalline) solid particle dyes dispersed at equivalent wet laydowns (concentrations). Dyes dispersed in a lyotropic liquid-crystalline form show processing washout and bleaching rates comparable to, but usually much better than, conventional (microcrystalline) solid particle dyes. Lyotropic liquid-crystalline dye phases are more easily, rapidly and reproducibly formulated than (microcrystalline) solid particle dye phases. Dyes dispersed in a lyotropic liquid-crystalline form, (especially the smectic mesophase form), often exhibit sharper-cutting, more intense spectral absorption features than their (microcrystalline) solid particle counterparts, making them particularly useful as photographic finger filters. Dyes dispersed in a lyotropic liquid-crystalline form often exhibit characteristic bathochromically-shifted excitonic absorption J-bands (sharp, narrow and intense), possessing (long-wavelength) sharp-cutting spectral features, making them particularly useful for many photographic finger-filter applications. So-called J-band (J-aggregate) spectra are not readily afforded by (microcrystalline) solid particle dyes. Dyes dispersed in a lyotropic liquid-crystalline form may also exhibit practically useful hypsochromically-shifted H-band absorption spectra, with (short-wavelength) sharp-cutting spectral features. Dyes dispersed in a lyotropic liquid-crystalline state may also exhibit little or no spectral shift compared with the dye's isotropic solution absorbance state, yet still retain the characteristic immobility of the liquid crystalline phase. The essentially "immobile" lyotropic liquid-crystalline form (phase) of the preferred amphiphilic filter dyes, exhibiting characteristic and practically useful J-band and H-band absorption spectra, are quite distinct, easily identifiable and readily distinguishable from non-liquid-crystalline (isotropic) rapidly-diffusing dye phases which occasionally exhibit similar absorption spectra. Dyes dispersed in a lyotropic liquid-crystalline state in aqueous, or those dyes passing through a transitory mesophase upon the drying of aqueous gelatin layers, usually retain the useful spectral and physical properties associated with the mesophase in the evaporated (dried-down)state. Dyes initially dispersed as a lyotropic liquid-crystalline form often exhibit good incubation stability in evaporated gelatin layers.

This invention comprises a very broad collection of dye classes which can form lyotropic liquid crystals when selectively functionalized as described below. This disclosure further teaches one skilled in the art how to find liquid-crystalline members of a given dye class; it further includes test protocol for determining the presence of a dye mesophase (i.e. liquid crystal phase), and shows the superior features dye liquid crystals possess compared with solid particle dyes or solvent-soluble (solution) dyes. This invention further demonstrates the advantages of dye mesophase properties in imaging elements, especially photographic elements.

One aspect of this invention comprises a filter dye which when dispersed in a solvent, especially water or a hydrophilic colloid such as aqueous gelatin, forms a liquid-crystalline phase.

Another aspect of this invention comprises a filter dye which when dispersed in a solvent or a hydrophilic colloid such as aqueous gelatin, forms a smectic liquid-crystalline phase.

Another aspect of this invention comprises a filter dye which when dispersed in a solvent or a hydrophilic colloid such as aqueous gelatin, forms a nematic or hexagonal liquid-crystalline phase.

Another aspect of the invention comprises a dye lyotropic liquid-crystalline which exhibits a spectral absorbance maximum bathochromically or hypsochromically shifted, and exhibits an unusually high extinction coefficient and an exceptionally narrow halfbandwidth relative to its isotropic monomeric solution state.

Another aspect of the invention comprises a dye lyotropic liquid-crystalline phase which possesses a spectral absorbance envelope with an extinction coefficient and halfbandwidth similar to its isotropic monomeric solution state.

Another aspect of this invention comprises a filter dye which when dispersed in a hydrophilic colloid such as aqueous gelatin to form a liquid-crystalline phase, possesses a narrow spectral absorption band exhibiting an especially sharp-cutting short or long wavelength edge.

Another aspect of this invention comprises a filter dye which when dispersed in a hydrophilic colloid such as aqueous gelatin to form a liquid-crystalline phase, possesses a narrow spectral absorption band exhibiting especially sharp-cutting short and long wavelength edges.

Another aspect of this invention comprises a filter dye which when dispersed in a hydrophilic colloid such as aqueous gelatin to form a liquid-crystalline phase, exhibits low dye diffusibility and interlayer wandering.

Another aspect of this invention comprises a direct gelatin dispersion method allowing easy, inexpensive, rapid and reproducible incorporation of the inventive dyes in the liquid-crystalline state, with all desirable properties intact, into imaging elements, especially photographic elements without recourse to milling techniques.

Another aspect of this invention comprises a filter dye which when dispersed in a hydrophilic colloid such as aqueous gelatin to form a liquid-crystalline phase exhibits excellent stability at high temperature and humidity conditions.

Another aspect of this invention comprises a filter dye which when dispersed in a wet hydrophilic colloid such as aqueous gelatin to form a liquid crystalline phase retains all of the desirable physical and spectral properties once the coated imaging element is dried-down (evaporated).

Another aspect of the invention comprises a silver halide radiation-sensitive material containing at least one dye in the liquid-crystalline state, dispersed in a hydrophilic colloid layer, which is decolorized by photographic processing and which causes no deleterious effects on the silver halide photographic emulsions before or after processing.

A further aspect of the invention comprises a silver halide radiation-sensitive material in which a hydrophilic colloid layer is dyed and exhibits excellent decolorizing properties upon photographic processing.

Yet another aspect of the invention comprises a silver halide radiation-sensitive material in which a hydrophilic colloid layer is dyed and exhibits high absorbance in a portion of the spectral region at its absorbance maximum, but possesses comparatively little absorbance around 20 nm above its absorbance maximum.

Yet another aspect of the invention comprises a silver halide radiation-sensitive material in which a hydrophilic colloid layer is dyed and exhibits high absorbance in a portion of the spectral region at its absorbance maximum, but possesses comparatively little absorbance around 20 nm below its absorbance maximum.

We have now discovered that certain dyes set forth below form stable liquid-crystalline phases when dispersed in wet aqueous media (preferably containing a hydrophilic colloid such as gelatin) and provide the advantages set for in the above objects of the invention. The said liquid-crystalline dye dispersion can be formed by dispersing powdered dye or a milled dye slurry into an aqueous medium, preferably containing gelatin or other hydrophilic colloid, over a specified concentration and temperature range, using the methods set forth herein.

One aspect of this invention comprises a solvent, preferably an aqueous medium, having dispersed therein a liquid-crystal forming dye of structural Formula I:

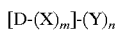

wherein

D is a light-absorbing chromophore other than a cyanine dye or a barbituric acid oxonol dye.

Each Y contains an ionic or a nonionic solubilizing substituent or a group with a pKa value of less than 4 in water.

Each X is a nonionic substituent.

n is 0 to 10; preferably 1 to 6, more preferably 1 to 3.

m is 0 to 10, preferably 1 to 6, more preferably 1 to 3, and the resulting dye forms a liquid-crystalline phase in a solvent, such as an aqueous media, including hydrophilic colloids, when dispersed as described herein. Protocol for determining the presence of dye liquid-crystalline phases is also described herein.

Another preferred embodiment of the invention comprises an imaging element containing a liquid crystal-forming dye of structural Formula I.

Still another preferred embodiment of the invention comprises a radiation-sensitive element, such as a photographic element, containing a liquid-crystal forming dye of structural Formula I.

Yet another preferred embodiment of the invention comprises a method of preparing a liquid-crystalline dye dispersion which comprises adding a dye of structural Formula I to an aqueous medium at a temperature of from about 2° C. to about 100° C. and agitating the mixture for about 5 minutes to about 48 hours.

Advantageous Effects of the Invention

This invention provides a dye, useful as a filter dye or light-absorbing compound in an imaging element, and especially in a radiation-sensitive element, such as a photographic element, which when dispersed in an aqueous medium, for example aqueous gelatin, dissolves then spontaneously forms a lyotropic liquid-crystalline phase which constitutes an unusually well-ordered and thermodynamically stable dye state. A dye in the liquid-crystalline state often possesses a coated $\lambda_{max}$ which is substantially bathochromic or hypsochromic to that of its monomeric isotropic solution (non-liquid crystalline) state and exhibits exceptionally high covering power at its coating $\lambda_{max}$. Further, the liquid-crystalline dye phase often exhibits sharp-cutting bathochromic and/or hypsochromic spectral features absorbing strongly at its coating $\lambda_{max}$, while absorbing comparatively little light at wavelengths just below or just above its absorbance maximum. Further, the liquid-crystalline dye phase often possesses an unusually narrow halfbandwidth. The dyes of this invention can be formulated for incorporation into a photographic element using, for example, conventional ball-mill or media-mill procedures for producing dye dispersions (SPD's), or more simply as direct gelatin dispersions (DGD's) for incorporation in a photographic element, as discussed more fully below. In the photographic element, dyes in the spontaneously-formed liquid-crystalline state exhibit little, if any tendency to wander, and upon processing many are substantially free of post-process stain problems.

DETAILED DESCRIPTION OF THE INVENTION

As noted above, the dispersion of this invention comprises a liquid-crystal forming dye of Formula I:

$$[D-(X)_m]-(Y)_n$$

wherein
D is a light-absorbing chromophore other than a cyanine dye or a barbituric acid oxonol dye.
Each Y contains an ionic or a nonionic solubilizing substituent or a group with a pKa value of less than 4 in water.
Each X is a nonionic substituent.
n is 0 to 10; preferably 1 to 6, more preferably 1 to 3.
m is 0–10, preferably 1 to 6, more preferably 1 to 3, and the resulting dye forms a liquid-crystalline phase in solvent such as an aqueous l media, including hydrophilic colloids, when dispersed as described herein. Protocol for determining the presence of dye liquid-crystalline phases is also described herein.

In Formula I, D represents a dye residue. Examples of dye classes from which D is derived include but are not restricted to an arylidene dye, an oxonol dye, a merocyanine dye, a styryl dye, a coumarin dye, an azo dye, an azomethine dye, a hemioxonol dye, a metal-chelated dye, a triarylmethane dye, an indoaniline dye, a chalcone dye, an anthraquinone dye, a butadiene dye, with the exception of a barbituric acid oxonol dye and a cyanine dye. In non-imaging embodiments of the invention, D is preferably other than azo dye. Useful dye include those absorbing in the UV region (below 400 nm), the visible region (400–700 nm), and the infrared region (above 700 nm).

Each Y may independently be a group containing an ionic or nonionic solubilizing substituent, and each X may independently be a nonionic substituent, each X and Y being present in number and combination such that the resulting dye forms a liquid-crystalline phase when dispersed or dissolved in a solvent. For water-based solvent media, examples of solubilizing groups contained in Y include, but are not restricted to carboxylate ($CO_2^-$) sulfo ($SO_3^-$), sulfato ($OSO_3^-$), sulfate ($SO_4^-$), phosphate, phosphonate, trialkylammonium ($R_3N^+$), pyridinium, alkylpyridinium, hydroxylate ($O^-$), enolate ($C=C-O^-$), dicyanovinylate ($C=CCH(CN)_2^-$), alkyl ethers such as ($CH_2OCH_2OCH_3$), zwitterionic groups such as amino acids, phosphatidyl choline, phosphatidyl ethanolamine, and phosphatidyl serine, and groups with a pKa value below 4 and preferably below 3.8 such as sulfonic acid, acylsulfonamide ($CONHSO_2R$), saccarin moieties (cyclic acylsulfamdes), and sulfonylsulfonamido ($SO_2NHSO_2R$). Y or the solubilizing substituent contained in Y may be attached to the dye in any way; it may be attached directly to the chromophoric moeity itself, D, or to X or may be attached to the dye as part of a linking group such as a substituted or unsubstituted alkyl or aryl group. In the case where n is 0, the solubilizing substituent may be incorporated as part of the actual chromophoric moeity D (e.g., the enolate portion of an oxonol dye. Examples of groups for X include, but are not restricted to aryl, alkyl, aralkyl, halogen, cycloalkyl, alkoxy, alkylamino, acyl, carboxy, carboxyalkyl, sulfonamido or alkylthio, and more preferably are phenyl, halogen, and benzo (fused phenyl).

In another preferred embodiment of the invention the liquid-crystal forming dye of structural Formula I is an oxonol dye of Formula II:

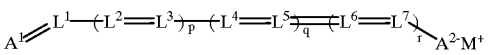

wherein $A^1$ and $A^2$ are ketomethylene or activated methylene moieties, $L^1$–$L^7$ are substituted or unsubstituted methine groups, (including the possibility of any of them being members of a five or six-membered ring where at least one and preferably more than one of p, q, or r is 1); $M^+$ is a cation, and p, q and r are independently 0 or 1.

In another preferred embodiment of the invention the liquid-crystal forming dye of structural Formula II is an oxonol dye of Formulae II-A through II-B:

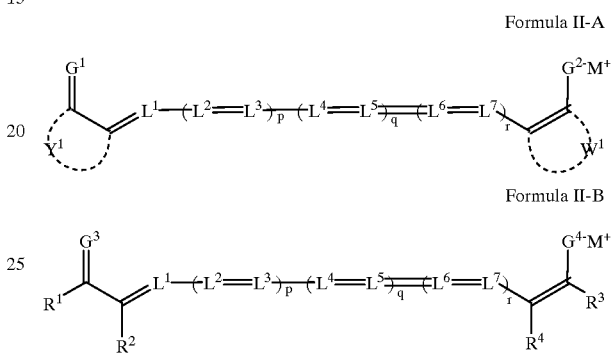

Wherein $W^1$ and $Y^1$ are the atoms required to form a cyclic activated methylene/ketomethylene moiety; $R^1$ and $R^3$ are aromatic or heteroaromatic groups; $R^2$ and $R^4$ are electron-withdrawing groups; $G^1$ to $G^4$ is O or dicyanovinyl (—C(CN)$_2$)) and p, q, and r are defined as above, and $L^1$ to $L^7$ are defined as above.

In an even more preferred embodiment of the invention, the liquid-crystal forming dye of Formula II is an oxonol dye of Formula III:

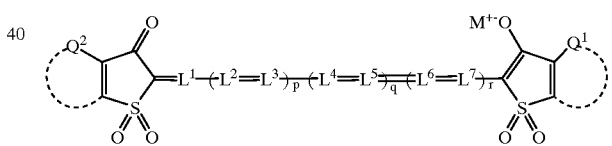

wherein $Q^1$ and $Q^2$ represent the non-metallic atoms required to form a substituted or unsubstituted 5 or 6-membered heterocyclic or carbocyclic ring, preferably a substituted or unsubstituted aromatic or heteroaromatic ring including any fused polycyclic moeity; or a dye of Formula III-A:

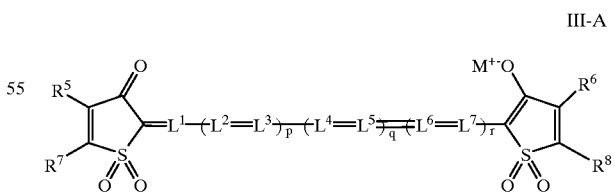

wherein $R^5$ to $R^8$ each individually represent amino, alkylamino, dialkylamino, hydroxy, alkylthio, halogen, cyano, alkylsulfone, arylsulfone, or substituted or unsubstituted alkyl, aryl, heteroaryl, or aralkyl, and $L^1$ to $L^7$, $M^+$, and p, q and r are defined as described above for Formula III.

In another preferred embodiment of the invention, the liquid-crystal forming dye of Formula II is an oxonol dye of Formula III-B:

III-B

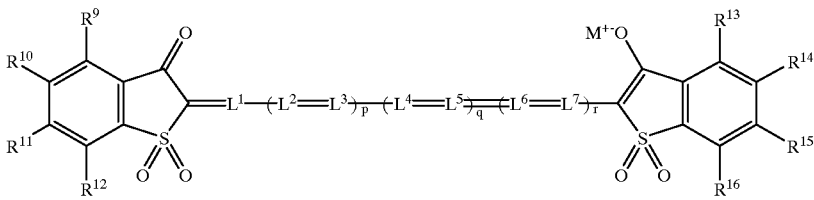

wherein $R^9$ to $R^{16}$ each independently represents hydrogen, substituted or unsubstituted alkyl, or cycloalkyl; alkenyl, substituted or unsubstituted aryl, heteroaryl or aralkyl; alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, or groups containing solubilizing substituents as described above for Y. Any adjacent pair of substituents among $R^9$ through $R^{16}$ may together form a fused carbocyclic or heterocyclic aromatic or aliphatic ring. $L^1$ through $L^7$ are methine groups as described above, $M^+$ is a cation, and p, q and r are independently 0, or 1 as described above.

In a preferred embodiment, the substituents $R^9$ to $R^{16}$ do not contain the groups described by Y.

In yet another preferred embodiment of the invention the liquid-crystal forming dye of structural Formula I is a merocyanine of Formula IV:

IV

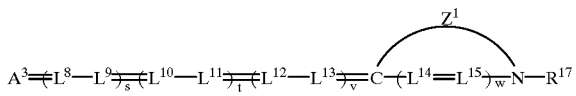

wherein $A^3$ is a ketomethylene or activated methylene moiety as described above; each $L^8$ to $L^{15}$ are substituted or unsubstituted methine groups (including the possibility of any of them being members of a five or six-membered ring where at least one and preferably more than 1 of s, t, v or w is 1); $Z^1$ represents the non-metallic atoms necessary to complete a substituted or unsubstituted ring system containing at least one 5 or 6-membered heterocyclic nucleus; $R^{17}$ represents a substituted or unsubstituted alkyl, aryl, or aralkyl group; with the proviso that at least one substituent on the dye of Formula IV contains a ionic or non-Ionic solubilizing group or a group with a pKa value less than 4 in water as described for Y in Formula I.

In yet another preferred embodiment of the invention the liquid-crystal forming dye of structural Formula I is a merocyanine of Formula IV-A:

IV-A

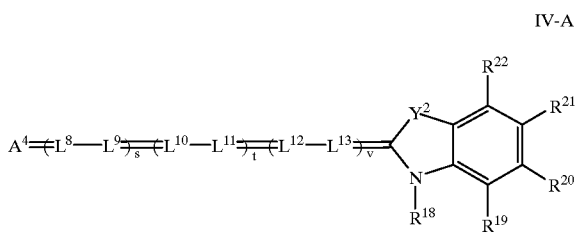

wherein $A^4$ is an activated methylene moiety or a ketomethylene moeity as described above, $R^{18}$ is substituted or unsubstituted aryl, alkyl or aralkyl, $R^{19}$ to $R^{22}$ each individually represent hydrogen, alkyl, cycloalkyl, alkeneyl, substituted or unsubstituted aryl, heteroaryl or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, including the atoms required to form fused aromatic or heteroaromatic rings, or groups containing solubilizing substituents as described above for Y. $L^8$ through $L^{13}$ are methine groups as described above for $L^1$ through $L^7$, $Y^2$ is O, S, Te, Se, $NR_x$, or $CR_yR_z$ (where Rx, Ry and Rz are alkyl groups with 1–5 carbons), and s and t and v are independently 0 or 1; with the proviso that at least one substituent on the dye of Formula IV-A contains an ionic or non-ionic solubilizing group or a group with a pKa value less than 4 in water as described for Y in Formula I.

In a preferred embodiment, $Y^2$ is O, S, $NR_x$ or $CR_yR_z$, and the sum of s, t and v is 1 or 2.

In another especially preferred embodiment the liquid-crystal forming dye of Formula IV is a merocyanine dye of Formula V-A:

V-A

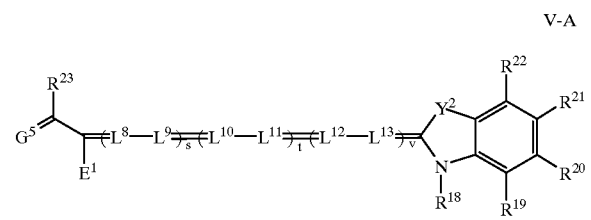

wherein $R^{23}$ is a substituted or unsubstituted aryl, heteroaryl, or a substituted or unsubstituted amino group; $G^5$ is O or dicyanovinyl $(C(CN)_2)$, $E^1$ is an electron-withdrawing group, $R^{18}$ to $R^{22}$, $L^8$ to $L^{13}$, $Y^2$, and s, t and v are as described above; with the proviso that at least one substituent on the dye of Formula V-A is a ionic or non-ionic solubilizing group or a group with a pKa value less than 4 in water as described for Y in Formula I.

In a preferred embodiment, Y is O or S, $E^1$ is cyano, R is a substituted or unsubstituted phenyl or heteroaromatic ring, $R^{18}$ is sulfoalkyl and sum of s, t and v is 1 or 2. In an especially preferred embodiment, $G^5$ is dicyanovinyl, $E^1$ is cyano, and $Y^2$ is O.

In an another preferred embodiment of the invention, the liquid-crystal forming dye of Formula IV is a dye of Formula V-B:

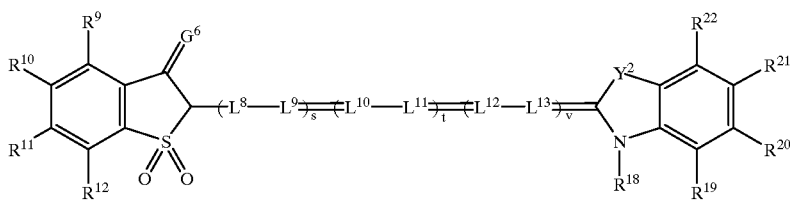

V-B wherein $G^6$ is oxygen (O) or dicyanovinyl $(C(CN)_2)$, $R^9$ to $R^{12}$ groups each individually represent groups as described above, and $R^{18}$, $R^{19}$ through $R^{22}$, $Y^2$, $L^8$ through $L^{13}$, and s, t and v are as described above, with the proviso that at least one substituent on the dye of Formula V-B is a ionic or non-ionic solubilizing group or a group with a pKa value less than 4 in water as described for Y in Formula I.

In an another preferred embodiment of the invention, the liquid-crystal forming dye of Formula I is a dye of Formula V-C:

wherein $E^2$ represents an electron-withdrawing group, preferably cyano, $R^{26}$ represents aryl, alkyl or acyl, and $Y^2$, $R^{18}$, $R^{19}$ through $R^{22}$, $L^8$ through $L^{13}$, and, s, t and v are as described above; with the proviso that at least one substituent on the dye of Formula V-D contains an ionic or non-ionic solubilizing group or a group with a pKa value less than 4 in water as described for Y in Formula I. In a preferred embodiment, E is cyano and $R^{18}$ is sulfoalkyl.

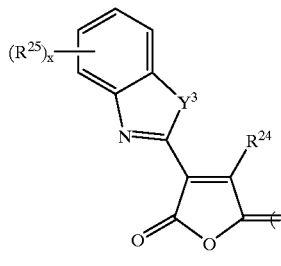

V-C wherein $R^{25}$ groups each individually represent the groups described for $R^{19}$ through $R^{22}$ above, $Y^3$ represents O, S, NRC, or CRYR, (where Rx, Ry and Rz are alkyl groups with 1-5 carbons), x is 0, 1, 2, 3 or 4, $R^{24}$ represents aryl, alkyl or $Y^2$, $R^{22}$ 813 acyl, and $R^{18}$, $R^{19}$ through $R^{22}$, $L^8$ through $L^{13}$, and, s, t and v are as described above; with the proviso that at least one substituent on the dye of Formula V-C is a ionic or non-ionic solubilizing group or a group with a pKa value less than 4 in water as described for Y in Formula I.

In a preferred embodiment $Y^2$ and $Y^3$ are O or S, $R^{18}$ is sulfoalkyl, and the sum of s, t and v is 1 or 2.

In an another preferred embodiment of the invention, the liquid-crystal forming dye of Formula I is a dye of Formula V-D:

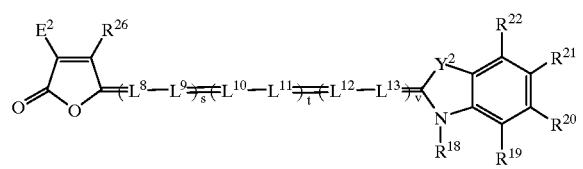

V-D

In an another preferred embodiment of the invention, the liquid-crystal forming dye of Formula I is a dye of Formula V-E:

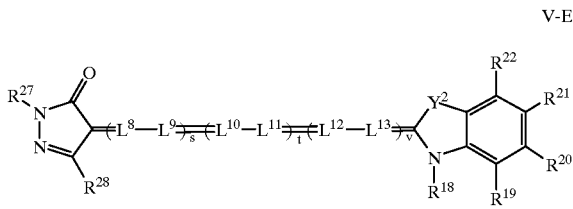

V-E wherein $R^{27}$ is a hydrogen, substituted or unsubstituted alkyl, aryl or aralkyl, $R^{28}$ is substituted or unsubstituted alkyl, aryl or aralkyl, alkoxy, amino, acyl, alkoxycarbonyl, carboxy, carboxylate, cyano, or nitro; $R^{18}$ to $R^{22}$, $L^8$ to $L^{13}$, $Y^2$, and s, t and v are as described above; with the proviso that at least one substituent on the dye of Formula V-E contains an ionic or non-ionic solubilizing group or a group with a pKa value less than 4 in water as described for Y in Formula I. In a preferred embodiment, $R^{27}$ is an aryl group, and the sum of s, t and v is 1 or 2.

In an another preferred embodiment of the invention, the liquid-crystal forming dye of Formula I is a dye of Formula V-F:

V-F

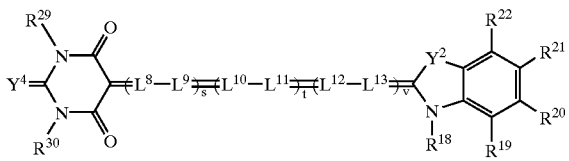

wherein $R^{29}$ and $R^{30}$ are each independently a hydrogen, substituted or unsubstituted alkyl, aryl or aralkyl, $Y^4$ is O or S, $R^{18}$ to $R^{22}$, $L^8$ to $L^{13}$, $Y^2$ and s, t and v are as described above; with the proviso that at least one substituent on the dye of Formula V-F contains an ionic or non-ionic solubilizing group or a group with a pKa value less than 4 in water as described for Y in Formula I. In a preferred embodiment the sum of s, t and v is 1 or 2.

In an another preferred embodiment of the invention, the liquid-crystal forming dye of Formula I is a dye of Formula VI:

Formula VI

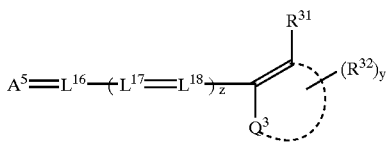

wherein $A^5$ is a ketomethylene or activated methylene, $L^{16}$ through $L^{18}$ are substituted or unsubstituted methine, $R^{31}$ is alkyl, aryl or aralkyl, $Q^3$ represents the non-metallic atoms necessary to complete a substituted or unsubstituted ring system containing at least one 5- or 6-membered heterocyclic nucleus, $R^{32}$ represents groups as described above for $R^{19}$ to $R^{22}$, y is 0, 1, 2, 3 or 4, z is 0, 1 or 2; with the proviso that at least one substituent on the dye of Formula VI contains an ionic or non-ionic solubilizing group or a group with a pKa value less than 4 in water as described for Y in Formula I.

In an another preferred embodiment of the invention, the liquid-crystal forming dye of Formula VI is a dye of Formula VII:

Formula VII

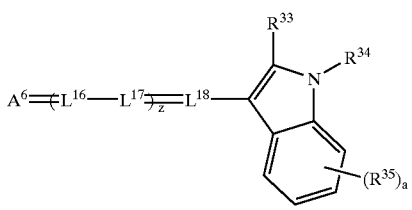

wherein $A^6$ is a ketomethylene or activated methylene, $L^{16}$ through $L^{18}$ are methine groups as described above for $L^1$ through $L^7$, $R^{33}$ is substituted or unsubstituted alkyl, aryl or aralkyl, $R^{34}$ is substituted or unsubstituted aryl, alkyl or aralkyl, $R^{35}$ groups each independently represent groups as described for $R^{19}$ through $R^{22}$, z is 0, 1 or 2, and a is 0, 1, 2, 3 or 4; with the proviso that at least one substituent on the dye of Formula VII contains an ionic or non-ionic solubilizing group or a group with a pKa value less than 4 in water as described for Y in Formula I.

In an another preferred embodiment of the invention, the liquid-crystal forming dye of Formula I is a dye of Formula VIII:

Formula VIII

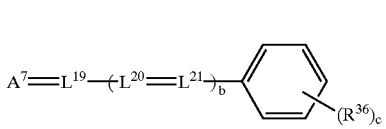

wherein $A^7$ represents a ketomethylene or activated methylene moiety, $L^{19}$ through $L^{21}$ represent methine groups as described above for $L^1$ through $L^7$, $R^{36}$ groups each individually represent the groups as described above for $R^{19}$ through $R^{22}$, b represents 0 or 1, and c represents 0, 1, 2, 3 or 4; with the proviso that at least one substituent on the dye of Formula VIII is a ionic or non-ionic solubilizing group or a group with a pKa value less than 4 in water as described for Y in Formula I.

In an another preferred embodiment of the invention, the liquid-crystal forming dye of Formula I is a dye of Formula IX:

Formula IX $$A^8=L^{19}-(L^{20}=L^{21})_b\text{—Ar}(R^{39})_d\text{—N}\begin{smallmatrix}R^{37}\\R^{38}\end{smallmatrix}$$

wherein $A^8$ is a ketomethylene or activated methylene, $L^{19}$ through $L^{21}$ and b are as described above, $R^{39}$ groups each individually represent the groups as described above for $R^{19}$ through $R^{22}$, and $R^{37}$ and $R^{38}$ each individually represent the groups as described for $R^{18}$ above, and d represents 0, 1, 2, 3 or 4; with the proviso that at least one substituent on the dye of Formula IX is a ionic or non-ionic solubilizing group or a group with a pKa value less than 4 in water as described for Y in Formula I.

In an another preferred embodiment of the invention, the liquid-crystal forming dye of Formula I is a dye of Formula X:

Formula X $$A^9=L^{22}-(L^{23}=L^{24})_e\text{—coumarin}(R^{40})_f$$

wherein $A^9$ is a ketomethylene or activated methylene moiety, $L^{22}$ through $L^{24}$ are methine groups as described above for $L^1$ through $L^7$, e is 0 or 1, $R^{40}$ groups each individually represent the groups described above for $R^{19}$ through $R^{22}$, and f is 0, 1, 2, 3 or 4; with the proviso that at least one substituent on the dye of Formula X contains an ionic or non-ionic solubilizing group or a group with a pKa value less than 4 in water as described for Y in Formula I.

In an another preferred embodiment of the invention, the liquid-crystal forming dye of Formula I is a dye of Formula XI:

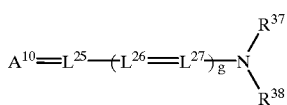

Formula XI wherein $A^{10}$ is a ketomethylene or activated methylene moiety, $L^{25}$ through $L^{27}$ are methine groups as described above for $L^1$ through $L^7$, g is 0, 1 or 2, and $R^{37}$ and $R^{38}$ each individually represent the groups described above for $R^{18}$; with the proviso that at least one substituent on the dye of Formula XI contains an ionic or non-ionic solubilizing group or a group with a pKa value less than 4 in water as described for Y in Formula I.

In an another preferred embodiment of the invention, the liquid-crystal forming dye of Formula I is a dye of Formula XII:

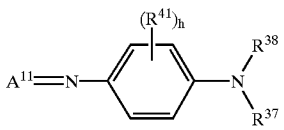

Formula XII wherein $A^{11}$ is a ketomethylene or activated methylene moiety, $R^{41}$ groups each individually represent the groups described above for $R^{19}$ through $R^{22}$, $R^{37}$ and $R^{38}$ each represent the groups described for $R^{18}$, and h is 0, 1, 2, 3, or 4; with the proviso that at least one substituent on the dye of Formula XII contains an ionic or non-ionic solubilizing group or a group with a pKa value less than 4 in water as described for Y in Formula I.

In an another preferred embodiment of the invention, the liquid-crystal forming dye of Formula I is a dye of Formula XIII:

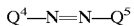

Formula XIII wherein $Q^4$ and $Q^5$ each represents the atoms necessary to form at least one heterocyclic or carbocyclic, fused or unfused 5 or 6-membered-ring conjugated with the azo linkage; with the proviso that at least one substituent on the dye of Formula XIII contains an ionic or non-ionic solubilizing group or a group with a pKa value less than 4 in water as described for Y in Formula I. Still another preferred embodiment of the invention comprises an imaging element containing at least one liquid crystal-forming dye of structural Formulae I–XIII.

Still another preferred embodiment of the invention comprises a radiation-sensitive element, such as a photographic element, containing a liquid-crystal forming dye of structural Formulae I–XIII.

In Formulae II, IV, and VI–XII, activated methylene or ketometylene moieties represented by Al through All are well known in the art and are described, for example, in Hamer, *The Cyanine Dyes and Related Compounds*, pages 469–494 and 595–604. In accordance with the present invention, preferred active methylene groups include, but are not restricted to those derived from benzoylacetonitrile, 2-pyrazolin-5-one, pyrazolidindione, tricyanopropene, barbituric acid, indanedione, dicyanovinylindanedione, bis(dicyanovinyl)indanedione, pyrrolinone, furanone (such as cyanophenylfuranone and derivatives) benzothiophene dioxide, dicyanovinylbenzothiophene dioxide, rhodanine, benzofuranone, chromandione, cyclohexanedione, isoxazolinone, pyrazolopyridine, pyridone and pyrandione, and any of these moieties may be optionally substituted with ionic or non-ionic solubilizing group(s) or an ionizable group with a pKa value less than 4 in water.

In Formulae II and III, $M^+$ is a cation such as $H^+$, $Et_3NH^+$, $C_5H_5NH^+$, $Na^+$, and $K^+$. "Group" wherever used in the present application includes the possibility of being substituted or unsubstituted. $R^2$, $R^4$, El and $E^2$ are electron-withdrawing substituents which are discussed in March, *Advanced Organic Chemistry*, pages 20–21, 228–229, 386–387 and 494–497. Groups for $R^2$, $R^4$, $E^1$ and $E^2$ may include cyano, acyl, benzoyl, phenacyl, aminocarbonyl, alkoxycarbonyl, aryl, nitro or arylsulfonyl or alkylsulfonyl.

The solubilizing group contained in Y may be chosen easily by one skilled in the art. Examples of ionic solubilizing groups include anionic groups such as carboxylate ($CO_2^-$), sulfo ($SO_3^-$), sulfato ($OSO_3^-$), sulfonate ($SO_4^-$), hydroxylate ($O^-$), enolate ($C=C-O^-$), dicyanovinylate ($C=C-C(CN)_2^-$), phosphate, and phosphonate, cationic groups such as ammonium, alkylammonium, dialkylamnnonium, trialkylammonium (alkyls may be substituted), and pyridinium, and zwitterionic groups such as amino acids, phosphatidyl choline, phosphatidyl ethanolamine, and phosphatidyl serine. Examples of non-ionic solubilizing groups contained in Y include alkyl ethers such as ($-O(CH_2)_nOCH_3$ or ($CH_2OCH_2OCH_3$). Y may also contain an ionizable group with a pKa in water less than 4. Examples of ionizable groups with pKa values below 4 in water include sulfonic acid ($SO_3H$), acylsulfomido ($CONHSO_2R$), saccarhin (cyclic acylsulfonamide), sulfonylsulfonamido ($SO_2NHSO_2R$), dinitroalkyl, dinitrophenol, and activated carboxy moieties such as dichloroalkylcarboxy, and salicylic acid. In all structural descriptions, Y may be either an ionic or nonionic solubilizing group or group with a pKa value below 4, or Y may be a group containing one of these said solubilzing moeities.

The substituent pairs of $R^{37}$ and $R^{38}$, may together represent the non-metallic atoms required to form a 5- or 6-membered ring. $Q^1$ and $Q^2$ may represent the non-metallic atoms required to form at least one 5- or 6-membered aromatic ring. Examples of these fused rings include pyridine, benzene, furan, pyrrole and indole. The groups formed by $Q^4$ and $Q^5$ include 5 or 6-membered, fused or unfused, aromatic or heteroaromatic rings including pyridine, pyrazole, pyrrole, furan, indole, thiophene or fused ring systems such as benzindole and benzoxazole.

The atoms represented by $Z^1$ can complete a 5- or 6-membered heterocyclic nucleus which can be fused with additional substituted or unsubstituted rings such as a benzo ring. Suitable heterocyclic nuclei are of the type commonly used in senstizing dyes and are well known in the art. Many, for example, are described in Mees and James, *Theory of The Photographic Process*, $4_{th}$ edition, pages 195–203. Useful heterocyclic nuclei include thiazole, selenazole, oxazole, telerozole, imidazole, indole, benzoxazole, benzothiazole, benzimidazole or benzindole. In a preferred embodiment, $Z^1$ represents the atoms necessary to complete a substituted or unsubstituted benzoxazole, benzothiazole, benzimidazole or benzindole nucleus.

Any L group may be substituted or unsubstituted. This includes the possibility that any of them may be members of a 5 or 6-memebered ring.

In Formulae IV and V preferred substituents for $R^{19}$–$R^{22}$ include groups such as phenyl, benzo (fused phenyl), halogen (especially chloro, fluoro, bromo), and pyrrole.

Methine groups may be substituted with, for example, an alkyl, alkenyl, aryl, aralkyl, cycloalkyl, or heterocyclic group or, as mentioned above, if more than one of p, q, or r is 1, two or more methine groups together with their substituents may form a 5- or 6-membered carbocyclic or heterocyllic ring.

In general, when reference in this application is made to a particular moiety or group it is to be understood that such reference encompasses that moiety whether unsubstituted or substituted with one or more substituents (up to the maximum possible number). For example, "alkyl" or "alkyl group" refers to a substituted or unsubstituted alkyl, while "benzene group" refers to a substituted or unsubstituted benzene (with up to six substituents). Generally, unless otherwise specifically stated, substituent groups usable on molecules herein include any groups, whether substituted or unsubstituted, which do not destroy properties necessary for the photographic utility. Examples of substituents on any of the mentioned groups can include known substituents, such as: halogen, for example, chloro, fluoro, bromo, iodo; hydroxy; alkoxy, particularly those "lower alkyl" (that is, with 1 to 6 carbon atoms, for example, methoxy, ethoxy; substituted or unsubstituted alkyl, particularly lower alkyl (for example, methyl, trifluoromethyl); thioalkyl (for example, methylthio or ethylthio), particularly either of those with 1 to 6 carbon atoms; substituted or unsubstituted alkenyl, preferably of 2 to 10 carbon atoms (for example, ethenyl, propenyl, or butenyl); substituted and unsubstituted aryl, particularly those having from 6 to 20 carbon atoms (for example, phenyl); and substituted or unsubstituted heteroaryl, particularly those having a 5 or 6-membered ring containing 1 to 3 heteroatoms selected from N, O, or S (for example, pyridyl, thienyl, furyl, pyrrolyl); acid or acid salt groups such as any of those described below; hydroxylate, amino, alkylamino, cyano, nitro, carboxy, carboxylate, acyl, alkoxycarbonyl, aminocarbonyl, sulfonamido, sulfamoyl, sulfo, sulfonate, alkylammonium, and an ionizable group with a pKa value below 4 in water; and others known in the art. Alkyl substituents may specifically include "lower alkyl" (that is, having 1–6 carbon atoms), for example, methyl, ethyl, and the like. Further, with regard to any alkyl group or alkylene group, it will be understood that these can be branched or unbranched and include ring structures. Examples of preferred dyes of the invention are listed below.

TABLE 1

| Dye | $R^2$ | $R^3$ | $R^4$ | $R^5$ | $M^+$ |
|---|---|---|---|---|---|
| 1-1 | H | H | Cl | H | H |
| 1-1A | H | H | Cl | H | TEAH |
| 1-2 | H | H | F | H | H |
| 1-2A | H | H | F | H | TEAH |
| 1-3 | H | OMe | H | H | H |
| 1-4 | Cl | H | H | Cl | TEAH |
| 1-5 | H | Me | H | H | TEAH |
| 1-6 | Me | H | H | H | H |
| 1-7 | H | H | Ph | H | TEAH |
| 1-7A | H | H | Ph | H | Na |
| 1-8 | H | Cl | H | H | H |
| 1-9 | H | Ac | H | H | H |
| 1-10 | H | Ac | Cl | H | Pyr |
| 1-11 | H | OH | H | H | H |
| 1-12 | H | H | OH | H | TEAH |
| 1-13 | H | H | Br | H | Pyr |
| 1-14 | H | OMe | Cl | H | TEAH |
| 1-15 | H | H | H | F | H |

TABLE 1-continued

| Dye | $R^2$ | $R^3$ | $R^4$ | $R^5$ | $M^+$ |
|---|---|---|---|---|---|
| 1-16 | H | NHAc | H | H | H |
| 1-17 | H | Cl | Me | H | TEAH |
| 1-17A | H | Cl | Me | H | H |
| 1-18 | H | H | COONa | H | Na |
| 1-19 | H | Me | H | H | Pyr |
| 1-20 | H | OH | OH | H | H |

Dye 1-21

Dye 1-22

Dye 1-23

Dye 1-24

Dye 1-25

TABLE 2

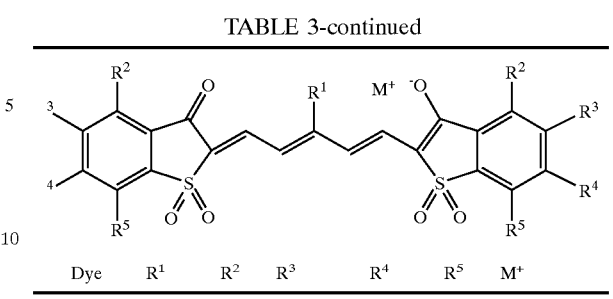

| Dye | R¹ | R² | R³ | R⁴ | R⁵ | M⁺ |
|---|---|---|---|---|---|---|
| 2-1 | H | H | H | Cl | H | H |
| 2-1A | H | H | H | Cl | H | TEAH |
| 2-2 | H | Me | H | F | H | TEAH |
| 2-3 | H | H | OMe | H | H | H |
| 2-4 | H | H | Me | H | H | H |
| 2-5 | H | H | H | H | Cl | H |
| 2-6 | H | H | OMe | OMe | H | H |
| 2-7 | H | H | H | Ph | H | Na |
| 2-8 | H | H | Cl | H | H | H |
| 2-9 | H | H | Ac | H | H | H |
| 2-10 | H | H | H | COONa | H | Na |
| 2-11 | Me | H | H | Cl | H | TEAH |
| 2-11A | Me | H | H | Cl | H | H |
| 2-12 | H | H | Me | H | H | TEAH |
| 2-13 | Me | H | Me | H | H | TEAH |
| 2-14 | H | H | OH | H | H | H |
| 2-15 | H | H | H | OH | H | TEAH |

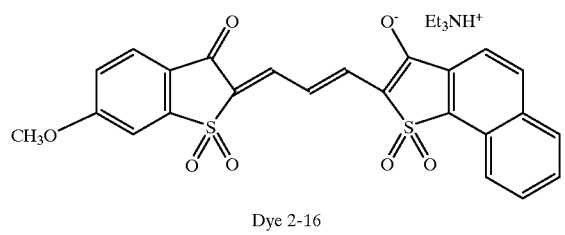

Dye 2-16

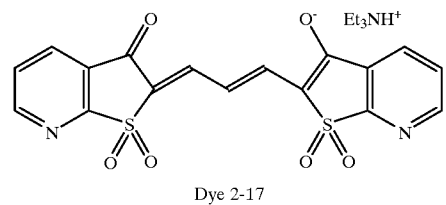

Dye 2-17

TABLE 3

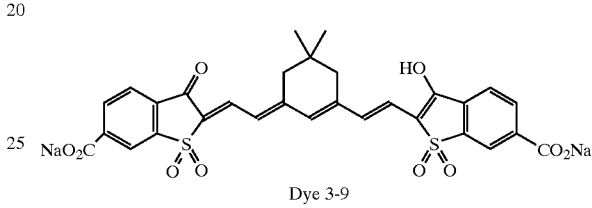

| Dye | R¹ | R² | R³ | R⁴ | R⁵ | M⁺ |
|---|---|---|---|---|---|---|
| 3-1 | Me | H | OMe | OMe | H | H |
| 3-1A | Me | H | OMe | OMe | H | TEAH |
| 3-2 | H | H | H | Cl | H | H |
| 3-3 | H | H | OH | H | H | TEAH |
| 3-4 | Me | H | OH | H | H | TEAH |
| 3-5 | Et | H | H | OMe | H | H |
| 3-6 | Me | H | H | Ph | H | Na |
| 3-7 | Me | H | H | F | H | TEAH |

TABLE 3-continued

| Dye | R¹ | R² | R³ | R⁴ | R⁵ | M⁺ |
|---|---|---|---|---|---|---|

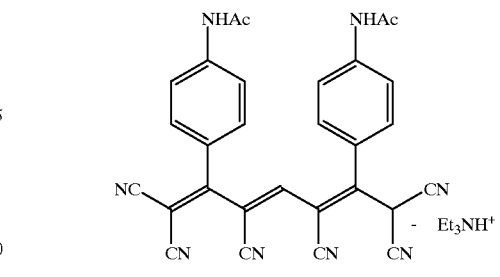

Dye 3-8

Dye 3-9

TABLE 4

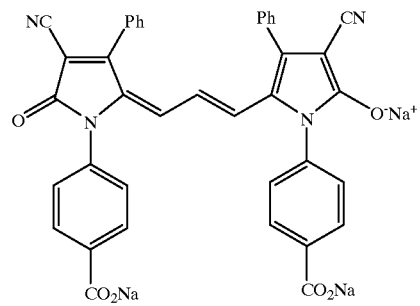

Dye 4-1

Dye 4-2

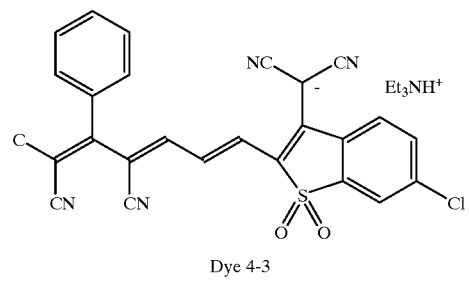

Dye 4-3

TABLE 5

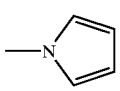

| Dye | R¹ | R² | R³ | R⁴ | R⁵ | R⁶ | M⁺/X⁻ | Y |
|---|---|---|---|---|---|---|---|---|
| 5-1 | Ph | sp⁻ | H | H | H | H | Na⁺ | O |
| 5-2 | Ph | sp⁻ | H | Cl | H | H | Na⁺ | O |
| 5-3 | Ph | sp⁻ | H | Ph | H | H | Na⁺ | O |
| 5-4 | (p-NHSO2Me)—Ph | sp⁻ | H | Cl | H | H | Na⁺ | O |
| 5-5 | Ph | sp⁻ | H | 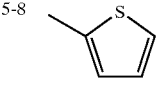 | H | H | Et₃NH⁺ | O |
| 5-6 | (p-CO₂M)—Ph | sp⁻ | H | Ph | H | H | Na | O |
| 5-7 | Ph | sp⁻ | R³–R⁴ = benzo | | H | H | Na⁺ | O |
| 5-8 | 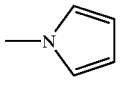 | sp⁻ | H | H | H | H | Na⁺ | O |
| 5-9 | Ph | sp⁻ | H | R⁴–R⁵ = benzo | | H | Na⁺ | O |
| 5-10 | p-NHSO2Me)—Ph | sp⁻ | H | 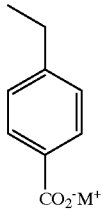 | H | H | Et₃NH⁺ | O |
| 5-11 | Ph | | H | H | H | H | Na⁺ | O |
| 5-12 | Ph | Me | H | SO₃⁻ | H | H | Pyr⁺ | O |
| 5-13 | (p-Cl)—Ph | sp⁻ | H | Cl | H | H | Na⁺ | S |
| 5-14 | (p-Cl)—Ph | sp⁻ | H | Ph | H | H | Et₃NH⁺ | O |
| 5-15 | Ph | sp⁻ | H | Cl | H | H | Et₃NH⁺ | S |
| 5-16 | (p-CO₂M)—Ph | sp⁻ | R³–R⁴ = benzo | | H | H | Na⁺ | S |
| 5-17 | Ph | sp⁻ | H | Ph | H | H | Na⁺ | O |
| 5-18 | Ph | sp⁻ | H | Me | H | H | Na⁺ | O |
| 5-19 | (p-Cl)—Ph | sp⁻ | H | Cl | H | H | Pyr⁺ | O |
| 5-20 | (m-OMe)—Ph | sp⁻ | H | Ph | H | H | Et₃NH⁺ | O |
| 5-21 | Ph | tmap⁺ | H | Ph | H | H | Br⁻ | O |
| 5-22 | Ph | tmap⁺ | H | Cl | H | H | Br⁻ | O |
| 5-23 | Ph | tmap⁺ | H | Ph | H | H | Br⁻ | O |
| 5-24 | Ph | 3-sb⁻ | H | Ph | H | H | Et₃NH⁺ | O |
| 5-25 | (p-NHAc)—Ph | sp⁻ | R³–R⁴ = benzo | | H | H | Et₃NH⁺ | S |
| 5-26 | Ph | tmap⁺ | H | Cl | H | H | pTs⁻ | S |
| 5-27 | Ph | 3-sb⁻ | H | R⁴–R⁵ = benzo | | H | Et₃NH⁺ | S | sp⁻ = sulfopropyl

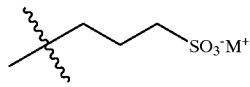

TABLE 5-continued

[Structure diagram with R¹, R², R³, R⁴, R⁵, R⁶, Y, CN groups]

| Dye | R¹ | R² | R³ | R⁴ | R⁵ | R⁶ | M⁺/X⁻ | Y |
| --- | --- | --- | --- | --- | --- | --- | --- | --- | tmap⁺ = trimethylammonium propyl

[Structure: -CH(CH₃)-(CH₂)₃-N(Me)₃⁺X⁻]

3sb⁻ = 3-sulfobutyl

[Structure: -CH(CH₃)-(CH₂)₂-CH(Me)-SO₃⁻M⁺]

cb⁻ = carboxylbenzyl

[Structure: -CH(CH₃)-CH₂-C₆H₄-CO₂⁻M⁺]

Dye 5-28

Dye 5-29

TABLE 5-continued
| Dye | R¹ | R² | R³ | R⁴ | R⁵ | R⁶ | M⁺/X⁻ | Y |
|-----|----|----|----|----|----|----|-------|---|
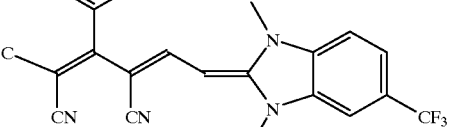
Dye 5-30
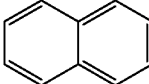
Dye 5-31
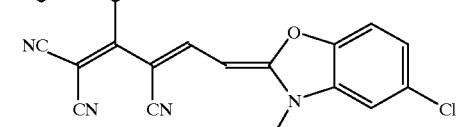
Dye 5-32

TABLE 5-continued
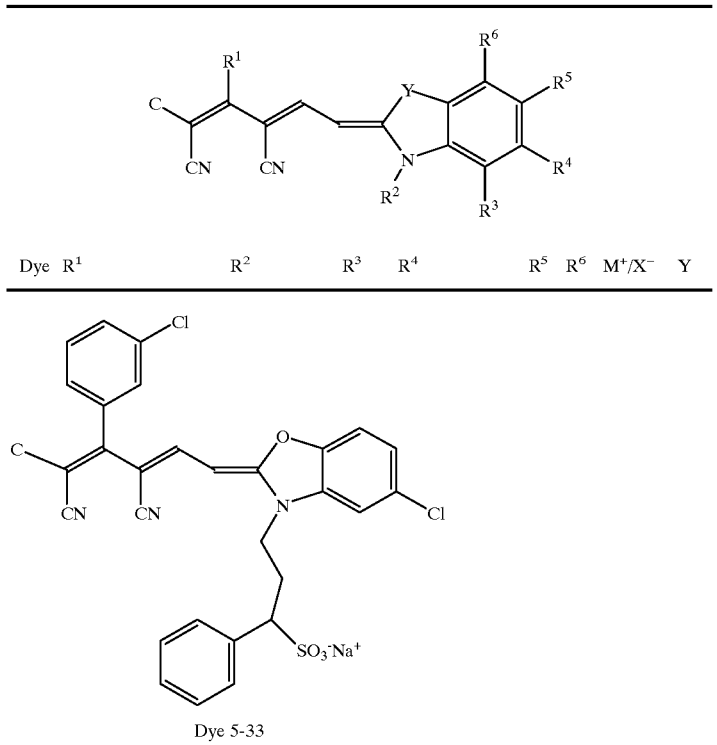
| Dye | R¹ | R² | R³ | R⁴ | R⁵ | R⁶ | M⁺/X⁻ | Y |
|---|---|---|---|---|---|---|---|---|
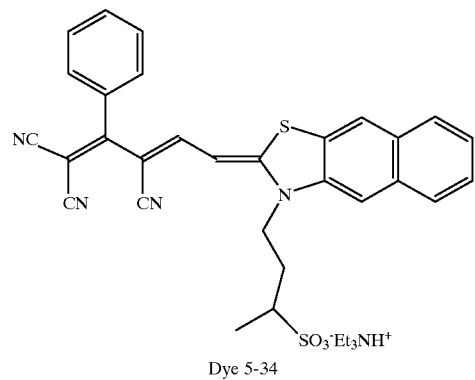
Dye 5-33
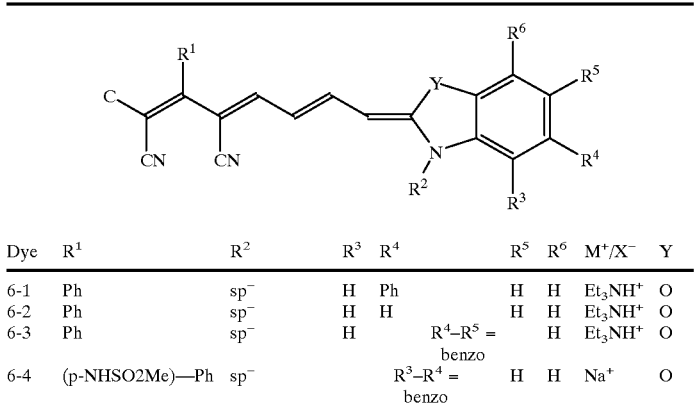
Dye 5-34
TABLE 6
| Dye | R¹ | R² | R³ | R⁴ | R⁵ | R⁶ | M⁺/X⁻ | Y |
|---|---|---|---|---|---|---|---|---|
| 6-1 | Ph | sp⁻ | H | Ph | H | H | Et₃NH⁺ | O |
| 6-2 | Ph | sp⁻ | H | H | H | H | Et₃NH⁺ | O |
| 6-3 | Ph | sp⁻ | H | R⁴–R⁵ = benzo | | H | Et₃NH⁺ | O |
| 6-4 | (p-NHSO2Me)—Ph | sp⁻ | R³–R⁴ = benzo | | H | H | Na⁺ | O |

TABLE 6-continued

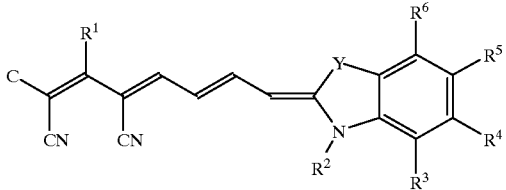

| Dye | R¹ | R² | R³ | R⁴ | R⁵ | R⁶ | M⁺/X⁻ | Y |
|---|---|---|---|---|---|---|---|---|
| 6-5 | 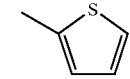 | sp⁻ | H | H | H | H | Et$_3$NH⁺ | O |
| 6-6 | Ph | sp⁻ | H | Ph | H | H | Na | S |
| 6-7 | Ph | sp⁻ | H | Cl | H | H | Et$_3$NH⁺ | S |
| 6-8 | (p-CO$_2$M)—Ph | sp⁻ | H | R⁴–R⁵ = benzo | | H | Na⁺ | S |
| 6-9 | (p-Cl)—Ph | sp⁻ | H | Ph | H | H | Na⁺ | O |
| 6-10 | (p-NHSO2Me)—Ph | sp⁻ | H | Cl | H | H | Et$_3$NH⁺ | S |
| 6-11 | Ph | Et | H | SO$_3^-$ | H | H | Na⁺ | O |
| 6-12 | Ph | sp⁻ | H | Cl | H | H | Et$_3$NH⁺ | O |
| 6-13 | Ph | sp⁻ | R³–R⁴ = benzo | | H | H | Et$_3$NH⁺ | O |
| 6-14 | Ph | 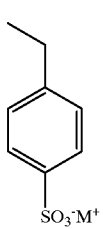 | H | H | H | H | Et$_3$NH⁺ | O |
| 6-15 | Ph | 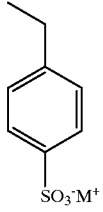 | H | Cl | H | H | Et$_3$NH⁺ | O |
| 6-16 | (p-Cl)—Ph | sp⁻ | H | 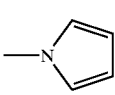 | H | H | Pyr⁺ | O |
| 6-17 | 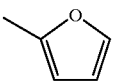 | sp⁻ | H | Cl | H | H | Na⁺ | O |
| 6-18 | Ph | tmap⁺ | H | H | H | H | Br⁻ | O |
| 6-19 | Ph | tmap⁺ | H | Cl | H | H | Br⁻ | O |
| 6-20 | Ph | tmap⁺ | H | Ph | H | H | Br⁻ | O |
| 6-21 | (p-CO2M)—Ph | sb⁻ | H | Ph | H | H | Na+ | O |
| 6-22 | Ph | tmap⁺ | R³–R⁴ = benzo | | H | H | Br⁻ | O |
| 6-23 | Ph | tmap⁺ | H | R⁴–R⁵ = benzo | | H | Br⁻ | S |

TABLE 6-continued

[Structure: general dye skeleton with substituents R¹, R², R³, R⁴, R⁵, R⁶ and Y]

| Dye | R¹ | R² | R³ | R⁴ | R⁵ | R⁶ | M⁺/X⁻ | Y |
|-----|----|----|----|----|----|----|-------|---|

Dye 6-24

Dye 6-25

Dye 6-26

TABLE 6-continued
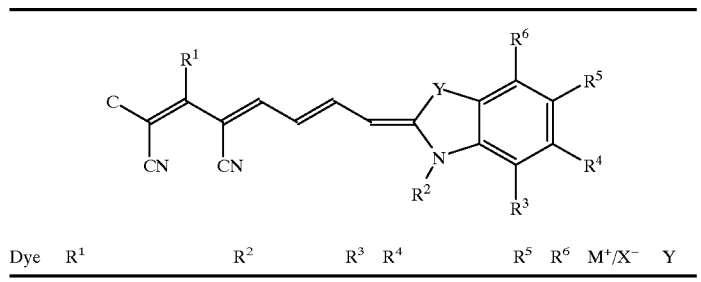
Dye  R¹  R²  R³  R⁴  R⁵  R⁶  M⁺/X⁻  Y
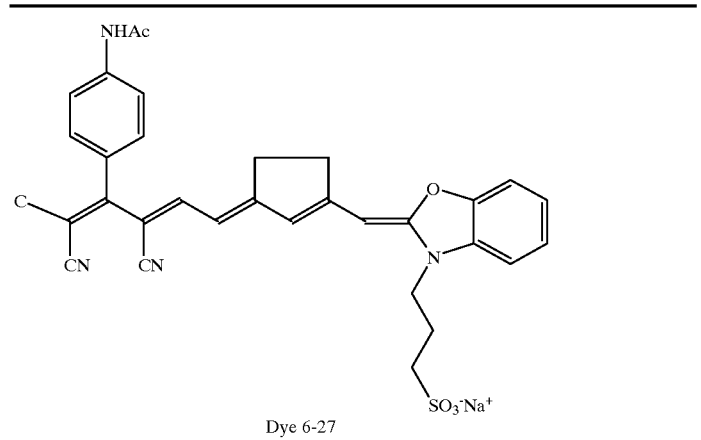
Dye 6-27
TABLE 7
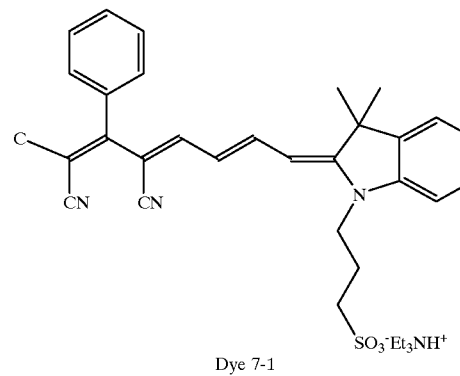
Dye 7-1
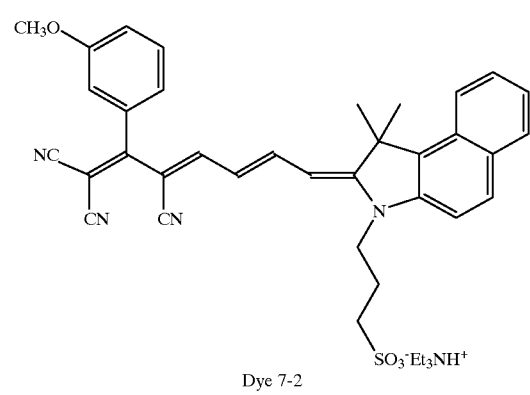
Dye 7-2
TABLE 7-continued
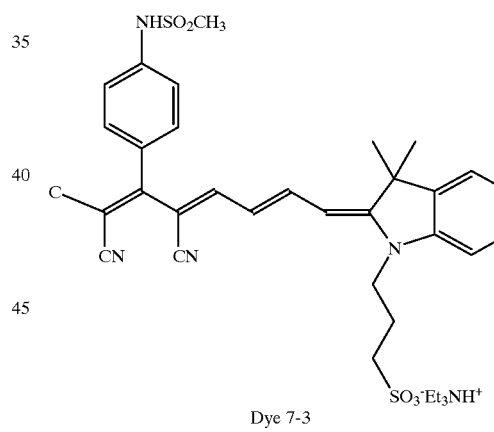
Dye 7-3
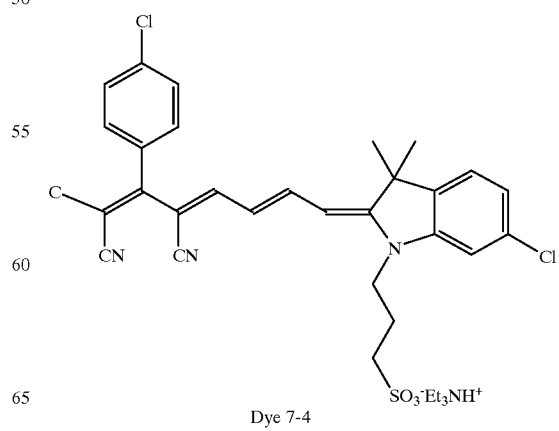
Dye 7-4

TABLE 7-continued
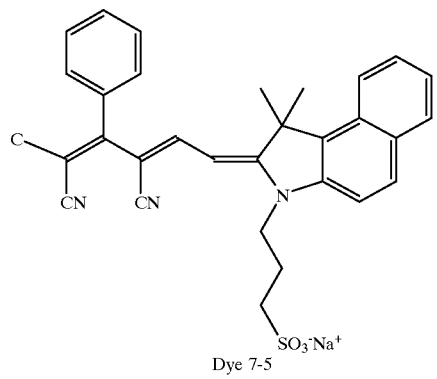
Dye 7-5
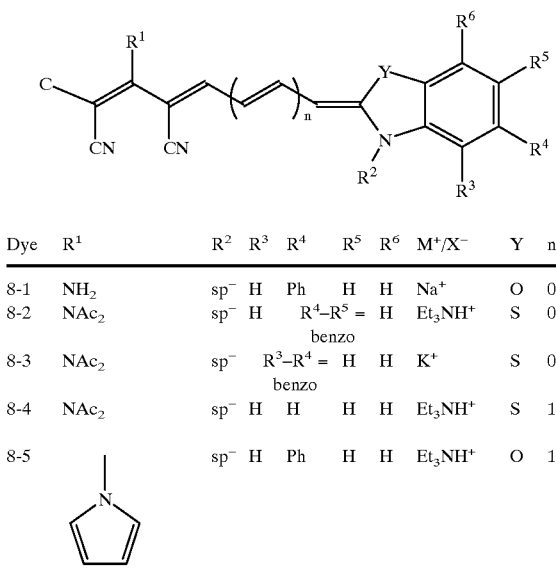
Dye 7-6
TABLE 8
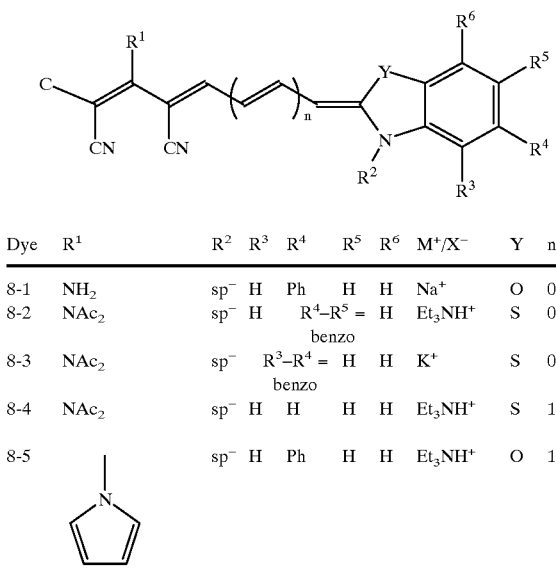
| Dye | R¹ | R² | R³ | R⁴ | R⁵ | R⁶ | M⁺/X⁻ | Y | n |
|---|---|---|---|---|---|---|---|---|---|
| 8-1 | NH$_2$ | sp⁻ | H | Ph | H | H | Na⁺ | O | 0 |
| 8-2 | NAc$_2$ | sp⁻ | H | R⁴–R⁵ = benzo | | H | Et$_3$NH⁺ | S | 0 |
| 8-3 | NAc$_2$ | sp⁻ | R³–R⁴ = benzo | | H | H | K⁺ | S | 0 |
| 8-4 | NAc$_2$ | sp⁻ | H | H | H | H | Et$_3$NH⁺ | S | 1 |
| 8-5 | N-methylpyrrole | sp⁻ | H | Ph | H | H | Et$_3$NH⁺ | O | 1 |
| 8-6 | NAc$_2$ | sp⁻ | H | Ph | H | H | Na | O | 1 |
| 8-7 | NAc$_2$ | sp⁻ | H | H | R⁵–R⁶ = benzo | | Na⁺ | S | 1 |
| 8-8 | NHPh | sp⁻ | H | R⁴–R⁵ = benzo | | H | Na⁺ | S | 1 |
| 8-9 | (p-Cl)—NHPh | sp⁻ | H | Ph | H | H | Na⁺ | O | 0 |
| 8-10 | NH$_2$ | sp⁻ | H | H | H | H | Et$_3$NH⁺ | S | 1 |
TABLE 9
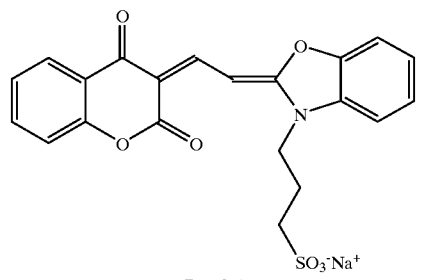
Dye 9-1
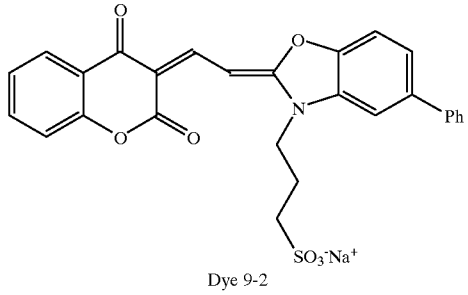
Dye 9-2
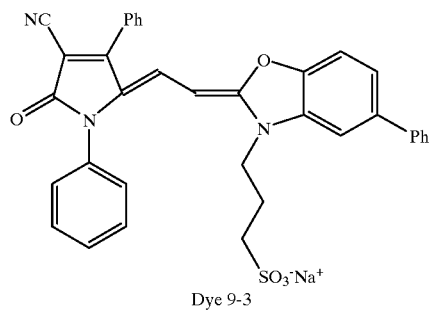
Dye 9-3
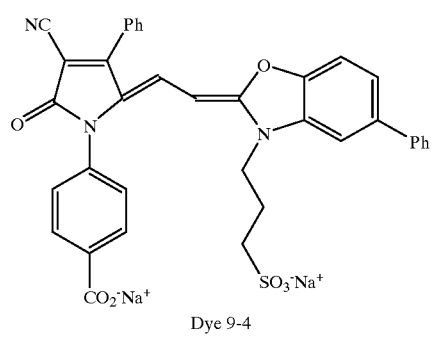
Dye 9-4
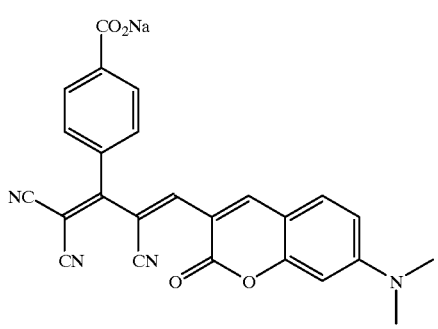
Dye 9-5

TABLE 10
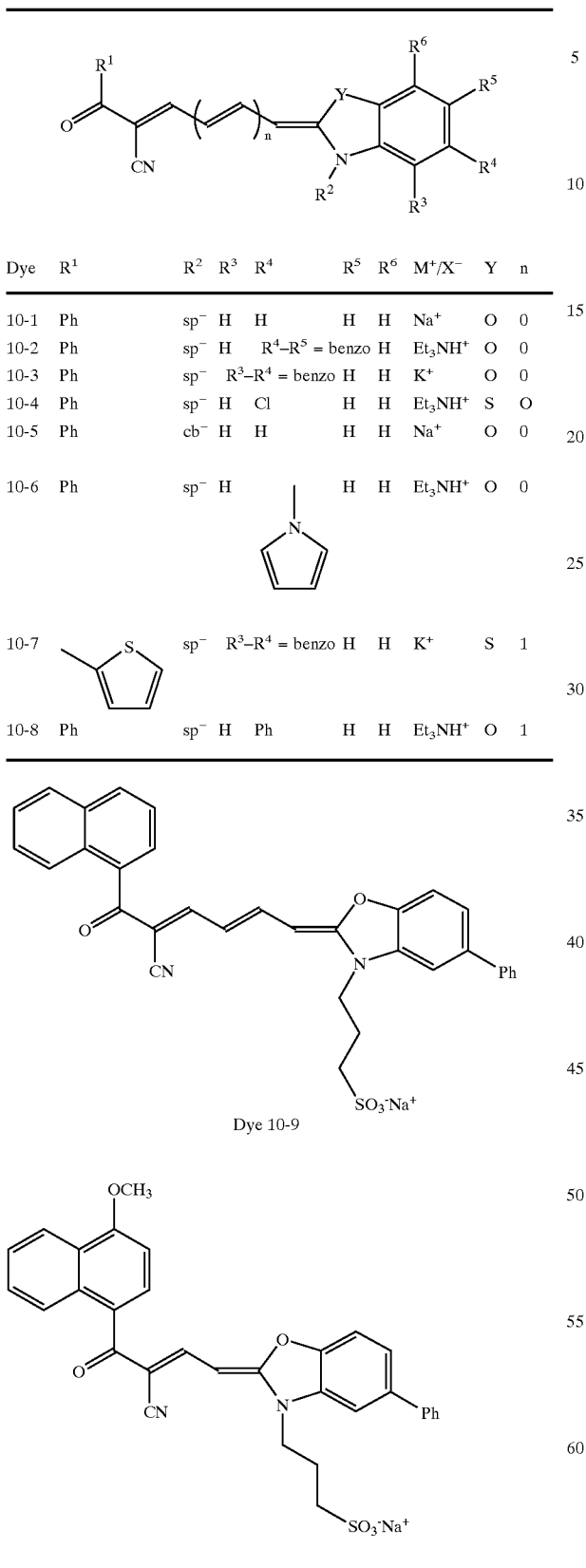
TABLE 11
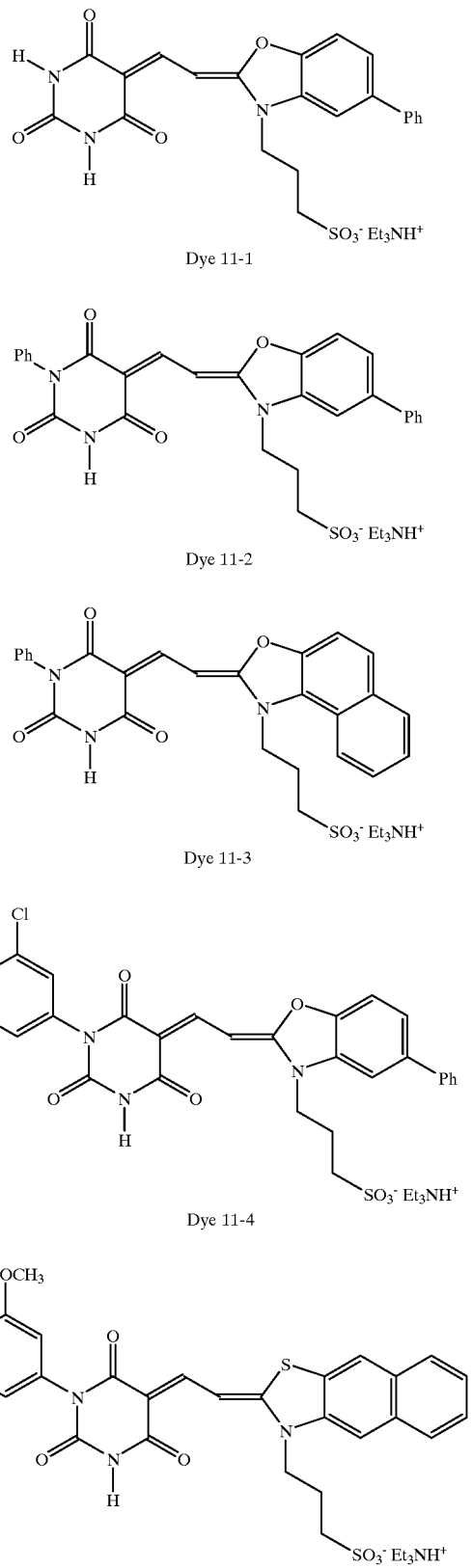

TABLE 11-continued
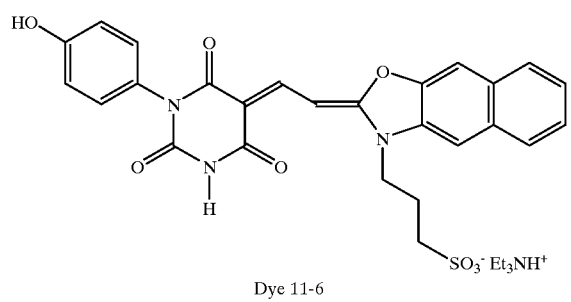
Dye 11-6
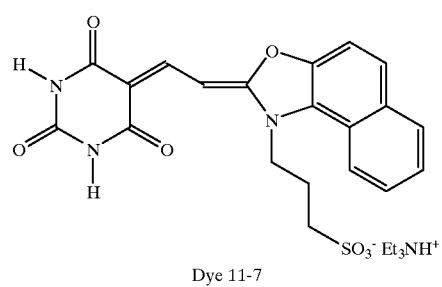
Dye 11-7
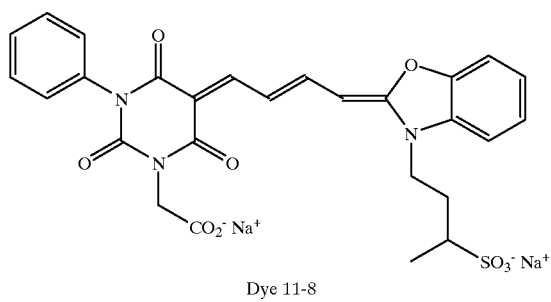
Dye 11-8
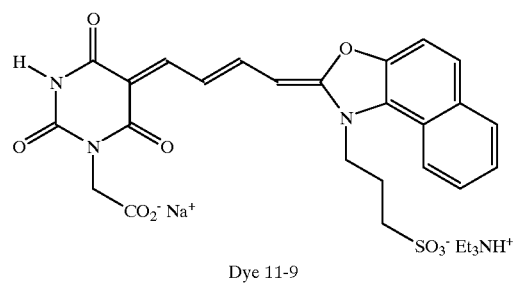
Dye 11-9
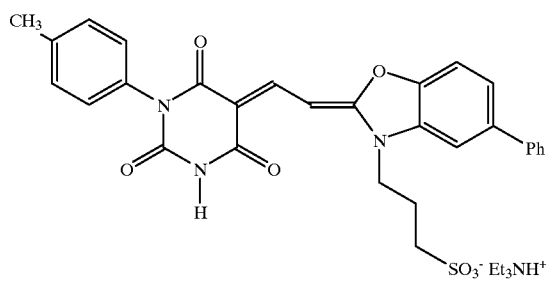
Dye 11-10
TABLE 11-continued
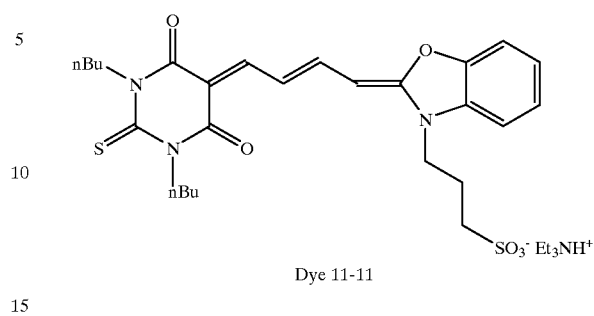
Dye 11-11
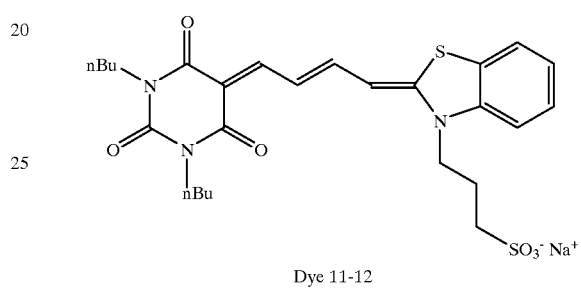
Dye 11-12
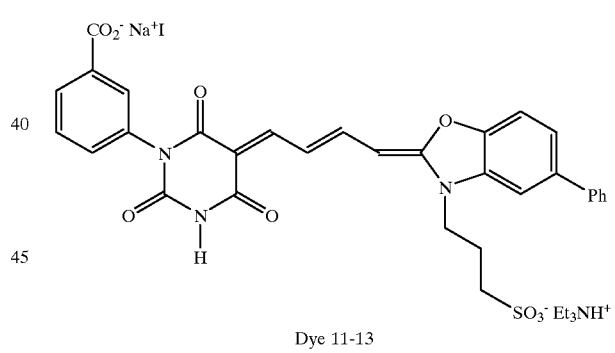
Dye 11-13
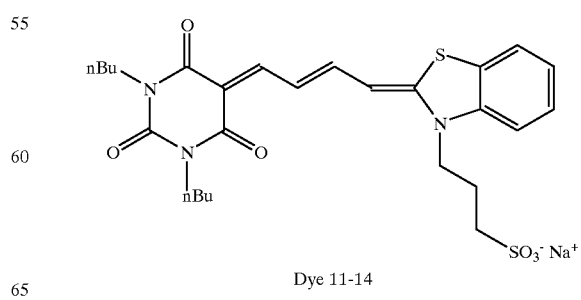
Dye 11-14

TABLE 12
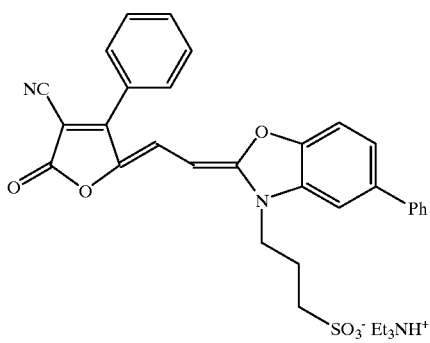
Dye 12-1
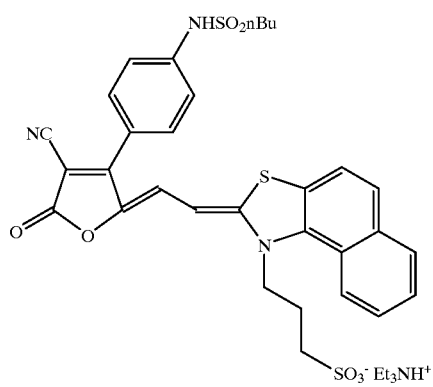
Dye 12-2
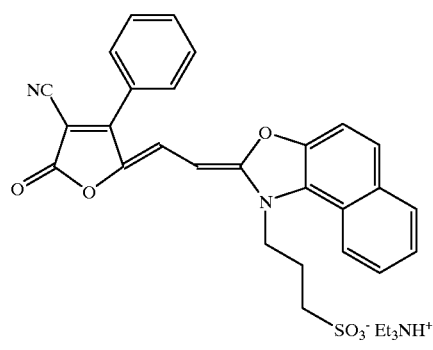
Dye 12-3
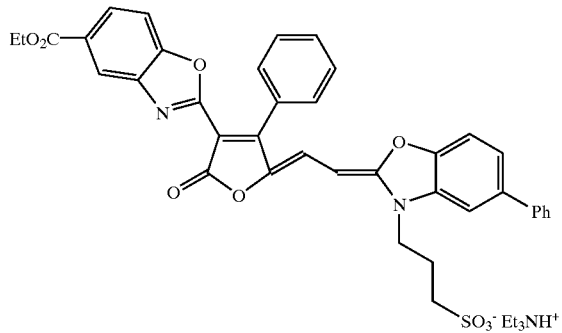
Dye 12-4
TABLE 12-continued
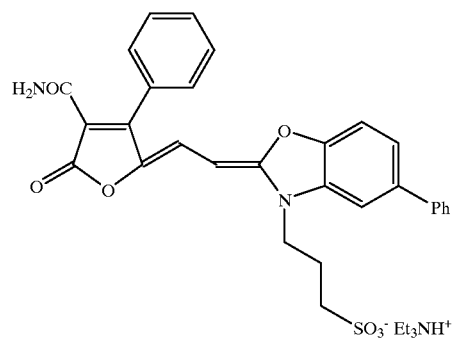
Dye 12-5
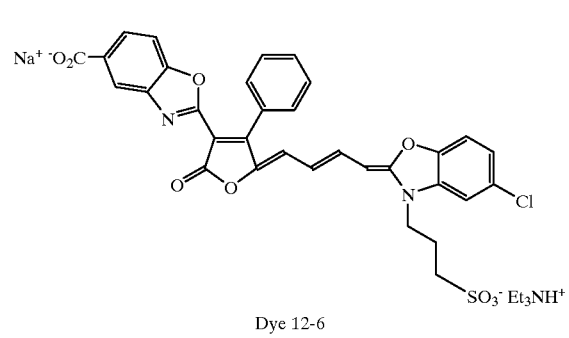
Dye 12-6
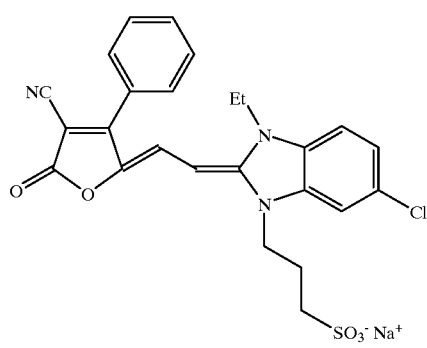
Dye 12-7
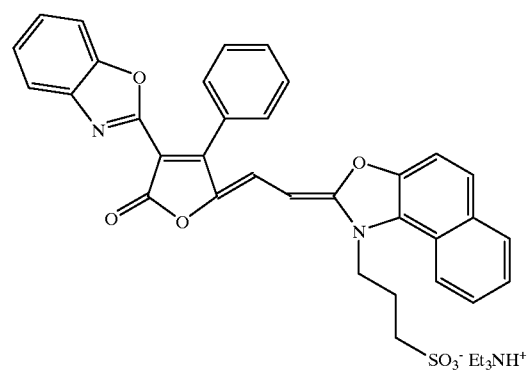
Dye 12-8

TABLE 12-continued
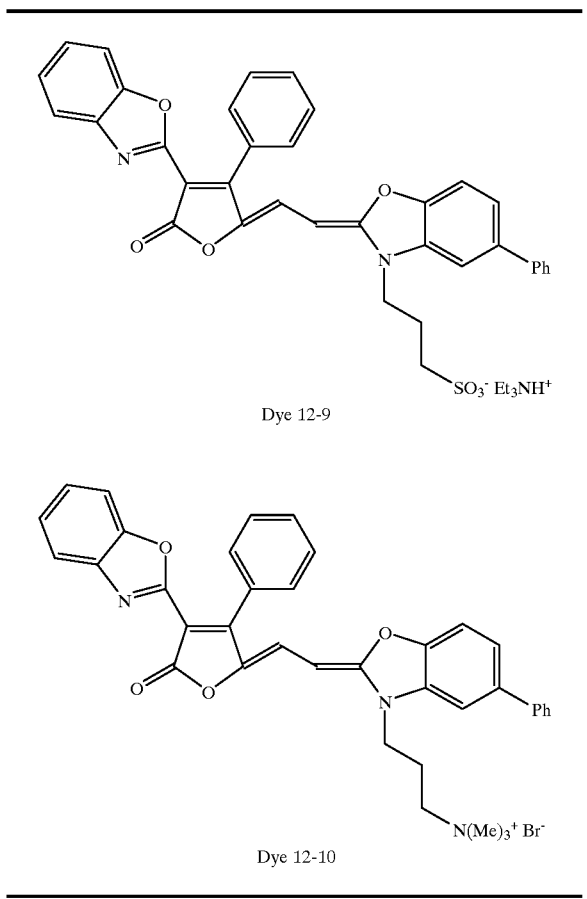
Dye 12-9
Dye 12-10
TABLE 13
Dye 13-1
Dye 13-2
TABLE 13-continued
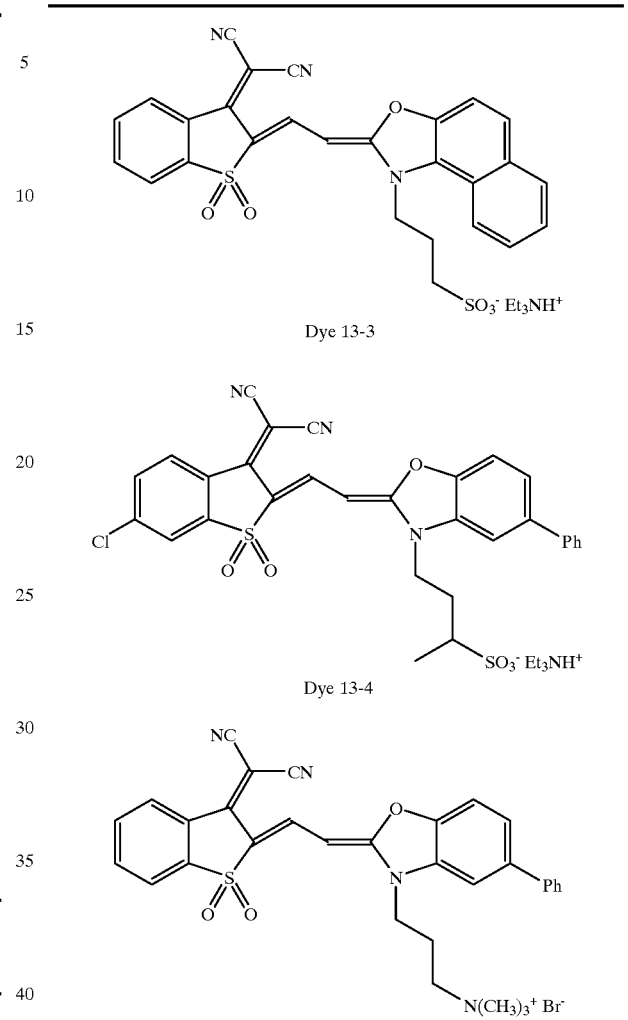
Dye 13-3
Dye 13-4
Dye 13-5
Dye 13-6
Dye 13-7

TABLE 13-continued
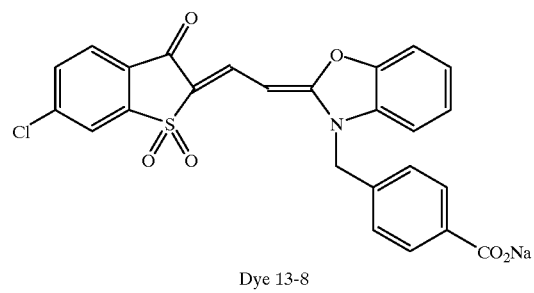
Dye 13-8
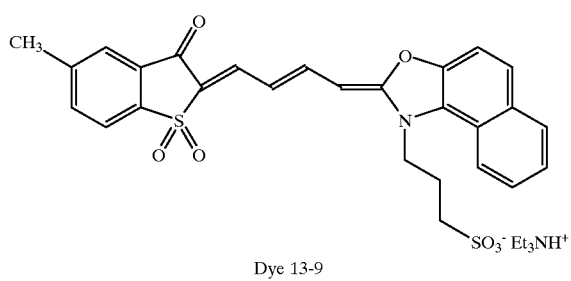
Dye 13-9
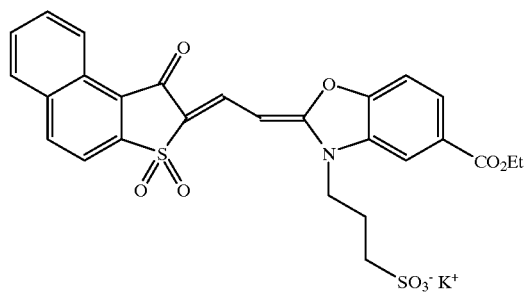
Dye 13-10
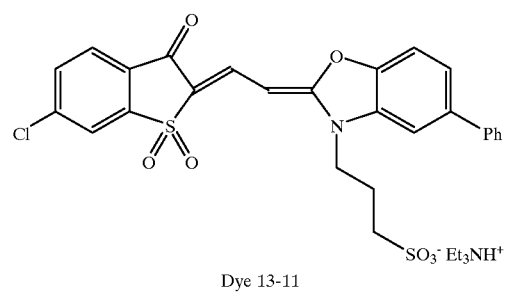
Dye 13-11
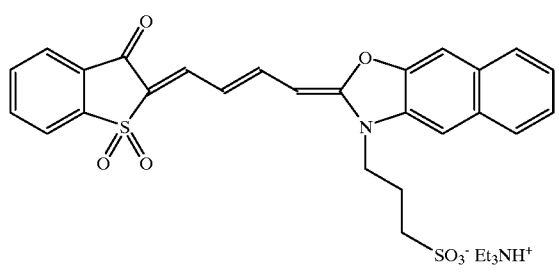
Dye 13-12
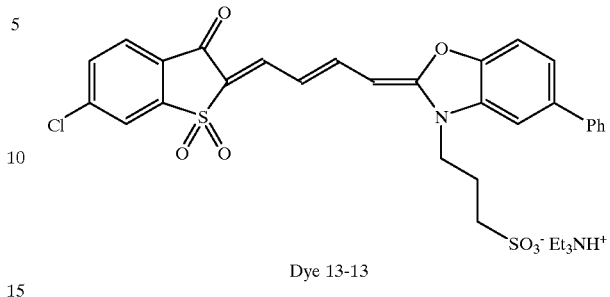
Dye 13-13
TABLE 14
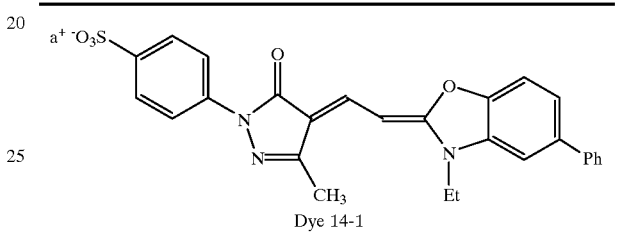
Dye 14-1
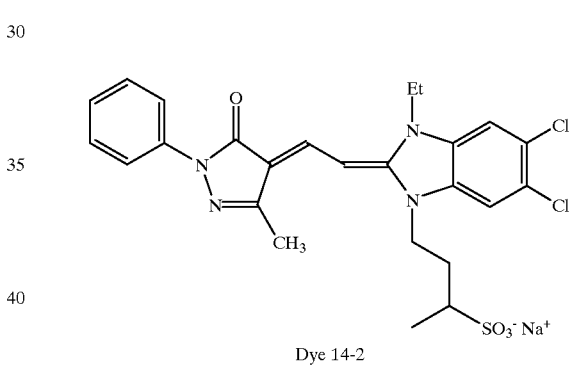
Dye 14-2
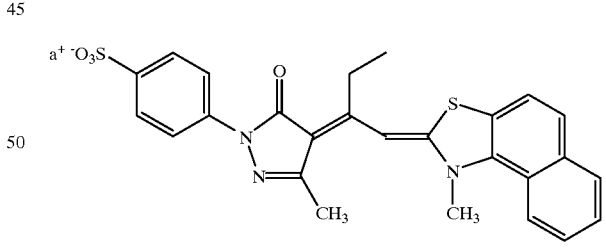
Dye 14-3
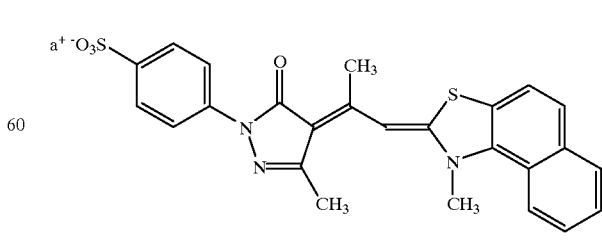
Dye 14-4

TABLE 15

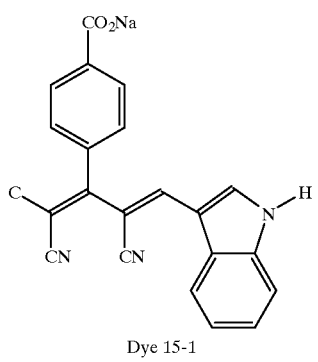

Dye 15-1

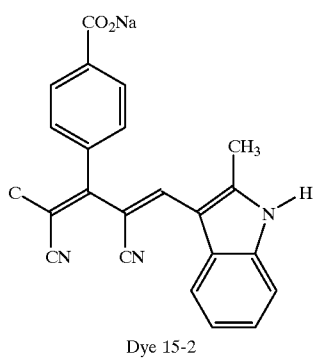

Dye 15-2

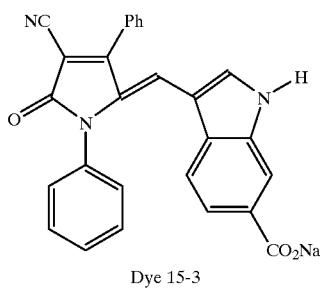

Dye 15-3

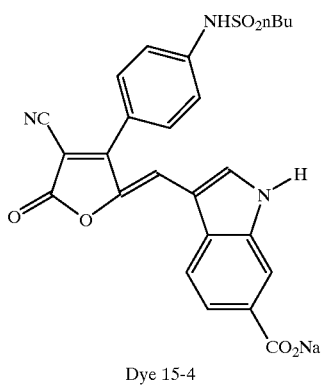

Dye 15-4

The dyes of Formulae I–XIII can be prepared by synthetic techniques well-known in the art, as illustrated by the synthetic examples below. Such techniques are further illustrated, for example, in "The Cyanine Dyes and Related Compounds", Frances Hamer, Interscience Publishers, 1964.

The liquid-crystalline dye dispersions of this invention may be prepared by well-known methods commonly employed for preparing solid particle dye dispersions. Here, a slurry of the dye in an aqueous medium comprising water and a surfactant or water-soluble polymer is subjected to a milling procedure such as ball-milling, sand-milling, media-milling or colloid-milling (preferably media-milling). The dye slurry can then be mixed with aqueous gelatin at an appropriate concentration (preferably ≦30% w/w) and at a temperature (preferably 20 to 90° C.)for use in a photographic element.

In another preferred embodiment, the liquid-crystalline dye dispersions of this invention may be prepared using a direct gelatin dispersion (DGD) method wherein the finely powdered dye or aqueous slurry thereof is simply mixed or agitated with water or with an aqueous medium containing gelatin (or other hydrophilic colloid) at an appropriate concentration (preferably ≦30% w/w) and at a temperature (preferably 0 to 100° C.).

In either of the preferred methods, the dyes may be subjected to elevated temperatures before and/or after gelatin dispersion, but to obtain desirable results, this heat treatment is carried out preferably after dispersing in gelatin. The optimal temperature range for preparing gelatin-based dispersions is 20° C.–100° C., depending on the concentration of the gelatin, but should remain below the decomposition points of the dyes, and, preferably forthe range of 5 minutes to 48 hours. A similar heat treatment may be applied, if so desired, to dyes prepared by milling methodsas solid particle dispersions before and/or after dispersion in aqueous gelatin to obtain effective results. Furthermore, if so desired, pH and/or ionic strength and solvent composition adjustments, for example, may be utilized to control the solubility and liquid crystal-forming properties of dyes prepared using SPD or DGD formulation techniques. The direct gelatin dispersion method is advantageous in that it does not necessarily require the use of organic solvents, surfactants, polymer additives, electrolytes, milling processes, pH control or the like. It is generally simpler, faster, more forgiving and more flexible than milling processes. A related method described by Boettcher for preparing concentrated sensitizing dye dispersions in aqueous gelatin (PCT WO 93/23792) is equally effective when applied to the inventive dyes. The entire disclosure of WO 93/23792 is incorporated herein by reference. The inventive lyotropic liquid-crystalline dye dispersions may be incorporated directly into imaging elements.

Solid particle dispersion and direct gelatin dispersion formulations of the compound of Formula (I–XIII) are useful as general purpose filter dyes, alone or in combination with other filter dyes in photographic elements. The dyes formulated as described above possess a pronounced tendency to form liquid crystal phases spontaneously at a variety of pH's, including typical coating pH's of 6 or less (generally 4–6) such that they do not substantially wander from the layer in which they are coated. However, they are highly soluble at processing pH's of 8 or more (generally 8–12), such that they are often still fully removed during photographic processing.

Our invention comprises a wide variety of dye classes which are functionalized to form liquid crystalline phases in solvents, especially water, and hydrophilic colloids such as aqueous gelatin. These materials would be especially useful as filter dyes in photographic systems as described above, as spectral sensitizers, and in non-photographic imaging applications such as inkjet, barcoding, and thermally-developed imaging systems.

There are few teachings addressing dye lyotropic liquid-crystalline phases. Additionally, no teachings are provided that would enable one skilled in the art to design and synthesize dyes capable of forming liquid crystals or to influence their formation in imaging elements.

For most materials, it is generally accepted that only three states of matter exist; namely, solids, liquids and gases. However, some materials exhibit a fourth state of matter commonly referred to as a liquid crystal phase (or mesophase). Liquid crystal phases are neither crystalline solids nor isotropic liquids, but exhibit some of the characteristics of both. A liquid crystal phase can be described simply as being a liquid with a certain degree of molecular order. As described below, this molecular order gives rise to measurable anisotropy in the bulk properties of a material that is otherwise much like a liquid. Consequently, the physical properties of liquid-crystalline materials are unique and distinct from those of solids and liquids. These differences can be utilized to advantage in the formulation of photographic elements and also allow detection of the liquid crystal phase by a variety of optical and spectroscopic techniques.

Liquid crystals can be classified as thermotropic or lyotropic. The dye compositions of the current invention are of the lyotropic type, however, for puposes of comparision, we first give a brief description the thermotropic type: Some crystalline compounds do not yield an isotropic liquid immediately upon melting, instead, the newly formed "melt" is a liquid crystal phase (mesophase). In the simple cases, further heating results in the formation of an ordinary isotropic liquid. The phase that exists above the melting point of the crystalline solid but below the formation temperature for the isotropic liquid is known as a thermotropic liquid crystal phase. In some cases, heating the initally formed mesophase does not result in an isotropic liquid, but rather, to one or more intermediate liquid crystal phases, and finally, the last formed of these, upon further heating, yields the isotropic liquid. All of the mesophases formed in this way are conventionally classified as thermotropic. The term thermotropic liquid crystal is also extended to include eutectic mixtures of compounds. Thermotropic liquid crystals are generally colorless organic materials and are typically hydrophobic (water-insoluble) in character. They are commonly employed in electro-optical display devices, for example digital watches and calculators.

In contrast, spontaneous formation of lyotropic liquid crystals can be achieved at a fixed temperature by simple addition of a solvent to a suitable solute (mesogen). The solvent is typically (but not necessarily) water and lyotropic mesophases are stable over finite ranges of both concentration and temperature. Typical lyotropic mesogens are amphiphilic. The term amphiphilic acknowledges that both hydrophobic groups (e.g. aliphatic, aromatic, etc.) and hydrophilic groups (e.g. $CO_2^- M^+$, $SO_3^- M^+$, $SO_4^- M^+$, $O(CH_2CH_2O)_x$ etc) are present on the same molecule. Examples include, surfactants, lipids, polymers, dyes, and drugs. The amphiphilic nature and the specific hydrophilic-hydrophobic balance (HHB) of these molecules influences their tendency to form lyotropic mesophases.

The structural type(s) and stability with respect to concentration and temperature of the liquid crystalline phase(s) formed are highly mesogen-dependent. For example, Koll et al. (U.S. Pat. No. 4,309,183, Jan. 5, 1982) teach how a lyotropic liquid-crystalline phase of a particular anionic azo reactive dyestuff can be prepared in water at room temperature and dye concentrations of 12–35%, for the specific use of dyeing and printing natural and synthetic substrates. However, no reference to such dyes for use in imaging elements has been reported.

Because of the complex interplay of short-range intermolecular and long-range inter-aggregate forces controlling lyotropic mesophase formation, in general it is difficult to predict the likelihood or stability of liquid crystal formation for any given solute-solvent combination.

It is part of the purpose of this invention to demonstrate that a wide variety of chromophores can and do form lyotropic liquid crystals upon suitable manipulation of substituents. It is a further purpose of this work to provide some examples of substituent combinations that are effective in trasforming some quite ordinary dyes classes, that is to say, dye classes for which mesophases have never been reported, into photographically useful lyotropic mesogens.

In the preferred embodiment, the amphiphilic filter dye will form any liquid-crystalline phase upon dispersing said dye in the hydrophilic solvent medium, typically, but not limited to, water or aqueous gelatin, at the wet laydown (dye concentration) and temperature of choice (preferably ☐ 30% w/w dye, more preferably $\leq$10% w/w dye, even more preferably $\leq$5% w/w dye and most preferably $\leq$0.5% w/w dye, between 0° C. and 100° C.). In the most preferred embodiment, said dye mesophase will possess a layered smectic structure, and in another preferred embodiment the dye mesophase will possess a nematic or hexagonal structure. We have discovered that the liquid-crystalline phase stability of lyotropic amphiphilic (particularly ionic) filter dyes may also be sensitive to the presence of addenda such as gelatin of different types, polymers, organic solvents (such as alcohols, acetone etc.) and surfactants. For example, low-levels of common electrolytes can stabilize ionic dye mesophase formation. Enhanced mesophase stability of ionic filter dyes (with respect to both temperature and concentration) may be realized simply by the judicious choice of photographic gelatin (e.g. so-called regular, deionized or decalcified gelatin grades) which contain different levels and types of electrolyte cations and anions (e.g. calcium, magnesium, sodium, chloride, sulphate etc.) as a by-product of gelatin manufacture. Similarly, the use of non-deionized water or the addition of low salt levels to purified (deionized or distilled) water, can afford enhanced mesophase stability for certain ionic filter dyes. The preferred dyes of this invention are chosen to exhibit stable lyotropic mesophases under the practical conditions generally employed for their formulation, dispersion, coating and drying. It is understood that someone skilled in the art of dyes could, with the guidance provided in this disclosure, systematically optimize dye structure and/or solvent conditions to enhance and control dye mesophase formation and stability for a suitable mesogen-solvent combination.

Since mesophase formation is both concentration and temperature dependent, it is understood that some of the preferred amphiphilic filter dyes may initially form an isotropic solution phase which will undergo a transition to a more concentrated and thermally-stable mesophase during the drying process (thermal stability of dye mesophases invariably increases with dye mesophase concentration).

Some of the preferred amphiphilic filter dyes initially dispersed in the wet hydrophilic colloid medium (e.g. aqueous gelatin) as a dilute liquid-crystalline dye phase, may remain wholly liquid-crystalline upon drying or undergo a (for example, concentration-dependent or ionic strength-dependent) reversible transition from the liquid-crystalline state to a crystalline, semi-crystalline. or amorphous solid dye state, or a mixture thereof, during the drying process. However, we have found that in such instances the preferred dyes still largely retain the useful spectral and physical properties associated with the originally dispersed dilute dye mesophase (e.g. absorption envelope providing good covering power, layer specificity, incubation stability, rapid processing elution and or bleachability). The final physical form of the gelatin-dispersed dye (liquid-crystalline, crystalline, amorphous solid) will depend on the precise phase behaviour of said dye in relation to the retained moisture (water) content of the evaporated (dried-down) gelatin film under given conditions of temperature and humidity and the presence of other solutes. However, according to the invention, dyes which remain liquid crystalline when formulated and dispersed in the photographic vehicle, or those which pass through a transitory liquid-crystalline phase at any stage during the subsequent coating and drying process, will afford the useful and unique combination of both spectral and physical properties, described herein. It should be emphasized that reference in this disclosure to "evaporated" or "dried" coatings refers to coatings of wet aqueous gelatin melts from which excess water or solvent has been allowed to evaporate or has been removed by drying processes, but which still retain an equilibrium moisture level typical of finished imaging elements especially photographic imaging elements.

According to the invention, the preferred dye chromophores must possess some added degree of hydrophilicity, imparted by ionic, zwitterionic or nonionic solubilizing groups, to be capable of forming lyotropic liquid-crystalline phases in aqueous-based media. Similarly, if so desired, for non-aqueous (e.g. organic) solvent applications, the dye should possess additional hydrophobic, rather than hydrophilic, solubilizing moieties, such as branched aliphatic chains.

Common mesophase structural types, such as layered smectic (e.g. lamellar), columnar hexagonal and nematic, which possess varying degrees of orientational & translational molecular order, may be formed by many diverse and disparate lyotropic mesogens. Because of the inherent ordered nature of these anisotropic, thermodynamically stable, supramolecular structures, experimental techniques including, for example, small-angle X-ray (or neutron) scattering, polarized-light optical microscopy and quadrupole (e.g. $^{23}$Na, $^{2}$H, $^{17}$O, $^{14}$N etc.) NMR spectroscopy may be routinely applied to identifying and characterizing the structure and physico-chemical properties of lyotropic mesophases.

According to the invention, the preferred dyes can be readily identified using the technique of polarized-light optical microscopy (as described by N. H. Hartshorne in, "The Microscopy of Liquid Crystals", Microscope Publications Ltd., London, England, 1974). In order to ascertain the exact quantitative mesophase behaviour of a given dye-solvent combination, a range of sample mixtures of known composition are prepared (typically dyes dissolved in aqueous gelatin) and viewed in polarized light as wet thin films (contained within sealed glass capillary cells of known pathlength) and slowly-evaporated thin films (hand-coated onto glass microscope slides and air-dried) to establish the precise concentration and temperature ranges of dye mesophase stability. These same thin-film preparations may also be used to elucidate and quantify the spectral absorption properties of the dye mesophase, such as absorption wavelength, bandwidth, extinction coefficient etc. using a uv-vis spectrophotometer.

Simple observations of the characteristic birefringent type-textures and rheology (flow behaviour under shear) displayed by thin-film mesophase preparations in polarized light are usually sufficient to establish the mesophase structural type (e.g. smectic, nematic, hexagonal depending upon the specific long-range inter-aggregate ordering) as a function of solute-solvent concentration and temperature. Dyes forming lyotropic chromonic nematic mesophases may be identified from a range of fluid, viscoelastic textures including so-called Schlieren, Tiger-Skin, Reticulated, Homogeneous (Planar), Thread-like, Droplet and Homeotropic (Pseudoisotropic). Lyotropic chromonic hexagonal mesophases usually display viscous, birefringent Herringbone, Ribbon or Fan-like textures while lyotropic chromonic smectic mesophases may display Grainy-Mosaic, Frond-like (Pseudo-Schlieren), Spherulitic and Oily-Streak birefringent textures. In some cases where the liquid-crystalline nature of the sample cannot be established unequivocally using polarized-light optical microscopy other well-established experimental techniques may be utilized. For example, lyotropic mesophases exhibit characteristic quadrupole NMR spectroscopy lineshapes and quadrupole splittings, while small-angle and wide-angle X-ray (or neutron) diffraction measurements provide unique and characteristic structured diffraction patterns (refer to "Liquid Crystals and Plastic Crystals", eds. G. W. Gray & P. A. Winsor, Ellis Horwood Ltd., Chichester, UK, 1974, Vols. 1 and 2). Such phase-dependent properties may be used to differentiate, for example, a liquid-crystalline filter dye dispersion from a conventional microcrystalline (i.e. solid) filter dye dispersion.

A particular advantage of the inventive dyes is that in the liquid crystalline state, they provide higher covering power at their coating $\lambda_{max}$ than comparable known dyes which are insoluble and exist as microcrystalline solid particles in the photographic medium. This advantage is particularly important in modern film formats and processing conditions, as filter dyes with high covering power need not be coated at as high a coverage as dyes with lower covering power in order to achieve the same degree of light filtration. In addition to reducing manufacturing costs, lower levels of coated dyes will reduce the level of unwanted dye stain in the processed photographic element, and will reduce the level of dye residue built up in the processing solutions, and the resulting lower levels of dissolved dye residue removed from photographic elements will have reduced environmental impact.

A further advantage of dyes of the invention is that they generally possess absorbance envelopes that are sharper cutting on the bathochromic side than typical solid particle dyes. This feature is especially advantageous when strong light absorbance is required in a spectral region up to a specific $\lambda_{max}$ and maximum light transmission is required past the specified $\lambda_{max}$. Such filter or trimmer dyes are especially useful when coated in specific layers of color photographic films to effectively prevent light of a specific wavelength region from exposing radiation-sensitive layers below the light filtration layer containing the dye, but without causing speed losses in the layer below the filter dye. A green filter dye coated directly above a red-sensitive silver halide layer is a particularly advantageous example of such absorbance features, and excellent green/red speed separation can be realized. A sharp-cutting bathochromic edge on a filter or trimmer dye enables excellent color reproduction with minimum speed loss by absorbing light efficiently up to its absorbance maximum, but very little if any just past its absorbance maximum. A magenta trimmer dye (green absorber) which is only moderately sharp-cutting on the bathochromic edge may function adequately as a filter dye, but its unwanted absorbance in the red region past its $\lambda_{max}$ will rob the red-sensitive emulsion coated below it of red light and hence speed. In a typical color photographic element, it is desirable to have a green-absorbing filter dye which when coated absorbs strongly at wavelengths close to 550 nm, but which absorbs comparatively little at wavelengths greater than 550 nm. It should be emphasized that the exact envelope of desirable light absorbance for a filter dye, even specifically a green filter dye, varies tremendously from one photographic element to another depending on the intended purpose of the material. Some photographic elements might require a filter dye, such as a green filter dye, which absorbs strongly up to a wavelength somewhat shorter or longer than 550 nm, but is sharp cutting on the bathochromic side, mostly transmitting wavelengths of light past the desired absorbance $\lambda_{max}$. The feature of coated dye absorbance exhibiting a sharp cutting bathochromic and/or hypsochromic characteristic is fundamentally useful for wavelength-specific light filtration, though the exact wavelength of desired spectral shift from absorbance to transmission may be different for different photographic materials.

A further advantage of the dyes of the invention is that in the liquid crystalline state, many are much sharper absorbing than in their dissolved isotropic solution state, that is, they possess a much narrower halfbandwidth. Furthermore, unlike a dye in the dissolved, isotropic solution state, the dye in the liquid-crystalline state is essentially immobile and not prone to gross diffusion and thus can be coated layer specifically.

The dyes may be located in any layer of the element where it is desirable to absorb light, but in photographic elements it is particularly advantageous to locate them in a layer where they will be solubilized and washed out during processing. Useful amounts of dye range from 1 to 1000 mg/m$^2$. The dye should be present in an amount sufficient to yield an optical density at the absorbance $D_{max}$ in the spectral region of interest before processing of at least 0.10 density units and preferably at least 0.50 density units. This optical density will generally be less than 5.0 density units for most photographic applications.

The dyes of the invention can be used as interlayer dyes, trimmer dyes, antihalation dyes or light-absorbing elements. They can be used to prevent crossover in X-ray materials as disclosed in U.S. Pat. Nos. 4,900,652 and 4,803,150 and European Patent Application Publication No. 0 391 405, to prevent unwanted light from reaching a sensitive emulsion layer of a multicolor photographic element as disclosed in U.S. Pat. No. 4,988,611, and for other uses as indicated by the absorbance spectrum of the particular dye. The dyes can be used in a separate filter layer or as an intergrain absorber.

The liquid crystal-forming dyes of Formula (I–XIII) are useful for the preparation of radiation sensitive materials. Such materials are sensitive to radiation such as visible light, ultraviolet, infrared, or X-ray.

The liquid crystal-forming dyes of Formula (I–XIII) are also useful in non-photographic imaging elements such as thermally-developable elements, or as dye materials for inkjet applications. The non-photographic imaging material may be an optical recording medium, such as a CD or other medium sensitive to a laser, light-emitting diode, or a thermally-developable material.

Another aspect of this invention comprises a radiation sensitive element containing a liquid crystal-forming dye of Formula (I–XIII). Preferably, the radiation sensitive element is a photographic element comprising a support bearing at least one light sensitive hydrophilic colloid layer and at least one other hydrophilic colloid layer. A dye of Formula I–XIII may be incorporated in a hydrophilic layer of the photographic element in any known way.

The support of the element of the invention can be any of a number of well-known supports for photographic elements as discussed more fully below.

The photographic elements made by the method of the present invention can be single color elements or multicolor elements. Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. All of these can be coated on a support which can be transparent or reflective (for example, a paper support).

Photographic elements of the present invention may also usefully include a magnetic recording material as described in *Research Disclosure,* Item 34390, November 1992, or a transparent magnetic recording layer such as a layer containing magnetic particles on the underside of a transparent support as in U.S. Pat. No. 4,279,945 and U.S. Pat. No. 4,302,523. The element typically will have a total thickness (excluding the support) of from 5 to 30 microns. While the order of the color sensitive layers can be varied, they will normally be red-sensitive, green-sensitive and blue-sensitive, in that order on a transparent support, (that is, blue sensitive furthest from the support) and the reverse order on a reflective support being typical.

The present invention also contemplates the use of photographic elements of the present invention in what are often referred to as single use cameras (or "film with lens" units). These cameras are sold with film preloaded in them and the entire camera is returned to a processor with the exposed film remaining inside the camera. Such cameras may have glass or plastic lenses through which the photographic element is exposed.

In the following discussion of suitable materials for use in elements of this invention, reference will be made to Research Disclosure, September 1996, Number 389, Item 38957, which will be identified hereafter by the term "Research Disclosure I." The Sections hereafter referred to are Sections of the Research Disclosure I unless otherwise indicated. All Research Disclosures referenced are published by Kenneth Mason Publications, Ltd., Dudley Annex, 12a North Street, Emsworth, Hampshire P010 7DQ, ENGLAND. The foregoing references and all other references cited in this application, are incorporated herein by reference.

The silver halide emulsions employed in the photographic elements of the present invention may be negative-working, such as surface-sensitive emulsions or unfogged internal latent image forming emulsions, or positive working emulsions of internal latent image forming emulsions (that are either fogged in the element or fogged during processing). Suitable emulsions and their preparation as well as methods of chemical and spectral sensitization are described in Sections I through V. Color materials and development modifiers are described in Sections V through XX. Vehicles which can be used in the photographic elements are described in Section II, and various additives such as brighteners, antifoggants, stabilizers, light absorbing and scattering materials, hardeners, coating aids, plasticizers, lubricants and matting agents are described, for example, in Sections VI through XIII. Manufacturing methods are described in all of the sections, layer arrangements particularly in Section XI, exposure alternatives in Section XVI, and processing methods and agents in Sections XIX and XX.

With negative working silver halide a negative image can be formed. Optionally a positive (or reversal) image can be formed although a negative image is typically first formed.

The photographic elements of the present invention may also use colored couplers (e.g., to adjust levels of interlayer correction) and masking couplers such as those described in EP 213 490; Japanese Published Application 58-172,647; U.S. Pat. No. 2,983,608; German Application DE 2,706, 117C; U.K. Patent 1,530,272; Japanese Application A-113935; U.S. Pat. No. 4,070,191 and German Application DE 2,643,965. The masking couplers may be shifted or blocked.

The photographic elements may also contain materials that accelerate or otherwise modify the processing steps of bleaching or fixing to improve the quality of the image. Bleach accelerators described in EP 193 389; EP 301 477; U.S. Pat. No. 4,163,669; U.S. Pat. No. 4,865,956; and U.S. Pat. No. 4,923,784 are particularly useful. Also contemplated is the use of nucleating agents, development accelerators or their precursors (UK Patent 2,097,140; U.K. Patent 2,131,188); electron transfer agents (U.S. Pat. No. 4,859,578; U.S. Pat. No. 4,912,025); antifogging and anti color-mixing agents such as derivatives of hydroquinones, aminophenols, amines, gallic acid; catechol; ascorbic acid; hydrazides; sulfonamidophenols; and non color-forming couplers.

The elements may also contain filter dye layers comprising colloidal silver sol or yellow and/or magenta filter dyes and/or antihalation dyes (particularly in an undercoat beneath all light sensitive layers or in the side of the support opposite that on which all light sensitive layers are located) formulated either as oil-in-water dispersions, latex dispersions, solid particle dispersions, or as direct gelatin dispersions. Additionally, they may be used with "smearing" couplers (e.g., as described in U.S. Pat. No. 4,366,237; EP 096 570; U.S. Pat. No. 4,420,556; and U.S. Pat. No. 4,543, 323.) Also, the couplers may be blocked or coated in protected form as described, for example, in Japanese Application 61/258,249 or U.S. Pat. No. 5,019,492.

The photographic elements may further contain other image-modifying compounds such as "Developer Inhibitor-Releasing" compounds (DIR's). Useful additional DIR's for elements of the present invention, are known in the art and examples are described in U.S. Pat. Nos. 3,137,578; 3,148, 022; 3,148,062; 3,227,554; 3,384,657; 3,379,529; 3,615, 506; 3,617,291; 3,620,746; 3,701,783; 3,733,201; 4,049, 455; 4,095,984; 4,126,459; 4,149,886; 4,150,228; 4,211, 562; 4,248,962; 4,259,437; 4,362,878; 4,409,323; 4,477, 563; 4,782,012; 4,962,018; 4,500,634; 4,579,816; 4,607, 004; 4,618,571; 4,678,739; 4,746,600; 4,746,601; 4,791, 049; 4,857,447; 4,865,959; 4,880,342; 4,886,736; 4,937, 179; 4,946,767; 4,948,716; 4,952,485; 4,956,269; 4,959, 299; 4,966,835; 4,985,336 as well as in patent publications GB 1,560,240; GB 2,007,662; GB 2,032,914; GB 2,099, 167; DE 2,842,063, DE 2,937,127; DE 3,636,824; DE 3,644,416 as well as the following European Patent Publications: 272,573; 335,319; 336,411; 346, 899; 362, 870; 365,252; 365,346; 373,382; 376,212; 377,463; 378,236; 384,670; 396,486; 401,612; 401,613.

DIR compounds are also disclosed in "Developer-Inhibitor-Releasing (DIR) Couplers for Color Photography," C. R. Barr, J. R. Thirtle and P. W. Vittum in Photographic Science and Engineering, Vol. 13, p. 174 (1969), incorporated herein by reference.

It is also contemplated that the concepts of the present invention may be employed to obtain reflection color prints as described in Research Disclosure, November 1979, Item 18716, available from Kenneth Mason Publications, Ltd, Dudley Annex, 12a North Street, Emsworth, Hampshire P0101 7DQ, England, incorporated herein by reference. The emulsions and materials to form elements of the present invention, may be coated on pH adjusted support as described in U.S. Pat. No. 4,917,994; with epoxy solvents (EP 0 164 961); with additional stabilizers (as described, for example, in U.S. Pat. No. 4,346,165; U.S. Pat. No. 4,540, 653 and U.S. Pat. No. 4,906,559); with ballasted chelating agents such as those in U.S. Pat. No. 4,994,359 to reduce sensitivity to polyvalent cations such as calcium; and with stain reducing compounds such as described in U.S. Pat. No. 5,068,171 and U.S. Pat. No. 5,096,805. Other compounds useful in the elements of the invention are disclosed in Japanese Published Applications 83-09,959; 83-62,586; 90-072,629, 90-072,630; 90-072,632; 90-072,633; 90-072, 634; 90-077,822; 90-078,229; 90-078,230; 90-079,336; 90-079,338; 90-079,690; 90-079,691; 90-080,487; 90-080, 489; 90-080,490; 90-080,491; 90-080,492; 90-080,494; 90-085,928; 90-086,669; 90-086,670; 90-087,361; 90-087, 362; 90-087,363; 90-087,364; 90-088,096; 90-088,097; 90-093,662; 90-093,663; 90-093,664; 90-093,665; 90-093, 666; 90-093,668; 90-094,055; 90-094,056; 90-101,937; 90-103,409; 90-151,577.

The silver halide used in the photographic elements may be silver iodobromide, silver bromide, silver chloride, silver chlorobromide, silver chloroiodobromide, and the like. For example, the silver halide used in the photographic elements of the present invention may contain at least 90% silver chloride or more (for example, at least 95%, 98%, 99% or 100% silver chloride). In the case of such high chloride silver halide emulsions, some silver bromide may be present but typically substantially no silver iodide. Substantially no silver iodide means the iodide concentration would be no more than 1%, and preferably less than 0.5 or 0.1%. In particular, in such a case the possibility is also contemplated that the silver chloride could be treated with a bromide source to increase its sensitivity, although the bulk concentration of bromide in the resulting emulsion will typically be no more than about 2 to 2.5% and preferably between about 0.6 to 1.2% (the remainder being silver chloride). The foregoing % figures are mole %.

The type of silver halide grains preferably include polymorphic, cubic, and octahedral. The grain size of the silver halide may have any distribution known to be useful in photographic compositions, and may be either poly-dipersed or monodispersed.

Tabular grain silver halide emulsions may also be used. Tabular grains are those with two parallel major faces each clearly larger than any remaining grain face and tabular grain emulsions are those in which the tabular grains account for at least 30 percent, more typically at least 50 percent, preferably >70 percent and optimally >90 percent of total grain projected area. The tabular grains can account for substantially all (>97 percent) of total grain projected area. The tabular grain emulsions can be high aspect ratio tabular grain emulsions—i.e., ECD/t >8, where ECD is the diameter of a circle having an area equal to grain projected area and t is tabular grain thickness; intermediate aspect ratio tabular grain emulsions—i.e., ECD/t =5 to 8; or low aspect ratio tabular grain emulsions—i.e., ECD/t =2 to 5. The emulsions typically exhibit high tabularity (T), where T (i.e., ECD/t$^2$) >25 and ECD and t are both measured in micrometers (mm). The tabular grains can be of any thickness compatible with achieving an aim average aspect ratio and/or average tabularity of the tabular grain emulsion. Preferably the tabular grains satisfying projected area requirements are those having thicknesses of <0.3 mm, thin (<0.2 mm) tabular grains being specifically preferred and ultrathin (<0.07 mm) tabular grains being contemplated for maximum tabular grain performance enhancements. When the native blue absorption of iodohalide tabular grains is relied upon for blue speed, thicker tabular grains, typically up to 0.5 mm in thickness, are contemplated.

High iodide tabular grain emulsions are illustrated by House U.S. Pat. No. 4,490,458, Maskasky U.S. Pat. No. 4,459,353 and Yagi et al EPO 0 410 410.

Tabular grains formed of silver halide(s) that form a face centered cubic (rock salt type) crystal lattice structure can have either {100} or {111 } major faces. Emulsions containing {111 } major face tabular grains, including those with controlled grain dispersities, halide distributions, twin plane spacing, edge structures and grain dislocations as well as adsorbed {111} grain face stabilizers, are illustrated in those references cited in Research Disclosure I, Section I.B.(3) (page 503).

The silver halide grains to be used in the invention may be prepared according to methods known in the art, such as those described in *Research Disclosure I* and James, *The Theory of the Photographic Process.* These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with noble metal (for example, gold) sensitizers, middle chalcogen (for example, sulfur) sensitizers, reduction sensitizers and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I.* Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I.* The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30 to 80° C., as described in *Research Disclosure I,* Section IV (pages 510–511) and the references cited therein.

The silver halide may be sensitized by sensitizing dyes by any method known in the art, such as described in *Research Disclosure I.* The dye may be added to an emulsion of the silver halide grains and a hydrophilic colloid at any time prior to (e.g., during or after chemical sensitization) or simultaneous with the coating of the emulsion on a photographic element. The dyes may, for example, be added as a solution in water or an alcohol. The dye/silver halide emulsion may be mixed with a dispersion of color image-forming coupler immediately before coating or in advance of coating (for example, 2 hours).

Photographic elements of the present invention are preferably imagewise exposed using any of the known techniques, including those described in *Research Disclosure I,* section XVI. This typically involves exposure to light in the visible region of the spectrum, and typically such exposure is of a live image through a lens, although exposure can also be exposure to a stored image (such as a computer stored image) by means of light emitting devices (such as light emitting diodes, CRT and the like).

Photographic elements comprising the composition of the invention can be processed in any of a number of well-known photographic processes utilizing any of a number of well-known processing compositions, described, for example, in *Research Disclosure I,* or in T. H. James, editor, *The Theory of the Photographic Process,* 4th Edition, Macmillan, N.Y., 1977. In the case of processing a negative working element, the element is treated with a color developer (that is one which will form the colored image dyes with the color couplers), and then with a oxidizer and a solvent to remove silver and silver halide. In the case of processing a reversal color element, the element is first treated with a black and white developer (that is, a developer which does not form colored dyes with the coupler compounds) followed by a treatment to fog silver halide (usually chemical fogging or light fogging), followed by treatment with a color developer. Preferred color developing agents are p-phenylenediamines. Especially preferred are:

4-amino N,N-diethylaniline hydrochloride, 4-amino-3-methyl-N,N-diethylaniline hydrochloride, 4-amino-3-methyl-N-ethyl-N-(b-(methanesulfonamido)ethylaniline sesquisulfate hydrate, 4-amino-3-methyl-N-ethyl-N-(b-hydroxyethyl)aniline sulfate, 4-amino-3-b-(methanesulfonamido)ethyl-N,N-diethylaniline hydrochloride and 4-amino-N-ethyl-N-(2-methoxyethyl)-m-toluidine di-p-toluene sulfonic acid.

Development is followed by bleach-fixing, to remove silver or silver halide, washing and drying.

Synthesis of Dye 1-1A 6-chloro-benzothiophene dioxide (10 g, 46.3 mmol)and diethoxymethylacetate (7.5 g, 46.3 mmol)were suspended in 150 ml acetonitrile at 25 C. Triethylamine (14 g, 139 ; mmol) was added over 5 min producing a golden yellow solution which was stirred 60 min. The dye solution was poured into excess diethyl ether and the resulting solid was collected by filtration. Isolated 10.7 g (87%) of the dye as a yellow solid. All analytical data were consistent with the structure.

Synthesis of Dye 2-1A 6-chloro-benzothiophene dioxide (10 g, 46.3 mmol)and trimethoxypropene (6.1 g, 46.3 mmol)were suspended in 200 ml ethanol at 25 C. Triethylamine (14 g, 139 mmol) was added over 5 min. The mixture was heated to reflux and held for 30 min. A red solid precipitated from the hot reaction mixture. The mixture was then allowed to cool to 25° C., and the precipitated dye was collected by filtration and washed with ethanol. The collected solid was suspended in 100 mL acetonitrilel and heated to reflux while 1 mL concentrated HCl was added over 5 min. The resulting slurry was heated at reflux for 10 min, then allowed to cool to 25° C. The dye was collected by filtration, washed with acetonitrile and dried. Isolated 7.8 g (72%) of Dye 6 as a red/orange solid. All analytical data were consistent with the structure.

Synthesis of Dye 6-1

Triethylamine (2.5 g, 0.025 mol) was added in one portion to a stirring slurry of 6-methoxy-2-phenyl-1,3,3-tricyanohexatriene (5 g, 0.02 mol) and 5-phenyl-2-methyl-3-sulfopropylbenzoxozole (6.6 g, 0.02 mol) in 40 mL absolute ethanol at 25 C. The reaction mixture was heated to reflux and held for 30 minutes, then allowed to cool to 25 C with stirring. The precipitated product was collected by filtration and rinsed with ethanol. The crude dye was slurried in ethanol at reflux, then cooled to 25 C, then collected by filtration to afford 8.6 g (65% yield) of the pure dye 6-1. All analytical data was consistent with the assigned structure.

EXPERIMENTAL EXAMPLES

Formulation A: Solid Particle Dispersion (SPD) Formulation Procedure Step 1:

Dyes were formulated as aqueous dye by ball-milling according to the following procedure. Water (22.0 g) and a 10.0% solution of Triton X-200®, an alkyl aryl polyether sulfonate surfactant available from Rohm and Haas, (1.0 g) were placed in a 120 mL screw-capped bottle. A 1.0 g sample of dye was added to this solution. Zirconium oxide beads (60 mL, 1.8 mm diameter) were added and the container with the cap tightly secured was placed in a mill and the contents milled for four days. The resulting mixture was then filtered to remove the zirconium oxide beads. The resulting aqueous dye slurries were dispersed into gelatin as described in Step 2.

Step 2

Aqueous gelatin dispersions of the above dye slurries (step 1) were prepared as follows. The vessel containing the dye slurry was removed and a known weight of dye slurry was added to a 12.5% aqueous gelatin solution (18.0 g) at 45–80° C. This mixture was then diluted with water to a weight of 88.87 g., yielding the final dye dispersion. In the subsequent experimental sections gelatin-containing dye dispersions prepared in this manner will be referred to as Formulation A. The term "SPD" is used throughout simply to denote dye dispersions which have been formulated using well known milling techniques normally used for preparing solid particle microcrystalline dye dispersions. This does not imply that the physical state of the dye prepared in this manner is exclusively microcrystalline in nature. The dispersions described above may be prepared at a wide variety of dye concentrations ranging from 0.005–30% w/w. The most commonly employed concentrations were 0.01–0.30% dye.

Formulation B: Direct Gelatin Dispersion (DGD) Formulation Procedure

Nominally 2.000 g $H_2O$ then 0.12500 g deionized gelatin were weighed into screw-topped glass vials and allowed to soak at 25° C. for at least 30 minutes. The swollen gelatin was then melted at 50° C. for 15 minutes with agitation. The gelatin solution was cooled to 25° C., then refrigerated at 5° C. to set. Nominally 2.870 g $H_2O$ was then added on top of the set gelatin followed by 0.00500 g of powdered dye. The dye powder was thoroughly wetted and dispersed in the water layer by agitation and then allowed to stand at 25° C. for 17 hours. The samples were then heated to 60–80° C. in a water bath for 1–2 hours and mixed with intermittent agitation. The samples were subsequently cooled to 39.0° C. over a period of approximately 1 hour and maintained at this temperature until measurement. In the subsequent experimental sections dispersions prepared in this manner will be referred to as Formulation B (direct gel dispersions or DGD's).

The above formulation corresponds to a dye concentration 0.10% w/w, but the dispersions may be prepared at a wide variety of dye concentrations ranging from 0.005–30% w/w. The most commonly employed dye concentrations were 0.01–0.30% w/w. In some instances, regular lime-processed photographic gelatin (non-decalcified) was used in preference to deionized (decalcified) gelatin.

Example 1

Polarized-Light Optical Microscopy Test for Formation of Dye Lyotropic Liquid Crystalline Phases (Liquid Crystal Phase Test)

Direct aqueous gelatin dispersions (DGD's) of known composition were prepared as described for FormulationB for the inventive dyes and the comparitive dyes and allowed to cool to room temperature to set. Small aliquots of the gelled dye dispersions were then removed from the glass vials and sandwiched between a pre-cleaned glass micro slide (Gold Seal Products, USA) and a micro cover glass (VWR Scientific, USA) to form a thin film. Each slide was then viewed in polarized-light at a magnification of 16× objective using a Zeiss Universal M microscope fitted with polarizing elements.

Liquid-crystalline DGD's were readily identified by their birefringent (bright) characteristic type-textures and interference colours when viewed in polarized light. Isotropic DGD's (solution dye, non-liquid crystalline) were readily distinguishable from liquid-crystalline DGD's by their complete lack of birefringency (i.e. black appearance) when viewed in polarized light. Crystalline DGD's (solid dye, non-liquid crystalline) were readily distinguishable from isotropic and liquid-crystalline DGD's due to the presence of finite-sized solid dye particles or crystals, or clumps of such solid particles or crystals, which were not readily deformable with moderate shear when pressure was applied to the cover glass. The gelled DGD's were then heated through the gel to sol transition (40°–50° C.) while observing the sample slide microscopically in polarized light. Dyes forming a lyotropic nematic mesophase typically displayed characteristic fluid, viscoelastic, birefringent textures including so-called Schlieren, Tiger-Skin, Reticulated, Homogeneous (Planar), Thread-Like, Droplet and Homeotropic (Pseudoisotropic). Dyes forming a lyotropic hexagonal mesophase typically displayed viscous, birefringent Herringone, Ribbon or Fan-Like textures. Dyes forming a lyotropic smectic mesophase displayed so-called Grainy-Mosaic, Spherulitic, Frond-Like (Pseudo-Schlieren) and Oily-Streak birefringent textures. The most preferred liquid crystal-forming dyes of the invention clearly remained in a liquid-crystalline state at these elevated temperatures as evidenced from their characteristic birefringent type-textures and rheology. In some instances, the dye liquid crystal phase melted reversibly to the isotropic dye solution phase (non-birefringent) on heating. In some instances, the dye liquid crystal phase co-existed with solid dye. By maintaining the sample slide at an elevated temperature, the presence and stability of the dye mesophase(s) could be monitored during peripheral evaporation of the solvent to a more concentrated evaporated (dried-down) state. The most preferred dyes of the invention exhibited microscopic liquid-crystalline textures in the wet gelled state, the wet melt (sol) state and the evaporated (dried-down) state. These states (gelled, sol and evaporated) are denoted in Table 16, column 4 by the letters g, s and e in parenthesis. The dye and gelatin concentrations refer to the samples in the wet gelled and sol states, before evaporation. For some of the inventive dyes, aqueous dye dispersions of known composition (without gelatin) were prepared by mixing the powdered dye into water at 60° C. for 1 hour with agitation, then cooling to room temperature before microscopic examination.

Preferred dyes of the invention formed lyotropic liquid-crystalline phases in aqueous media at dye concentrations of ≦30% w/w, more preferred dyes formed lyotropic liquid-crystalline phases at concentrations of ≦10% w/w dye, even more preferred dyes formed lyotropic liquid-crystalline phases at concentrations of ≦5% w/w dye, and the most preferred dyes formed lyotropic liquid-crystalline phases at concentrations of ≦0.5% w/w. Representative data are summarized in Table 16 below.

TABLE 16

| Dye # | Dye Conc. (% w/w) | Solvent* | Liquid Crystal Phase† |
|---|---|---|---|
| 1-1 | 0.10 | D.G | smectic (g, s, e) |
| 1-1A | 0.10 | D.G. | smectic (g, s, e) |
| 1-2 | 0.20 | D.G. | smectic (e) |
| 1-2A | 0.20 | D.G. | smectic (g, s, e) |
| 1-3 | 0.10 | D.G. | smectic (g, s, e) |
| 1-4 | 0.10 | D.G. | smectic (g, s, e) |
| 1-5 | 0.21 | D.G. | smectic (e) |
| 2-1 | 0.25 | D.G. | smectic (g, e) |
| 2-1A | 0.05 | D.G. | smectic (g, s, e) |
| 2-2 | 0.15 | D.G. | smectic (e) |
| 2-3 | 0.10 | D.G. | nematic (g, s, e) |
| 2-4 | 0.06 | D.G. | smectic (g, e) |
| 2-6 | 0.15 | D.G. | smectic (e) |
| 3-1 | 0.22 | D.G. | nematic (g, e) |
| 3-2 | 0.10 | D.G. | nematic (g, s, e) |
| 5-1 | 0.10 | D.G. | smectic (g, s, e) |
| 5-2 | 0.10 | D.G. | smectic (g, s, e) |
| 5-3 | 0.10 | D.G. | smectic (g, s, e) |
| 5-4 | 0.10 | D.G. | smectic (g, s, e) |
| 5-5 | 0.10 | D.G. | smectic (g, e) |
| 5-6 | 0.06 | D.G. | smectic (g, s, e) |
| 5-7 | 0.10 | D.G. | smectic (g, s, e) |
| 5-15 | 0.15 | D.G. | smectic (g, s, e) |
| 5-16 | 0.10 | D.G. | smectic (e) |
| 5-17 | 0.10 | D.G. | smectic (g, s, e) |
| 5-21 | 0.10 | D.G. | smectic (g, s, e) |
| 5-23 | 0.06 | D.G. | smectic (g, s, e) |
| 5-24 | 0.06 | D.G. | smectic (g, s, e) |
| 5-27 | 0.04 | D.G. | smectic (g, s, e) |
| 6-1 | 0.10 | D.G. | smectic (g, s, e) |
| 6-2 | 0.12 | D.G. | nematic (g, s, e) |
| 6-3 | 0.10 | D.G. | smectic (g, s, e) |
| 6-4 | 0.10 | D.G. | smectic (g, e) |
| 6-5 | 0.10 | D.G. | smectic (g, s, e) |
| 6-7 | 0.11 | D.G. | nematic (g, s, e) |
| 6-13 | 0.12 | D.G. | smectic (g, s, e) |
| 7-1 | 0.10 | D.G. | smectic (g, s, e) |
| 7-3 | 0.11 | D.G. | nematic (g, s, e) |

TABLE 16-continued

| Dye # | Dye Conc. (% w/w) | Solvent* | Liquid Crystal Phase† |
|---|---|---|---|
| 7-3 | 5.0 | water | nematic |
| 8-1 | 0.20 | R.G. | smectic (g, s, e) |
| 8-4 | 10.0 | water | nematic |
| 8-7 | 0.30 | D.G. | smectic (e) |
| 9-4 | 0.31 | D.G. | nematic (g, e) |
| 10-6 | 0.10 | D.G. | nematic (g, s, e) |
| 10-10 | 0.10 | D.G. | smectic (g, s, e) |
| 11-2 | 0.10 | D.G. | nematic (g, e) |
| 11-2 | 0.20 | R.G. | nematic (g, s, e) |
| 11-4 | 0.10 | D.G. | smectic (g, s, e) |
| 11-11 | 0.13 | D.G. | nematic (g, s, e) |
| 11-14 | 20.0 | water | hexagonal |
| 12-5 | 0.10 | D.G. | nematic (g, s, e) |
| 12-1 | 0.10 | D.G. | nematic (g, s, e) |
| 12-1 | 0.11 | R.G. | nematic (g, s, e) |
| 12-2 | 0.10 | D.G. | smectic (g, s, e) |
| 12-4 | 0.13 | D.G. | smectic (g, s, e) |
| 13-1 | 0.11 | D.G. | smectic (g, s, e) |
| 13-4 | 0.04 | D.G. | smectic (g, s, e) |
| 13-11 | 0.10 | D.G. | nematic (g, s, e) |
| 14-1 | 0.11 | D.G. | nematic (g, e) |
| 14-1 | 0.10 | R.G. | nematic (g, s, e) |
| 14-2 | 0.10 | D.G. | smectic (g, s, e) |
| 14-3 | 0.10 | R.G. | smectic (g, s, e) |
| 14-4 | 0.20 | R.G. | nematic (g, s, e) |
| 15-1 | 0.08 | D.G. | smectic (g, e) |
| A | 0.15 | D.G. | none apparent (g, s, e) |
| B | 0.13 | D.G. | none apparent (g, s, e) |
| C | 0.16 | D.G. | none apparent (g, s, e) |
| D | 0.21 | D.G. | none apparent (g, s, e) |
| E | 0.30 | D.G. | none apparent (g, s, e) |
| F | 0.10 | D.G. | none apparent (g, s, e) |
| G | 0.10 | D.G. | none apparent (g, s, e) |
| H | 0.10 | D.G. | none apparent (g, s, e) |
| I | 0.12 | D.G. | none apparent (g, s, e) |
| J | 0.10 | D.G. | none apparent (g, s, e) |
| K | 0.11 | D.G. | none apparent (g, s, e) |

*D.G. = 2.5% w/w aqueous Deionized (i.e. decalcified) Gelatin; R.G. = 2.5% w/w aqueous Regular (non-decalcified) Gelatin.
†The letters g, s and e refer to samples in the gelled, sol and evaporated states.

COMPARATIVE DYES
Comparative Dye A

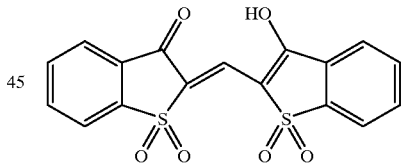

Comparative Dye B

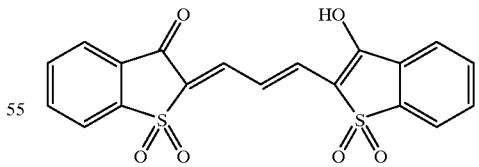

Comparative Dye C

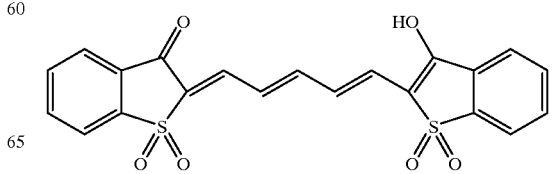

TABLE 16-continued

| Dye # | Dye Conc. (% w/w) | Solvent* | Liquid Crystal Phase† |
|---|---|---|---|

Comparative Dye D

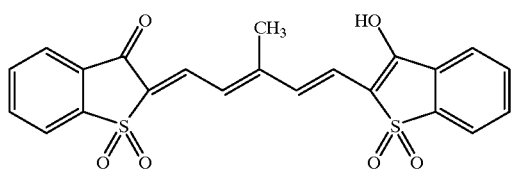

Comparative Dye E

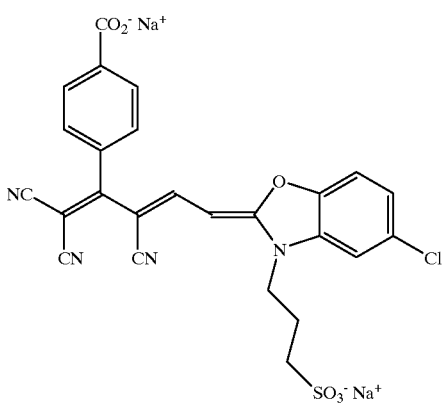

Comparative Dye F

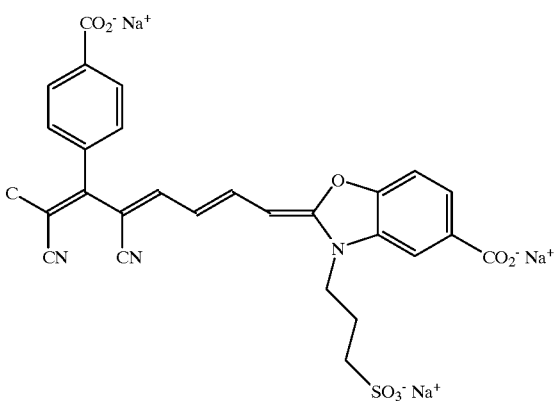

Comparative Dye G

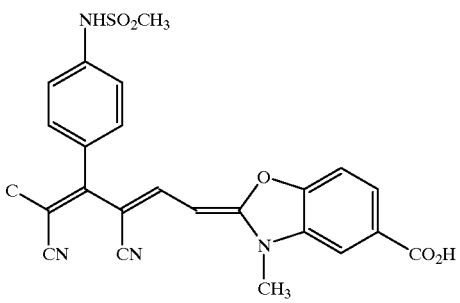

TABLE 16-continued

| Dye # | Dye Conc. (% w/w) | Solvent* | Liquid Crystal Phase† |
|---|---|---|---|

Comparative Dye H

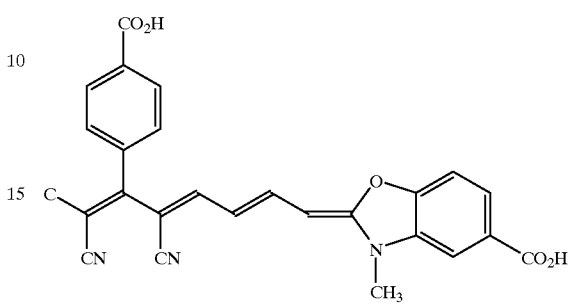

Comparative Dye I

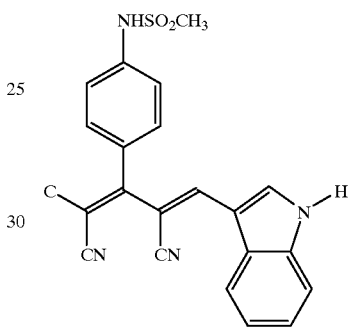

Comparative Dye J

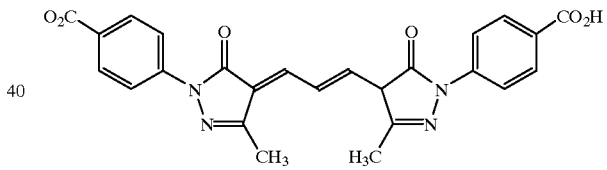

Comparative Dye K

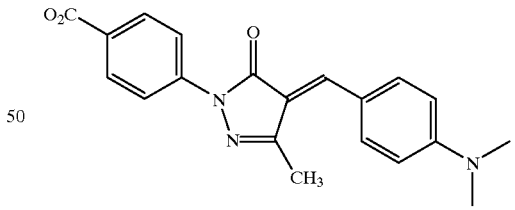

Example 2

Absorption wavelength $\lambda_{max}$), Halfbandwidth (Hbw) and Molar Extinction Coefficients ($\lambda_{max}$) of Wet Dye DGD's (Spectral properties of Typical Smectic Liquid crystals of Dyes).

Direct gelatin dispersions (DGD's) of Dyes 1-1, 1-1A, 1-4, 2-1A, 2-4, 5-2 to 5-4, 5-6, 5-7, 5-23, 5-24, 6-1, 6-3 to 6-5, 6-13, 11-4, 12-4, 13-1, 13-4, 13-5, 13-13, 15-1 and Comparative Dyes A-C and E-F were prepared as described for FormulationB. Aliquots of each dispersion, held at 39° C., were transferred to 0.0066 cm pathlength glass cells and their absorption spectra measured at 25 CC. These wet dispersions are referred to as "wet DGD's". Solutions of Dyes 1-1, 1-1A, 1-4, 2-1A, 2-4, 5-2 to 5-4, 5-6, 5-7, 5-23, 5-24, 6-1, 6-3 to 6-5, 6-13, 11-4, 12-4, 13-1, 13-4, 13-5, 13-13, 15-1 and Comparative Dyes A-C and E-F were prepared in a suitable organic solvent (methanol or methanol with added triethylamine unless otherwise noted) and their absorption spectra measured at 25° C. The extinction coefficients for the isotropic dye solutions and dye wet DGD's were calculated according to Beer's Law, and halfbandwidths (Hbw) measured. The data are summarized in Table 17.

inventive dyes are far superior in both Hbw and extinction coefficient to the comparative non liquid-crystalline dyes A–C and E–F.

Example 3

Dye Wandering Properties

Direct gelatin dispersion melts (Wet DGD's) were prepared for Dyes 1-1, 1-2, 5-2, 5-3, 5-6, 5-24, 6-1, 6-3, 6-7, 7-3, 11-4, 12-1, 12-4, 13-1, 14-1, 14-2, 14-4, 15-1 and Comparative Dyes A, B, E and F as described for Formulation B (wt % dye 0.06–0.1). Aqueous gelatin melts containing no dye were prepared as a receiver layer and chill set

TABLE 17

| Dye | $\lambda_{max}$ soln. (nm) | $\lambda_{max}$ soln. (mol$^{-1}$1 cm$^{-1}$) × 10$^4$ | Hbw soln. (nm) | $\lambda_{max}$ DGD (wet) (nm) | Wt % Dye in wet DGD | $\lambda_{max}$ DGD (wet) (mol$^{-1}$1 cm$^{-1}$) × 10$^4$ | Hbw DGD (wet) (nm) |
|---|---|---|---|---|---|---|---|
| 1-1 | 447 | 4.7 | 57 | 489 | 0.08 | 15.9 | 12 |
| 1-1A | 447 | 4.8 | 56 | 489 | 0.10 | 19.3 | 12 |
| 1-4 | 450 | 3.9 | 61 | 486 | 0.10 | 12.2 | 16 |
| 2-1A | 552 | 11.8 | 57 | 611 | 0.05 | 36.3 | 22 |
| 2-4 | 542 | 10.4 | 54 | 614 | 0.06 | 14.2 | 12 |
| 5-2 | 498 | 11.2 | 41 | 560 | 0.06 | 32.3 | 17 |
| 5-3 B23193 | 502 | 9.8 | 45 | 554 | 0.04 | 30.9 | 21 |
| 5-4 B23252 | 500 | 10.1 | 42 | 561 | 0.06 | 34.6 | 17 |
| 5-6 B23286 | 502 | 13.5 | 44 | 557 | 0.04 | 55.0 | 19 |
| 5-7 B23165 | 511 | 9.9 | 55 | 550 | 0.08 | 22.7 | 43 |
| 5-23 B23116 | 502 | 12.2 | 45 | 557 | 0.06 | 28.7 | 19 |
| 5-24 B23114 | 501 | 12.1 | 44 | 551 | 0.04 | 49.6 | 19 |
| 6-1 B21655 | 599 | 16.4 | 56 | 681 | 0.06 | 33.6 | 16 |
| 6-3 B22134 | 606 | 19.1 | 47 | 689 | 0.04 | 47.4 | 38 |
| 6-4 B23166 | 607 | 11.1 | 82 | 666 | 0.04 | 44.2 | 33 |
| 6-5 B22019 | 584 | 12.5 | 68 | 684 | 0.06 | 32.1 | 36 |
| 6-13 | 603 | 12.2 | 78 | 680 | 0.04 | 52.3 | 33 |
| 11-4 B23249 | 444 | 8.7 | 39 | 474 | 0.08 | 21.7 | 17 |
| 12-4 | 566 | 12.7 | 44 | 638 | 0.06 | 45.2 | 21 |
| 13-1 | 579 | 6.7 | 69 | 628 | 0.06 | 43.8 | 19 |
| 13-4 | 575 | 7.3 | 70 | 629 | 0.06 | 42.9 | 19 |
| 13-13 | 577 | 14.4 | 63 | 625 | 0.04 | 26.7 | 33 |
| 14-2 | 450 | 5.4 | 63 | 449 | 0.10 | 5.3 | 100 |
| 15-1 | 472 | 3.5 | 76 | 556 | 0.08 | 5.6 | 19 |
| A | 442 | 3.5 | 56 | 439 | 0.10 | 6.8 | 59 |
| B | 550 | 10.8 | 56 | 537 | 0.13 | 10.1 | 74 |
| C | 643 | 14.0 | 66 | 639 | 0.10 | 10.7 | 141 |
| D | 499 | 11.5 | 41 | 497 | 0.04 | 6.3 | 52 |
| F | 598 | 8.5 | 54 | 589 | 0.06 | 5.3 | 84 |

The above results demonstrate that the direct gelatin dispersions containing the inventive dyes, dispersed in a smectic liquid-crystalline state, exhibit bathochromically or hypsochromically-shifted absorption maxima relative to their isotropic solution (i.e. monomeric) absorption maxima. Moreover, the inventive dyes, when formulated as wet liquid-crystalline DGD's, exhibit higher extinction coefficients and narrower halfbandwidths compared to their non liquid-crystalline, isotropic solution states in a solvent such as methanol. Moreover, as wet liquid-crystalline DGD's the detail formulation specs, i.e. wt % gel=2.5%). The set gelatin receiver pads were allowed to equilibrate at 25 C. The wet DGD melts (held at 39 C) were pipeted atop the gelatin receiver pads and allowed to sit for 24 hr. Observed color in the bottom layer representing solubilized, mobile dye was recorded after 2 hours and 24 hours on a scale of 0 to 5 with 0 being no color observed migrating and 5 meaning that the upper and lower layers appeared identical in color (full equilibration). Observations are recorded in Table 18.

TABLE 18

| Dye | Liquid crystal phase (microscopy) (from Table 16) | Observed Color after 1 hour (0 to 5) | Observed Color after 24 hours (0 to 5) |
|---|---|---|---|
| 1-1 | smectic | 1 | 2 |
| 1-2 | smectic | 1 | 2 |
| 5-2 | smectic | 0 | 1 |
| 5-3 | smectic | 0 | 0 |
| 5-6 | smectic | 0 | 1 |
| 5-24 | smectic | 0 | 0 |
| 6-1 | smectic | 0 | 0 |
| 6-3 | smectic | 0 | 0 |
| 6-7 | nematic | 0 | 0 |
| 7-3 | nematic | 1 | 3 |
| 11-4 | smectic | 1 | 2 |
| 12-1 | nematic | 0 | 1 |

Example 4

Absorption Wavelength ($\lambda_{max}$), Halfbandwidth (Hbw) and Molar Extinction Coefficients ($\lambda_{max}$) of Wet Dye DGD's (Spectral properties of Typical Nematic Liquid crystals).

Direct gelatin dispersions (DGD's) of Dyes 2-3, 6-7, 7-3, 10-6, 11-11, 12-1, 13-11, 14-1, 14-4 and Comparative Dyes A–C and E–F were prepared as described for Formulation B. Aliquots of each dispersion, held at 39° C., were transferred to 0.0066 cm pathlength glass cells and their absorption spectra measured at 25° C. These wet dispersions are referred to as "wet DGD's". Solutions of Dyes and Comparative Dyes A–B and E–F were prepared in a suitable organic solvent (methanol or methanol with added triethylamine unless otherwise noted) and their absorption spectra measured at 25° C., and their halfbandwidths (Hbw) measured. The data are summarized in Table 19.

TABLE 19

| Dye | $\lambda_{max}$ soln. (nm) | $\lambda_{max}$ soln. (mol$^{-1}$ l cm$^{-1}$) × 10$^4$ | Hbw soln. (nm) | $\lambda_{max}$ DGD (wet) (nm) | Wt % Dye in wet DGD | $\lambda_{max}$ DGD (wet) (mol$^{-1}$ l cm$^{-1}$ × 10$^5$ | Hbw DGD (wet) (nm) |
|---|---|---|---|---|---|---|---|
| 2-3 | 548 | 10.7 | 56 | 614 | 0.10 | 17.0 | 17 |
| 6-7 | 636 | 18.0 | 51 | 599 | 0.10 | 14.4 | 48 |
| 7-3 | 533 | 11.25 | 52 | 549 + 627 | 0.20 | >9.3 | 34 |
| 10-6 | 439 | 8.05 | 56 | 432 | 0.20 | 7.6 | 52 |
| 11-1 | 560 | 11.9 | 55 | 490 + 576 | 0.10 | >6.9 | 152 |
| 12-1 | 541 | 13.7 | 44 | 576 + 538 | 0.10 | >5.8 | 82 |
| 13-11 | 474 | 8.1 | 61 | 480 | 0.20 | 10.1 | 67 |
| 14-1 | 460 | 5.1 | 65 | 428 | 0.20 | 6.3 | 59 |
| 14-4 | 510 | 6.7 | 70 | 454 | 0.20 | 5.0 | 55 |
| A | 442 | 5.7 | 56 | 448 | 0.13 | 6.8 | 52 |
| B | 550 | 10.8 | 56 | 537 | 0.13 | 10.1 | 74 |
| E | 499 | 11.5 | 41 | 497 | 0.04 | 6.3 | 52 |
| F | 601 | 8.5 | 54 | 589 | 0.06 | 5.3 | 84 |

TABLE 18-continued

| Dye | Liquid crystal phase (microscopy) (from Table 16) | Observed Color after 1 hour (0 to 5) | Observed Color after 24 hours (0 to 5) |
|---|---|---|---|
| 12-4 | smectic | 0 | 0 |
| 13-1 | smectic | 0 | 0 |
| 14-1 | nematic | 1 | 2 |
| 14-2 | smectic | 1 | 2 |
| 14-4 | nematic | 0 | 1 |
| 15-1 | smectic | 1 | 1 |
| A | none | 2 | 3 |
| B | none | 2 | 5 |
| E | none | 2 | 4 |
| F | none | 3 | 5 |

The above data clearly demonstrate that the inventive liquid crystal-forming dyes, whether nematic or smectic in nature, remain largely, and in some cases completely immobile when coated, and do not appreciably migrate from the layer in which they are coated. By contrast, the comparative dyes migrate freely from the layer in which they are coated to adjacent layers. This example demonstrates a fundamental advantage of the inventive liquid crystal-forming dyes over soluble dyes widely used in the art.

The above results demonstrate that the direct gelatin dispersions containing some of the inventive nematic liquid crystal-forming dyes display a wider range of spectral properties than the smectic liquid crystal-forming dyes of the previous example. These properties range from clearly advantaged in terms of extinction coefficient and halfbandwidth to somewhat disadvantaged relative to the corresponding isotropic solution. However, the inventive liquid crystal-forming dyes of this example all possess the superior property of being slow or non-diffusing in coated layers as compared with the monomeric (non-liquid crystalline) comparative dyes (see Example 3), an important physical property typical of liquid crystal phases.

Example 5

Spectral Properties of Evaporated Dye DGD Coatings.

Direct gelatin dispersions (DGD's) of Dyes 1-1 to 1-5, 2-1 to 2-4, 2-6, 3-1, 4-3, 5-1 to 5-7, 5-15 to 5-17, 5-21, 5-23, 5-24, 5-27, 6-1 to 6-5, 6-13, 7-1, 8-1, 8-7, 10-1, 10-10, 11-1, 11-2, 11-4, 12-4, 13-1, 13-4, 13-5, 13-13, 15-1 and Comparative Dyes A–F were prepared using powdered dye as described for FormulationB. Aliquots of each dispersion, held at 39° C., were then smeared onto standard glass microscope slides (0.8/1.0 mm thickness) to form uniformly thin wet films which were allowed to dry at ambient temperature and humidity for at least 17 hours such that their $D_{max}$(evap) was less than 4.0 absorbance units. The absorption spectra for these evaporated gelatin films were then measured at 25° C. These samples are referred to in Table 20 as "evap DGD's". Solutions for each of the above listed dyes were prepared in a suitable organic solvent (methanol or methanol with added triethylamine unless otherwise noted) and their absorption spectra measured at 25° C. For each dye, the difference in absorbance maxima between the coated dye and the dye dissolved in a solvent ($\Delta \lambda_{max}=(\lambda_{max}\ DGD_{evap}-\lambda_{max\ soln})$), and the difference in halfbandwidth between the coated dye and the dye dissolved in a solvent ($\Delta$ Hbw=Hbw Evap DGD–Hbw soln) were calculated. The data are summarized in Table 20.

TABLE 20

| Dye | $\lambda_{max}$ soln. (nm) | $\lambda_{max}$ Evap DGD (nm) | Hbw soln (nm) | Hbw Evap (nm) | $\Delta \lambda_{max}$ (nm) | $\Delta$Hbw (nm) |
|---|---|---|---|---|---|---|
| 1-1 | 447 | 488 | 57 | 15 | +38 | −42 |
| 1-1A | 447 | 487 | 56 | 14 | +40 | −42 |
| 1-2 | 439 | 476 | 53 | 13 | +37 | −40 |
| 1-2A | 434 | 477 | 51 | 13 | +43 | −38 |
| 1-3 | 454 | 483 | 53 | 14 | +29 | −39 |
| 1-4 | 450 | 486 | 61 | 21 | +36 | −40 |
| 1-5 | 447 | 476 | 55 | 19 | +29 | −36 |
| 2-1 | 552 | 610 | 58 | 19 | +58 | −39 |
| 2-1A | 552 | 610 | 57 | 21 | +58 | −36 |
| 2-3 | 548 | 610 | 56 | 18 | +62 | −38 |
| 2-4 | 542 | 609 | 54 | 15 | +67 | −39 |
| 2-6 | 543 | 624 | 39 | 12 | +81 | −27 |
| 3-1 | 670 | 487 | 58 | 24 | −183 | −34 |
| 4-3 | 677 | 804 | 78 | 21 | +127 | −57 |
| 5-1 | 495 | 545 | 43 | 23 | +50 | −20 |
| 5-2 | 498 | 561 | 41 | 19 | +63 | −21 |
| 5-3 | 502 | 553 | 45 | 22 | +51 | −23 |
| 5-4 | 500 | 554 | 44 | 24 | +54 | −20 |
| 5-5 | 506 | 562 | 46 | 20 | +56 | −26 |
| 5-6 | 502 | 555 | 44 | 17 | +53 | −27 |
| 5-7 | 511 | 551 | 55 | 39 | +40 | −16 |
| 5-15 | 533 | 599 | 42 | 31 | +66 | −11 |
| 5-16 | 549 | 616 | 57 | 25 | +67 | −32 |
| 5-17 | 536 | 600 | 44 | 31 | +64 | −13 |
| 5-21 | 495 | 552 | 42 | 44 | +57 | +2 |
| 5-23 | 501 | 552 | 44 | 21 | +51 | −23 |
| 5-24 | 502 | 556 | 45 | 20 | +54 | −25 |
| 5-27 | 537 | 611 | 39 | 17 | +74 | −22 |
| 6-1 | 599 | 684 | 56 | 24 | +85 | −32 |
| 6-2 | 592 | 677 | 56 | 40 | +75 | −16 |
| 6-3 | 606 | 688 | 47 | 46 | +60 | −1 |
| 6-4 | 607 | 670 | 82 | 31 | +63 | −51 |
| 6-5 | 584 | 684 | 68 | 36 | +100 | −32 |
| 6-13 | 603 | 682 | 78 | 27 | +79 | −51 |
| 7-1 | 631 | 472 | 58 | 12 | −159 | −46 |
| 8-1 B23209 | 455 | 503 | 52 | 61 | +48 | +9 |
| 8-7 | 640 | 724 | 80 | 49 | +84 | −31 |
| 10-1 | 430 | 465 | 48 | 47 | +35 | −1 |
| 10-10 | 438 | 454 | 52 | 19 | +16 | −33 |
| 11-1 | 437 | 443 | 51 | 40 | +6 | −11 |
| 11-2 | 444 | 469 | 39 | 48 | +25 | −11 |
| 11-4 | 444 | 477 | 39 | 19 | +33 | −20 |
| 12-4 | 560 | 637 | 44 | 21 | +77 | −23 |
| 13-1 | 579 | 630 | 69 | 20 | +51 | −49 |
| 13-4 | 575 | 630 | 70 | 20 | +55 | −50 |
| 13-5 | 572 | 641 | 64 | 14 | +69 | −50 |
| 13-13 | 577 | 625 | 63 | 33 | +48 | −30 |
| 15-1 B22527-Na | 472 | 552 | 76 | 20 | +80 | −56 |
| A | 442 | 450 | 56 | 55 | +8 | −1 |
| B | 550 | 553 | 56 | 65 | +3 | +9 |
| C | 643 | 657 | 66 | 106 | +14 | +40 |
| D | 662 | 671 | 66 | 50 | +9 | −16 |
| E | 499 | 508 | 41 | 72 | +9 | +31 |
| F | 601 | 606 | 53 | 92 | +5 | +39 |

The above results clearly demonstrate the useful spectral features of the inventive liquid crystal-forming dyes in evaporated coatings relative to the spectral features exhibited in their solution state. The coated inventive dyes exhibit absorbance maxima which are significantly bathochromic or hypsochromic, and halfbandwidths (Hbw) which are significantly narrower than those of the dyes dissolved in solvent (non liquid-crystalline). It is also clear from the above data that the coated comparative dyes A–F exhibit no comparable advantageous spectral changes relative to their dissolved solution state.

Example 6

Spectral Properties of Wet and Evaporated Dye DGD's.

Direct gelatin dispersions (DGD's) of Dyes 1-1 to 1-5, 2-1, 2-1A, 2-3, 2-4, 2-6, 3-1, 5-1 to 5-4, 5-6, 5-7, 5-16, 5-23, 5-24, 6-1, 6-3 to 6-5, 6-13, 7-1, 11-4, 12-4, 13-1, 13-4, 13-3, 15-1 and Comparative Dyes A–C and E–F were prepared using powdered dye as described for FormulationB. Aliquots of each dispersion, held at 39° C., were transferred to 0.0066 cm pathlength glass cells and their absorption spectra measured immediately at 25° C. These samples are referred to in Table 21 as "wet DGD's". Solution aliquots of each dispersion were also smeared onto standard glass microscope slides (0.8/1.0 mm thickness) to form uniformly thin wet films which were allowed to dry at ambient temperature and humidity for at least 17 hours such that their $D_{max}$ (evap) was less than 4.0 absorbance units. The absorption spectra for these evaporated gelatin films were then measured at 25° C. These samples are referred to in Table 21 as "Evap DGD". The data are summarized in Table 21.

TABLE 21

| Dye | $\lambda_{max}$ Wet DGD (nm) | $\lambda_{max}$ Evap DGD (nm) | Hbw Wet (nm) | Hbw Evap (nm) |
|---|---|---|---|---|
| 1-1 | 489 | 488 | 12 | 15 |
| 1-1A | 489 | 487 | 12 | 14 |
| 1-2 | 434 | 476 | 55 | 13 |
| 1-2A | 480 + 441 | 477 | 58 | 13 |
| 1-3 | 484 + 457 | 483 | 55 | 14 |
| 1-4 | 486 | 486 | 16 | 21 |
| 1-5 | 445 | 476 | 59 | 19 |
| 2-1 | 546 + 611 | 610 | >100 | 19 |
| 2-1A | 611 | 610 | 22 | 18 |
| 2-3 | 614 | 610 | 17 | 18 |
| 2-4 | 614 | 609 | 12 | 15 |
| 2-6 | 503 + 617 | 624 | 57 | 12 |
| 3-1 | 563 + 490 | 487 | 135 | 24 |
| 5-1 | 544 + 497 | 544 | 57 | 24 |
| 5-2 | 560 | 561 | 17 | 19 |
| 5-3 | 554 | 553 | 21 | 22 |
| 5-4 | 560 | 554 | 17 | 24 |
| 5-6 | 557 | 555 | 19 | 17 |
| 5-7 | 550 | 551 | 43 | 39 |
| 5-16 | 552 + 611 | 616 | 86 | 25 |
| 5-23 | 557 | 552 | 19 | 21 |
| 5-24 | 551 | 556 | 19 | 20 |
| 6-1 | 681 | 684 | 16 | 24 |
| 6-3 | 689 | 688 | 38 | 46 |
| 6-4 | 666 | 670 | 33 | 31 |
| 6-5 | 684 | 684 | 36 | 36 |
| 6-13 | 680 | 682 | 33 | 27 |
| 7-1 | 474 | 472 | 22 | 12 |
| 11-4 | 474 | 477 | 17 | 19 |
| 12-4 | 638 | 637 | 21 | 21 |
| 13-1 | 628 | 630 | 19 | 20 |
| 13-4 | 629 | 630 | 19 | 20 |
| 13-3 | 624 | 625 | 33 | 33 |
| 15-1 | 556 + 487 | 552 | 19 | 20 |
| A | 448 | 450 | 52 | 54 |
| B | 537 | 553 | 74 | 65 |
| C | 636 | 657 | 135 | 106 |
| E | 497 | 508 | 52 | 72 |
| F | 589 | 606 | 84 | 92 |

The above results clearly demonstrate that the useful spectral features of bathochromic absorbance maximum and narrow halfbandwidth for each inventive dye in the liquid-crystalline state in wet aqueous gelatin, are largely retained in evaporated gelatin films or layers, and that in some cases the spectral features dramatically improve as excess water is removed from the coating.

Example 7
Influence of Substituents on Spectral Properties of Coated Dyes.

Direct gelatin dispersions (DGD's) of Dyes 1-1 A, 2-1A, 5-1 to 5-3, 6-1 to 6-3 and Comparative Dyes A, B, E and F were prepared using powdered dye as described for Formulation B such that the wt % dye in each sample was nominally 0.06–0.10 %. Aliquots of each dispersion, held at 39° C., were transferred to 0.0066 cm pathlength glass cells and their absorption spectra measured at 25° C. These samples are referred to as "Wet DGD's". In addition, solution aliquots of each dispersion were also smeared onto standard glass microscope slides (0.8/1.0 mm thickness) to form uniformly thin wet films which were allowed to dry at ambient temperature and humidity for at least 17 hours such that their $D_{max}$(evap) was less than 4.0 absorbance units. These samples are referred to as "evap DGD's". For each dye, the absorbance maxima for the monomer band ($\lambda_{Mmax}$), and for the bathochromic band corresponding to the liquid crystalline phase ($\lambda lc_{max}$) were measured for both the "Wet DGD's" and the "Evap. DGD's", and the optical densities (O.D.) at the $\lambda_{max}$ of the monomer band (O.D-M) and for the bathochromic band corresponding to the liquid crystal phase (O.D.-lc) were measured for both the "Wet DGD's" and the "Evap. DGD's", then the ratios ((O.D-lc)/(O.D-M)) were calculated. The results are shown in Table 22.

TABLE 22

| Dye | λ M$_{max}$ Wet DGD (nm) | λ lc$_{max}$ Wet DGD (nm) | λ M$_{max}$ Evap DGD (nm) | λ lc$_{max}$ Evap DGD (nm) | Wet DGD (O.D.-lc/O.D.-M) | Evap DGD (O.D.-lc/O.D.-M) |
|---|---|---|---|---|---|---|
| 6-2 B22084 | 585 | 679 | 582 | 679 | 3.8 | 3.9 |
| 6-1 B21655 | 600 | 681 | 600 | 683 | 8.0 | 8.0 |
| 6-3 B22134 | 610 | 683 | 610 | 688 | 6.6 | 6.5 |
| 5-1 B22083 | 497 | 545 | 500 | 546 | 2.1 | 5.7 |
| 5-2 B-23244 | 500 | 560 | 500 | 561 | 7.1 | 10.7 |
| 5-3 B22193 | 500 | 554 | 500 | 554 | 6.5 | 7.1 |
| 1-1A B22550-T | 455 | 489 | 450 | 488 | 2.6 | 4.6 |
| 2-1A B22551-H | 551 | 611 | 553 | 610 | 3.2 | 6.0 |
| F | 589 | none | 606 | none | 0 | 0 |
| E | 497 | none | 508 | none | 0 | 0 |
| A | 450 | none | 452 | none | 0 | 0 |
| B | 550 | none | 554 | none | 0 | 0 |

The above data clearly show that the presence or absence of hydrophobic substituents within a given dye class dramatically influence the propensity of a dye to form a liquid crystalline phase. The data shows that the inventive dyes are preferentially substituted as compared with the comparative dyes to favor stable liquid crystal formation, and that the most preferred dyes have excellent ratios between the liquid crystal and monomer bands even in the wet melts ("Wet DGD's). Also, within the groups of inventive dyes 5-1 to 5-3 and 6-1 to 6-3, liquid crystal phase properties are improved for the dyes bearing phenyl, benzo or chloro substituents relative to the unsubstituted analogs. The optimal balance between hydrophilic and hydrophobic groups will differ somewhat between dye classes.

Example 8
Spectral Properties of Dried Gelatin Layers Containing Dyes Formulated Using Formulation A (SPD milling) and Formulation B (DGD) Procedures.

Direct gelatin dispersions of the Inventive Dyes 1-1, 1-1A and 2-1 were prepared as described for FormulationB at concentrations equivalent to dye laydowns of 0.064 g/m$^2$. Solution aliquots of each dispersion were smeared onto glass microscope slides (0.8/1.0 mm thickness) to form uniformly thin wet films which were then allowed to dry at ambient temperature and humidity for at least 17 hours. The absorption spectra for these dried films were then measured at 25° C. These samples are referred to in Table 23 as "Evap. DGD's". The inventive dyes 1-1, 1-1A and 2-1 were also dispersed in aqueous gelatin using the Formulation A procedure described for FormulationA. These dispersions were coated on a polyester support according to the following procedure. A spreading agent (Olin 10G, an isononylphenoxy glycidol surfactant available from Olin Corp.) and a hardener (bis(vinylsulfonylmethyl)ether) were added to the dye-gelatin melt prepared as described above. A melt from this mixture was then coated on a poly(ethylene terephthalate) support to achieve a dye coverage of 0.043 to 0.129 g/m$^2$, a gelatin coverage of 1.61 g/m$^2$, and a hardener level of 0.016 g/m$^2$. These samples are referred to in Table 23 as "Evap SPD's". The absorption spectrum of the evaporated coating was measured at 25° C. The data are summarized in Table 23.

TABLE 23

| Dye | λ$_{max}$ Evap DGD (nm) | Hbw Evap DGD (nm) | λ$_{max}$ Evap SPD (nm) | Hbw Evap SPD (nm) |
|---|---|---|---|---|
| 1-1 | 488 | 15 | 488 | 20 |
| 1-1A | 487 | 14 | 488 | 22 |
| 2-1 | 610 | 19 | 610 | 22 |

The data show no significant differences in $\lambda_{max}$ or Hbw for the dried gelatin films containing the inventive liquid crystal-forming dyes formulated according to Formulation A (SPD)or Formulation B (DGD) procedures outlined in Examples A and B, respectively. Thus the advantageous spectral properties of the inventive dyes in a liquid-crystalline state can be obtained using the simpler procedure (Formulation B) without the need to resort to the more complex milling procedure (Formulation A) commonly used for solid particle dyes.

Example 9
Spectral Shape of Evaporated Dye DGD's.

Direct gelatin dispersions (DGD's) of Dyes 1-1 to 1-5, 2-1 to 2-4, 3-1 were prepared as described for FormulationB. Solution aliquots of each dispersion were also smeared onto standard glass microscope slides (0.8/1.0 mm thickness) to form uniformly thin wet films which were allowed to dry at ambient temperature and humidity for at least 17 hours such that their $D_{max}$(evap) was less than 2.5 absorbance units. The absorbance spectrum for each coated DGD was measured. Comparative solid particle dyes D, G, H, I, J and K were prepared as described for FormulationA. Melts for each comparative dye was then coated on a poly(ethylene terephthalate) support to achieve a dye coverage of 0.043 to 0.129 g/m$^2$, a gelatin coverage of 1.61 g/m$^2$, and a hardener level of 0.016 g/m$^2$. The absorption maxima and halfbandwidths (Hbw) of the dried coatings were measured at 25° C. The ratio of each dye's optical density at $\lambda_{max}(D_{max})$ to optical density (O.D.) at $\lambda_{max}+20$ nm was calculated. The ratio of each dye's optical density at $\lambda_{max}(D_{max})$ to optical density (O.D.) at $\lambda_{max}-20$ nm was also calculated. These ratios are a measure of spectral band sharpness. Dyes with higher ratios possess sharper cutting spectral absorption envelopes which are desirable for light filtration/absorption applications. The data are summarized in Table 24.

TABLE 24

| Dye | $\lambda_{max}$ (nm) | HBW (nm) | $D_{max}$/O.D. at $\lambda_{max+20\ nm}$ | $D_{max}$/O.D. at $\lambda_{max-20\ nm}$ |
|---|---|---|---|---|
| 1-1A | 487 | 14 | >20 | 3.36 |
| 1-2 | 476 | 13 | >20 | 2.3 |
| 1-2A | 477 | 13 | >20 | 3.0 |
| 1-3 | 483 | 14 | >20 | 2.1 |
| 1-4 | 486 | 21 | >20 | 2.3 |
| 1-5 | 476 | 19 | >20 | 2.5 |
| 2-1 | 610 | 19 | >20 | 3.5 |
| 2-1A | 610 | 21 | >20 | 1.8 |
| 2-3 | 610 | 18 | >20 | 3.2 |
| 2-4 | 609 | 15 | >20 | 7.2 |
| 2-6 | 624 | 12 | >20 | 2.3 |
| 3-1 | 487 | 24 | 2.5 | 4.4 |
| 5-2 | 561 | 19 | 16.1 | 3.6 |
| 5-3 | 553 | 22 | 16.1 | 2.9 |
| 5-4 | 554 | 24 | >20 | 6.4 |
| 5-6 | 555 | 17 | 10.1 | 3.1 |
| 5-15 | 599 | 31 | 7.6 | 1.9 |
| 5-16 | 616 | 24 | 19.3 | 0.8 |
| 5-27 | 612 | 20 | 15.7 | 3.5 |
| 6-1 | 684 | 24 | >20 | 2.0 |
| 6-3 | 666 | 46 | 1.9 | 1.5 |
| 6-4 | 670 | 31 | 6.0 | 2.1 |
| 6-5 | 684 | 36 | 4.0 | 1.9 |
| 6-13 | 682 | 27 | 8.8 | 2.2 |
| 7-1 | 472 | 12 | 3.5 | 7.8 |
| 10-10 | 454 | 19 | 10.9 | 2.4 |
| 11-4 | 477 | 19 | >20 | 2.8 |
| 12-4 | 637 | 21 | 15.2 | 3.3 |
| 13-1 | 630 | 20 | >20 | 3.3 |
| 13-5 | 641 | 14 | >20 | 2.3 |
| 15-1 | 552 | 20 | >20 | 3.3 |
| D | 676 | 102 | 1.8 | 1.34 |
| G | 476 | 110 | 1.2 | 1.05 |
| H | 654 | 200 | 1.2 | 1.16 |
| I | 446 | 93 | 1.2 | 1.29 |
| J | 538 | 130 | 1.1 | 1.04 |
| K | 432 | 100 | 1.1 | 1.12 |

The data clearly demonstrate that the inventive liquid crystal-forming dyes when coated in aqueous gelatin coatings possess absorption spectra with significantly narrower absorbance envelopes and exhibit sharper hypsochromic and bathochromic edges relative to the comparative solid particle dyes. It should also be noted that for the inventive dyes with ratios marked as ">20", the O.D+20 nm value is sufficiently low that it has no measurable density relative to noise. It should also be noted that when the comparative dyes were formulated using Formulation B, the quality of the resulting coatings was very poor due to the insolubility of the dyes in the melts. The comparative dyes were therefore milled (Formulation A) prior to coating, as is the usual procedure for solid particle dyes. Therefore, the dyes of this invention not only possess spectral properties far superior to the comparative examples, but their superior properties may be obtained without requiring the more complex Formulation A procedure by instead using the simple Formulation B procedure.

This example demonstrates a fundamental advantage of the inventive liquid crystal-forming dyes over solid particle dyes. This example also demonstrates that the inventive liquid crystalline dyes provide sharp, narrowly absorbing spectra in coatings that are virtually unachievable using traditional solid particle dyes.

Example 10

Covering Power of Liquid Crystalline Dyes Versus Solid Particle (Microcrystalline) Analogs Melts of Dyes 1-1, 2-1 were prepared as described for FormulationB. Melts for Comparative Dyes D, J and K were prepared as described as described for FormulationA. (Formulation A was used for the microcrystalline comparative dyes for the same reasons cited in the previous example). Melts for each dye were then coated on a poly (ethylene terephthalate) support to achieve a dye coverage of 0.043 to 0.129 g/m$^2$, a gelatin coverage of 1.61 g/m$^2$, and a hardener level of 0.016 g/m$^2$. The absorption of the dried coatings were measured at 25° C. The covering power for each of the coated dyes was calculated by dividing the optical density (O.D.) at $\lambda_{max}$ by the dye laydown in mg/ft2. The data are summarized in Table 25.

TABLE 25

| Dye | $\lambda_{max}$ coating (nm) | Covering power of coated dye |
|---|---|---|
| 1-1 | 488 | 0.23 |
| 2-1 | 610 | 0.48 |
| D | 670 | 0.11 |
| J | 538 | 0.15 |
| K | 432 | 0.09 |

It is clear from the above data that coated inventive dyes possess far superior covering power relative to those of the comparative solid particle dyes. It is also evident from this data that the inventive liquid crystalline dyes allow for much smaller quantities of coated materials to be used to achieve a required optical density level at $D_{max}$ versus those of the comparative dyes. This example demonstrates another fundamental advantage of the inventive liquid crystal-forming dyes over solid particle dyes. This example also demonstrates that the inventive liquid crystalline dyes provide sharp, narrowly absorbing spectra in coatings that are virtually unachieveable by traditional solid particle dyes.

Example 11

Process Removability of Dyes

The inventive Dyes 1-1, 1-1A, 1-2, 1-2A, and 2-1 were formulated according to Formulation B. These dye dispersions were coated on a polyester support according to the following procedure. A spreading agent (surfactant 10G) and a hardener (bis(vinylsulfonylmethyl)ether) were added to the dye-gelatin melt prepared as described above. A melt from this mixture was then coated on a poly(ethylene terephthalate) support to achieve a dye coverage of 0.043 to 0.161 g/m$^2$, a gelatin coverage of 1.61 g/m$^2$, and a hardener level of 0.016 g/m$^2$. The absorption spectrum of the dried coating was measured at 25° C. Identical elements were subjected to Kodak E-6® processing (which is described in *British Journal of Photography Annual*, 1977, pp. 194–97)

and the absorbance was measured for each. The results are shown in Table 26.

TABLE 26

| Dye | $\lambda_{max}SPD_{dry}$ (nm) | $D_{max}$ | $D_{max}$ after E-6 Processing |
|---|---|---|---|
| 1-1 | 488 | >1.0 | 0.0 |
| 1-1A | 488 | >1.0 | 0.0 |
| 1-2 | 476 | >1.0 | 0.0 |
| 1-2A | 476 | >1.0 | 0.0 |
| 2-1 | 610 | >2.0 | 0.0 |

In spite of the inordinately high optical densities ($D_{max}$'s) for such low dye laydowns of the liquid crystal-forming coated dyes, no residual deleterious dye stain (optical density) could be detected after processing.

Example 12

Thermal Stability

The inventive Dyes 1-1, 1-1A, 2-1 and 2-1A were formulated using the Formulation B and coated on a polyester support as outlined in Example 11. Each dye was coated at a laydown such that the measured $D_{max}$ was less than 2.0. For each example, the absorbance spectrum for the dyed gelatin coating was measured both before and after incubation for seven days at 120° C./50% relative humidity. The results are summarized in Table 27.

TABLE 27

| Dye | Dye laydown (g/m$^2$) | $\lambda_{max}$ SPD (nm) | $D_{max}$ SPD before incubation | $D_{max}$ SPD after incubation |
|---|---|---|---|---|
| 1-1 | 0.043 | 488 | 0.9 | 0.9 |
| 1-1A | 0.043 | 488 | 0.6 | 0.6 |
| 2-1 | 0.129 | 610 | 1.9 | 1.8 |

It is clear from the data that the liquid crystal-forming dyes in the inventive examples show an excellent robustness toward high heat and humidity as evidenced by the fact that little or no density loss at the bathochromic $\lambda_{max}$ is observed as a result of incubation. Furthermore, the absence of any detectable optical density at the monomeric $\lambda_{max}$ of the inventive dyes following incubation demonstrates that little or no mobile monomeric dye species is produced under these conditions. Consequently, the inventive dyes in the liquid-crystalline state exhibit excellent robustness and fastness to diffusion at high temperature and humidity.

In summary, the above examples demonstrate that the inventive dyes successfully solve the problems inherent in the filter dyes of the prior art. Soluble dyes typically migrate in coatings unless mordanted. Solid particle dyes typically do not migrate, but their spectral envelopes are generally very broad, low in covering power, and not sharp-cutting. Furthermore, solid particle dyes require specialized milling procedures for incorporation into coated elements. Our examples demonstrate that our inventive liquid crystal-forming dyes possess the combination of superior spectral characteristics of high extinction, narrow bandwidth, and sharp-cutting edges and furthermore remain immobile and therefore allow layer-specific dyeing without the use of mordants. Moreover, many of the liquid crystal-forming dyes of this invention are readily decolorized or removed from the photographic element upon processing, leaving little or no post-process dye stain.

The invention has been described in detail with particular reference to preferred embodiments, but it will be understood that variations and modifications can be effected within the spirit and scope of the invention.

What is claimed is:

1. A dispersion comprising a solvent having dispersed therein a lyotropic liquid-crystal forming dye of structural Formula I:

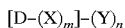

$$[D-(X)_m]-(Y)_n \qquad I$$

wherein:

D is a light-absorbing chromophore other than a cyanine dye, an azo dye or a barbituric acid oxonol dye;

each Y contains an ionic or a nonionic solubilizing substituent or a group with a pKa value of less than 4 in water;

each X is a nonionic substituent;

n is 0 to 10;

m is 0 to 10; and the resulting dye forms a liquid-crystalline phase in solvent.

2. A dispersion according to claim 1, wherein the solvent is water or an aqueous medium containing a hydrophilic colloid.

3. A dispersion according to claim 2, wherein the hydrophilic colloid is gelatin.

4. A dispersion according to claim 1 wherein D is derived from an arylidene dye, an oxonol dye, a merocyanine dye, a styryl dye, a coumarin dye, a hemioxonol dye, a metal-chelated dye, a triarylmethane dye, an indoaniline dye, a chalcone dye, an anthraquinone dye, or a butadiene dye.

5. A dispersion according to claim 1, wherein Y is carboxylate ($CO_2^-$), sulfo ($SO_3^-$), sulfato ($OSO_3^-$), sulfate ($SO_4^-$), phosphate, phosphonate, trialkylammonium ($R_3N^+$), pyridinium, alkylpyridinium, hydroxylate ($O^-$), enolate ($C=C-O^-$), dicyanovinylate ($C=CCH(CN)_2^-$), alkyl ether, zwitterionic group or a group with a pKa value below 4.

6. A dispersion according to claim 1, wherein Y is sulfonic acid, acylsulfonamide ($CONHSO_2R$), a saccarin moiety or sulfonylsulfonamido ($SO_2NHSO_2R$).

7. A dispersion according to claim 1, wherein Y is a nonionic solubilizing group.

8. A dispersion according to claim 1, wherein X is aryl, alkyl, aralkyl, halogen, cycloalkyl, alkoxy, alkylamino, acyl, carboxy, carboxyalkyl, sulfonamido or alkylthio.

9. A dispersion according to claim 1, wherein the dye is of Formula II:

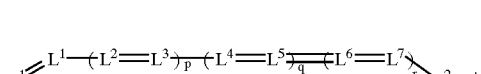

wherein $A^1$ and $A^2$ are ketomethylene or activated methylene moieties, $L^1$–$L^7$ each independently represent a substituted or unsubstituted methine group, $M^+$ is a cation, and p, q and r are independently 0 or 1.

10. A dispersion according to claim 9, wherein the dye is of Formula IIa or Formula IIb:

Formula II-A

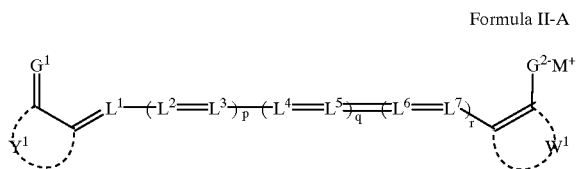

Formula II-B

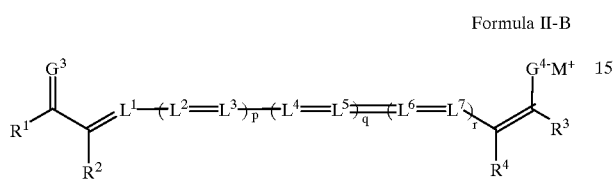

wherein $W^1$ and $Y^1$ are the atoms required to form a cyclic activated methylene/ketomethylene moiety; $R^1$ and $R^3$ are aromatic or heteroaromatic groups; $R^2$ and $R^4$ are electron-withdrawing groups; $G^1$ to $G^4$ is O or dicyanovinyl (—C(CN)$_2$)) and p, q and r are independently 0 or 1, and $L^2$ to $L^7$ each represent a substituted or unsubstituted methine groups.

11. A dispersion according to claim 1, wherein the dye is of Formula IV:

IV

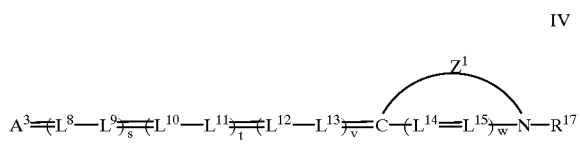

wherein $A^3$ is a ketomethylene or activated methylene moiety; $L^8$–$L^{15}$ each independently represents a substituted or unsubstituted methine group, $Z^1$ represents the non-metallic atoms necessary to complete a substituted or unsubstituted ring system containing at least one 5 or 6-membered heterocyclic nucleus; $R^{17}$ represents a substituted or unsubstituted alkyl, aryl, or aralkyl group; with the proviso that at least one substituent on the dye of Formula IV contains a ionic or non-ionic solubilizing group or a group with a pKa value less than 4 in water.

12. A dispersion according to claim 1, wherein the dye is of Formula VI:

Formula VI

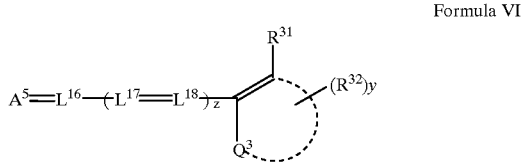

wherein $A^5$ is a ketomethylene or activated methylene, $L^{16}$ through $L^{18}$ each independently represent a substituted or unsubstituted methine, $R^{31}$ is alkyl, aryl or aralkyl, $Q^3$ represents the non-metallic atoms necessary to complete a substituted or unsubstituted ring system containing at least one 5- or 6-membered heterocyclic nucleus, each $R^{32}$ group independently represents hydrogen, alkyl, cycloalkyl, alkenyl, substituted or unsubstituted aryl, heteroaryl or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, including the atoms required to form fused aromatic or heteroaromatic rings, or a group containing a solubilizing substituent, y is 0, 1, 2, 3 or 4, z is 0, 1 or 2; with the proviso that at least one substituent on the dye of Formula VI contains an ionic or non-ionic solubilizing group or a group with a pKa value less than 4 in water.

13. A dispersion according to claim 1, wherein the dye is of Formula VII:

Formula VII

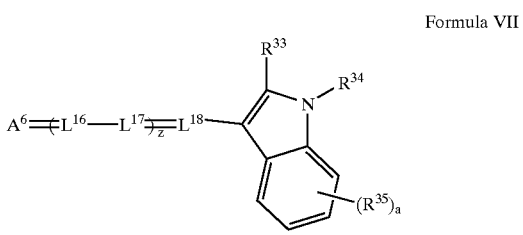

wherein $A^6$ is a ketomethylene or activated methylene, $L^{16}$ through $L^{18}$ each independently represents a substituted or unsubstituted methine group, $R^{33}$ is substituted or unsubstituted alkyl, aryl or aralkyl group, $R^{34}$ is substituted or unsubstituted aryl, alkyl or aralkyl group, each $R^{35}$ group independently represents hydrogen, alkyl, cycloalkyl, alkeneyl, substituted or unsubstituted aryl, heteroaryl or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, including the atoms required to form fused aromatic or heteroaromatic rings, or groups containing a solubilizing substituent, z is 0, 1 or 2, and a is 0, 1, 2, 3 or 4; with the proviso that at least one substituent on the dye of Formula VII contains an ionic or non-ionic solubilizing group or a group with a pKa value less than 4 in water.

14. A dispersion according to claim 1, wherein the dye is of Formula VIII:

Formula VIII

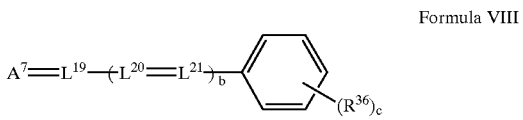

wherein $A^7$ represents a ketomethylene or activated methylene moiety, $L^{19}$ through $L^{21}$ each independently represents a substituted or unsubstituted methine group, each $R^{36}$ group independently represents hydrogen, alkyl, cycloalkyl, alkeneyl, substituted or unsubstituted aryl, heteroaryl or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, including the atoms required to form fused aromatic or heteroaromatic rings, or groups containing a solubilizing substituent, b represents 0 or 1, and c represents 0, 1, 2, 3 or 4; with the proviso that at least one substituent on the dye of Formula VIII is a ionic or non-ionic solubilizing group or a group with a pKa value less than 4 in water.

15. A dispersion according to claim 1, wherein the dye is of Formula IX:

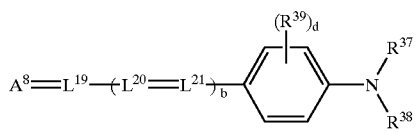

Formula IX wherein $A^8$ is a ketomethylene or activated methylene, $L^{19}$ through $L^{21}$ each independently represent a substituted or unsubstituted methine group, b is 0 or 1, each $R^{39}$ group independently represents hydrogen, alkyl, cycloalkyl, alkeneyl, substituted or unsubstituted aryl, heteroaryl or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, including the atoms required to form fused aromatic or heteroaromatic rings, or groups containing a solubilizing substituent, and $R^{37}$ and $R^{38}$ each independently represents substituted or unsubstituted aryl, alkyl or aralky, and d represents 0, 1, 2, 3 or 4; with the proviso that at least one substituent on the dye of Formula IX is a ionic or non-ionic solubilizing group or a group with a pKa value less than 4 in water.

16. A dispersion according to claim 1, wherein the dye is of Formula X:

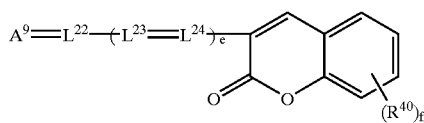

Formula X wherein $A^9$ is a ketomethylene or activated methylene moiety, $L^{22}$ through $L^{24}$ each represents a substituted or unsubstituted methine group, e is 0 or 1, each $R^{40}$ group independently represents hydrogen, alkyl, cycloalkyl, alkeneyl, substituted or unsubstituted aryl, heteroaryl or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, including the atoms required to form fused aromatic or heteroaromatic rings, or groups containing a solubilizing substituent, and f is 0, 1, 2, 3 or 4; with the proviso that at least one substituent on the dye of Formula X contains an ionic or non-ionic solubilizing group or a group with a pKa value less than 4.

17. A dispersion according to claim 1, wherein the dye is of Formula XI:

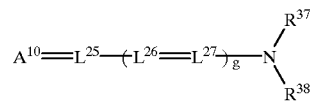

Formula XI wherein $A^{10}$ is a ketomethylene or activated methylene moiety, $L^{25}$ through $L^{27}$ each independently represents a substituted or unsubstituted methine group, g is 0, 1 or 2, and $R^{37}$ and $R^{38}$ each independently represents substituted or unsubstituted aryl, alkyl or aralky; with the proviso that at least one substituent on the dye of Formula XI contains an ionic or non-ionic solubilizing group or a group with a pKa value less than 4.

18. A dispersion according to claim 1, wherein the dye is of Formula XII:

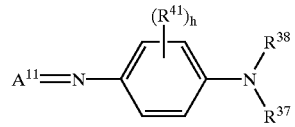

Formula XII wherein $A^{11}$ is a ketomethylene or activated methylene moiety, each $R^{41}$ group independently represents hydrogen, alkyl, cycloalkyl, alkeneyl, substituted or unsubstituted aryl, heteroaryl or aralkyl, alkylthio, hydroxy, hydroxylate, alkoxy, amino, alkylamino, halogen, cyano, nitro, carboxy, acyl, alkoxycarbonyl, aminocarbonyl, sulfonamido, sulfamoyl, including the atoms required to form fused aromatic or heteroaromatic rings, or groups containing a solubilizing substituent, $R^{37}$ and $R^{38}$ each represents substituted or unsubstituted aryl, alkyl or aralky, and h is 0, 1, 2, 3, or 4; with the proviso that at least one substituent on the dye of Formula XII contains an ionic or non-ionic solubilizing group or a group with a pKa value less than 4 in water.

19. A dispersion comprising a solvent having dispersed therein a lyotropic liquid-crystal forming dye of structural Formula I:

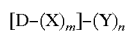

$$[D-(X)_m]-(Y)_n \qquad I$$

wherein:
D is a light-absorbing chromophore other than a cyanine dye or a barbituric acid oxonol dye;
each Y contains an ionic or a nonionic solubilizing substituent or a group with a pKa value of less than 4 in water;
each X is a nonionic substituent;
n is 0 to 10;
m is 0 to 10; and
the resulting dye forms a liquid-crystalline phase in solvent; wherein the dye possess a narrower halfbandwidth in its liquid crystalline state than in its dissolved isotropic solution state. pKa value less than 4.

20. A dispersion comprising a solvent having dispersed therein a lyotropic liquid-crystal forming dye of structural Formula I:

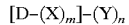

$$[D-(X)_m]-(Y)_n \qquad I$$

wherein:
D is a light-absorbing chromophore other than a cyanine dye, an azo dye, or a barbituric acid oxonol dye;
each Y contains an ionic or a nonionic solubilizing substituent or a group with a pKa value of less than 4 in water;
each X is a nonionic substituent;
n is 0 to 10;
m is 1 to 10; and
the resulting dye forms a liquid-crystalline phase in solvent.

21. A dispersion comprising a solvent having dispersed therein a lyotropic liquid-crystal forming dye of structural Formula I:

$$[D\text{-}(X)_m]\text{-}(Y)_n \qquad I$$

wherein:

D is a light-absorbing chromophore other than a cyanine dye, an azo dye, or a barbituric acid oxonol dye;

each Y contains an ionic or a nonionic solubilizing substituent or a group with a pKa value of less than 4 in water;

each X is a nonionic substituent;

n is 1 to 10;

m is 0 to 10; and the resulting dye forms a liquid-crystalline phase in solvent.

* * * * *